US009906927B2

(12) United States Patent
Levien et al.

(10) Patent No.: US 9,906,927 B2
(45) Date of Patent: Feb. 27, 2018

(54) MULTI-MODALITY COMMUNICATION INITIATION

(75) Inventors: Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/317,987

(22) Filed: Oct. 31, 2011

(65) Prior Publication Data

US 2013/0079053 A1 Mar. 28, 2013

Related U.S. Application Data

(63) Continuation-in-part of application No. 13/200,741, filed on Sep. 28, 2011, and a continuation-in-part of application No. 13/200,805, filed on Sep. 30, 2011, and a continuation-in-part of application No. 13/200,804, filed on Sep. 30, 2011, and a continuation-in-part of application No. 13/317,985, filed on Oct. 31, 2011, and a continuation-in-part of application No. 13/317,983, filed on Oct. 31, 2011.

(51) Int. Cl.
*H04M 1/00* (2006.01)
*H04W 4/18* (2009.01)
*H04L 29/06* (2006.01)

(52) U.S. Cl.
CPC .............. *H04W 4/18* (2013.01); *H04L 69/24* (2013.01)

(58) Field of Classification Search
CPC ......... H04W 4/12; H04W 8/245; H04W 4/14; H04L 29/08108; H04L 2012/5607; H04M 3/42391; H04M 3/42221; H04M 3/5307; H04M 1/08; H04M 7/006; G10L 15/265; G10L 13/08
USPC ....... 455/412.1, 412.2, 413–414.1, 418, 466, 455/552.1, 563, 569.1; 379/52, 68, 88.13, 379/88.14, 88.17, 88.18, 426.02; 370/310.2, 259–260; 704/235, 260
See application file for complete search history.

(56) References Cited

U.S. PATENT DOCUMENTS

| | | | |
|---|---|---|---|
| 5,280,521 | A | 1/1994 | Itoh |
| 5,710,806 | A | 1/1998 | Lee |
| 5,724,410 | A | 3/1998 | Parvulescu |
| 6,249,808 | B1 | 6/2001 | Seshadri |
| 6,259,706 | B1 | 7/2001 | Shimada |
| 6,301,338 | B1 | 10/2001 | Mäkelä et al. |

(Continued)

OTHER PUBLICATIONS

"Apache Wave;" Wikipedia, Sep. 24, 2011, pp. 1-6; located at: http://en.wikipedia.org/wiki/Apache_Wave.

(Continued)

*Primary Examiner* — Steve D Agosta

(57) ABSTRACT

Disclosed herein are example embodiments for multi-modality communication initiation. Described embodiments may include, but are not limited to, initiation of a multi-modality communication between an initiation communication device and a destination communication device. By way of example but not limitation, an initiating user may interact with an initiating communication device using a textual interaction modality, and a destination user may interact with a destination communication device using a voice interaction modality.

27 Claims, 36 Drawing Sheets

(56) References Cited

U.S. PATENT DOCUMENTS

| | | |
|---|---|---|
| 6,366,651 B1 | 4/2002 | Griffith |
| 6,504,910 B1 | 1/2003 | Engelke |
| 6,701,162 B1 | 3/2004 | Everett |
| 6,742,059 B1 | 5/2004 | Todd et al. |
| 6,954,781 B2 | 10/2005 | Bhattacharya |
| 7,076,255 B2 | 7/2006 | Parupudi et al. |
| 7,103,349 B2 | 9/2006 | Himanen |
| 7,133,899 B2 | 11/2006 | Rowe |
| 7,184,786 B2 | 2/2007 | Mumick |
| 7,359,492 B2 | 4/2008 | Myers |
| 7,428,580 B2 | 9/2008 | Hullfish et al. |
| 7,496,625 B1 | 2/2009 | Belcher |
| 7,523,226 B2 | 4/2009 | Anderson et al. |
| 7,551,583 B1 | 6/2009 | Gazzard |
| 7,555,521 B1 | 6/2009 | McLaughlin |
| 7,702,792 B2 | 4/2010 | Shaffer |
| 7,725,116 B2 | 5/2010 | Mumick |
| 7,733,903 B2 | 6/2010 | Bhogal |
| 7,912,187 B1 | 3/2011 | Mikan |
| 7,983,706 B2 | 7/2011 | Wolter |
| 8,041,025 B2 | 10/2011 | Dolph et al. |
| 8,260,332 B2 | 9/2012 | Reunamäki |
| 8,315,361 B1 | 11/2012 | Becker et al. |
| 8,620,265 B1* | 12/2013 | Gailloux ............... H04M 15/28 379/114.01 |
| 2001/0033639 A1 | 10/2001 | Martin |
| 2002/0046262 A1 | 4/2002 | Heilig et al. |
| 2002/0055350 A1 | 5/2002 | Gupte et al. |
| 2002/0077830 A1 | 6/2002 | Suomela et al. |
| 2002/0169610 A1 | 11/2002 | Luegger |
| 2003/0003926 A1 | 1/2003 | Peters et al. |
| 2003/0028601 A1 | 2/2003 | Rowe |
| 2003/0069997 A1* | 4/2003 | Bravin ................ G06F 17/2765 709/250 |
| 2003/0081739 A1 | 5/2003 | Hikishima |
| 2003/0125952 A1 | 7/2003 | Engleke et al. |
| 2003/0174155 A1 | 9/2003 | Weng et al. |
| 2004/0015504 A1 | 1/2004 | Ahad et al. |
| 2004/0015547 A1 | 1/2004 | Griffin et al. |
| 2004/0034690 A1 | 2/2004 | Schmitz et al. |
| 2004/0057562 A1 | 3/2004 | Myers et al. |
| 2004/0082317 A1 | 4/2004 | Graefen |
| 2004/0117804 A1 | 6/2004 | Scahill et al. |
| 2004/0139157 A1 | 7/2004 | Neely, III et al. |
| 2004/0203708 A1 | 10/2004 | Khan et al. |
| 2004/0267527 A1 | 12/2004 | Creamer et al. |
| 2004/0268265 A1 | 12/2004 | Berger |
| 2005/0021868 A1 | 1/2005 | Sharma et al. |
| 2005/0049879 A1 | 3/2005 | Audu et al. |
| 2005/0135595 A1 | 6/2005 | Bushey et al. |
| 2005/0136955 A1 | 6/2005 | Mumick et al. |
| 2005/0198096 A1 | 9/2005 | Shaffer et al. |
| 2005/0243993 A1 | 11/2005 | McKinzie et al. |
| 2005/0250550 A1 | 11/2005 | Fields |
| 2005/0255837 A1 | 11/2005 | Kwon |
| 2006/0026001 A1 | 2/2006 | Bravin et al. |
| 2006/0052127 A1 | 3/2006 | Wolter |
| 2006/0066717 A1 | 3/2006 | Miceli |
| 2006/0189333 A1 | 8/2006 | Othmer |
| 2006/0217159 A1 | 9/2006 | Watson |
| 2006/0293888 A1 | 12/2006 | Jindal |
| 2007/0082686 A1 | 4/2007 | Mumick et al. |
| 2007/0130399 A1 | 6/2007 | Anderson et al. |
| 2007/0156895 A1 | 7/2007 | Vuong |
| 2007/0190944 A1 | 8/2007 | Doan et al. |
| 2007/0192418 A1 | 8/2007 | Adams et al. |
| 2007/0238474 A1 | 10/2007 | Ballas et al. |
| 2007/0260984 A1 | 11/2007 | Marks et al. |
| 2008/0043733 A1* | 2/2008 | Liebermann .......... G06Q 20/06 370/389 |
| 2008/0057925 A1 | 3/2008 | Ansari |
| 2008/0068671 A1 | 3/2008 | Yoshida et al. |
| 2008/0095332 A1 | 4/2008 | Myers et al. |
| 2008/0148154 A1 | 6/2008 | Burrell et al. |
| 2008/0192736 A1 | 8/2008 | Jabri et al. |
| 2008/0232248 A1 | 9/2008 | Barave et al. |
| 2008/0248818 A1 | 10/2008 | Venkatesulu et al. |
| 2009/0037170 A1 | 2/2009 | Williams |
| 2009/0135741 A1 | 5/2009 | Mykhalchuck et al. |
| 2009/0150574 A1 | 6/2009 | Kawahara et al. |
| 2009/0171669 A1 | 7/2009 | Engelsma et al. |
| 2009/0186636 A1 | 7/2009 | Salonen |
| 2009/0238346 A1 | 9/2009 | Toutain et al. |
| 2009/0276539 A1 | 11/2009 | Huerta et al. |
| 2009/0290691 A1 | 11/2009 | Salonen |
| 2009/0319918 A1 | 12/2009 | Affronti et al. |
| 2009/0325546 A1 | 12/2009 | Reddy et al. |
| 2010/0030557 A1 | 2/2010 | Molloy et al. |
| 2010/0053212 A1 | 3/2010 | Kang et al. |
| 2010/0057466 A1 | 3/2010 | Garg et al. |
| 2010/0100809 A1 | 4/2010 | Thomas et al. |
| 2010/0144278 A1 | 6/2010 | Van Harlingen et al. |
| 2010/0150333 A1 | 6/2010 | Goodman et al. |
| 2010/0169096 A1 | 7/2010 | Lv et al. |
| 2010/0174421 A1 | 7/2010 | Tsai et al. |
| 2010/0190513 A1 | 7/2010 | Andreasson |
| 2010/0191590 A1 | 7/2010 | Hakkarainen et al. |
| 2010/0211389 A1 | 8/2010 | Marquardt |
| 2010/0211695 A1 | 8/2010 | Steinmetz et al. |
| 2010/0239081 A1 | 9/2010 | Krantz et al. |
| 2010/0250693 A1 | 9/2010 | Zheng et al. |
| 2010/0251124 A1 | 9/2010 | Geppert et al. |
| 2010/0269134 A1 | 10/2010 | Storan et al. |
| 2010/0322395 A1 | 12/2010 | Michaelis et al. |
| 2011/0028168 A1 | 2/2011 | Champlin et al. |
| 2011/0038512 A1 | 2/2011 | Petrou et al. |
| 2011/0047246 A1 | 2/2011 | Frissora et al. |
| 2011/0081007 A1 | 4/2011 | Bar-Yoav |
| 2011/0105087 A1 | 5/2011 | Toebes et al. |
| 2011/0105089 A1 | 5/2011 | Ellis et al. |
| 2011/0116610 A1 | 5/2011 | Shaw et al. |
| 2011/0130168 A1 | 6/2011 | Vendrow et al. |
| 2011/0143786 A1 | 6/2011 | Fan et al. |
| 2011/0170675 A1 | 7/2011 | Mikan et al. |
| 2011/0177795 A1 | 7/2011 | Kitahara et al. |
| 2011/0177800 A1 | 7/2011 | Gilson |
| 2011/0179180 A1 | 7/2011 | Schleifer et al. |
| 2011/0211679 A1 | 9/2011 | Mezhibovsky et al. |
| 2011/0212737 A1 | 9/2011 | Isidore |
| 2011/0270613 A1 | 11/2011 | Da Palma et al. |
| 2011/0294525 A1 | 12/2011 | Jonsson |
| 2012/0034904 A1 | 2/2012 | LeBeau et al. |
| 2012/0035931 A1 | 2/2012 | LeBeau et al. |
| 2012/0064924 A1 | 3/2012 | Schapsis et al. |
| 2012/0077526 A1 | 3/2012 | Riffe |
| 2012/0096095 A1* | 4/2012 | Bhargava ............... H04L 51/14 709/206 |
| 2012/0115501 A1 | 5/2012 | Zheng |
| 2012/0237009 A1 | 9/2012 | Szpilfogel |
| 2012/0259633 A1 | 10/2012 | Aihara et al. |
| 2013/0029721 A1 | 1/2013 | Ma et al. |
| 2013/0040660 A1 | 2/2013 | Fisher et al. |
| 2013/0079061 A1 | 3/2013 | Jadhav et al. |
| 2013/0158988 A1 | 6/2013 | Katis et al. |
| 2013/0252539 A1 | 9/2013 | Minter et al. |

OTHER PUBLICATIONS

"Telecommunications device for the deaf;" Wikipedia, Sep. 25, 2011, pp. 1-8; located at: http://en.wikipedia.org/wiki/Telecommunications_device_for_the_deaf.

"Google Wave Federation Protocol," Wikipedia, Sep. 24, 2011, pp. 1-3; located at: http://en.wikipedia.org/wiki/Google_Wave_Federation_Protocol.

"Interactive voice response," Wikipedia, Sep. 25, 2011, pp. 1-8; located at: http://en.wikipedia.org/wiki/Interactive_voice_response.

* cited by examiner

MULTI-MODALITY COMMUNICATION INITIATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements:

the present application constitutes a continuation-in-part of U.S. patent application Ser. No. 13/200,741, entitled "MULTI-MODALITY COMMUNICATION", naming Royce A. Levien, Richard T. Lord, Robert W. Lord, Mark A. Malamud, John D. Rinaldo Jr. as inventors, filed 28 Sep. 2011, which is currently co-pending, or is an application of which a currently co-pending application is entitled to the benefit of the filing date;

the present application constitutes a continuation-in-part of U.S. patent application Ser. No. 13/200,805, entitled "MULTI-MODALITY COMMUNICATION PARTICIPATION", naming Royce A. Levien, Richard T. Lord, Robert W. Lord, Mark A. Malamud, John D. Rinaldo Jr. as inventors, filed 30 Sep. 2011, which is currently co-pending, or is an application of which a currently co-pending application is entitled to the benefit of the filing date;

the present application constitutes a continuation-in-part of U.S. patent application Ser. No. 13/200,804, entitled "USER INTERFACE FOR MULTI-MODALITY COMMUNICATION", naming Royce A. Levien, Richard T. Lord, Robert W. Lord, Mark A. Malamud, John D. Rinaldo Jr. as inventors, filed 30 Sep. 2011, which is currently co-pending, or is an application of which a currently co-pending application is entitled to the benefit of the filing date;

the present application constitutes a continuation-in-part of U.S. patent application Ser. No. 13/317,985, entitled "MULTI-MODALITY COMMUNICATION WITH CONVERSION OFFLOADING", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date; and the present application constitutes a continuation-in-part of U.S. patent application Ser. No. 13/317,983, entitled "MULTI-MODALITY COMMUNICATION WITH INTERCEPTIVE CONVERSION", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

DETAILED DESCRIPTION

Figure 1:
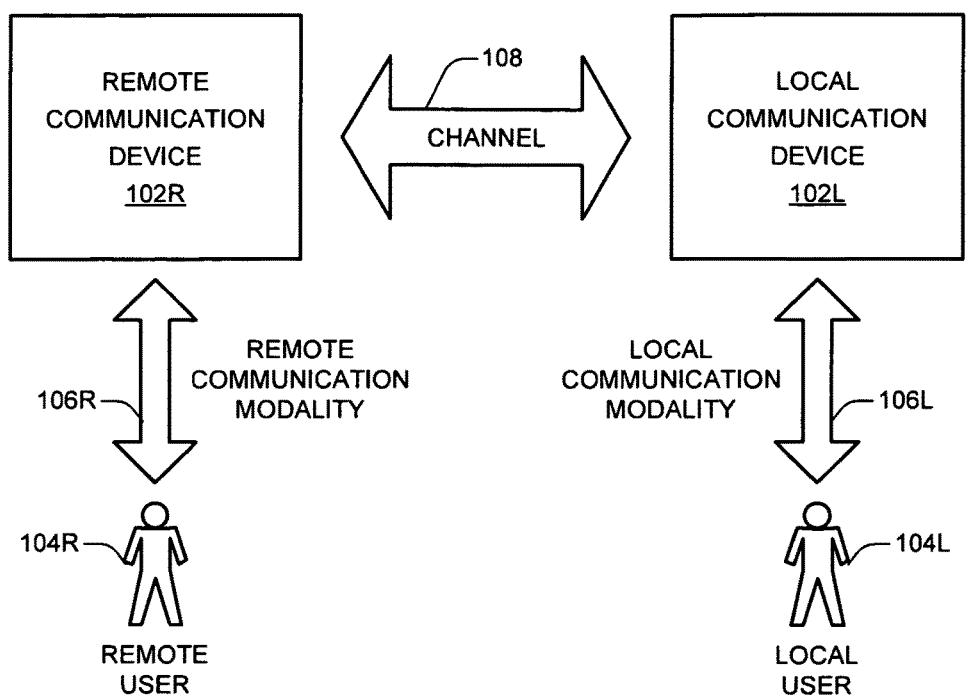
FIG. 1 is schematic diagram of two communication devices that may be participating in an example communication in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is schematic diagram 100 of two communication devices that may be participating in an example communication in accordance with certain example embodiments. As shown in FIG. 1, by way of example but not limitation, schematic diagram 100 may include communication devices 102, users 104, communication modalities 106, or at least one channel 108. More specifically, schematic diagram 100 may include a remote communication device 102R, a remote user 104R, a remote communication modality 106R, a local communication device 102L, a local user 104L, a local communication modality 106L, or a channel 108.

For certain example embodiments, a user 104 may be associated with a communication device 102. A user 104 may be interacting with a communication device 102 via at least one communication modality 106. Communication devices 102 may comprise, by way of example but not limitation, a mobile phone, a mobile terminal, a laptop or notebook computer, a personal digital assistant (PDA), a netbook, an entertainment appliance (e.g., a television, a gaming console, a set-top box, a music player, some combination thereof, etc.), a smart phone, a portable gaming device, a user equipment, a tablet or slate computer, a home phone, a desktop computer, a personal navigation device (PND), a vehicle with user-accessible communication capabilities, a private branch exchange (PBX)-based phone, videoconferencing equipment, any combination thereof, and so forth. A user 104 may comprise, by way of example only, a person. Example communication modalities 106 may include, by way of example but not limitation, a textual communication modality (e.g., wherein text may be communicated such as via a text message), a vocal communication modality (e.g., wherein sounds may be communicated such as via a voice call or teleconference), a visual communication modality (e.g., wherein moving images may be communicated such as via a video call or video conference), any combination thereof, and so forth.

For certain example embodiments, remote user 104R may be associated with remote communication device 102R. Remote user 104R may be interacting with remote communication device 102R via at least one remote communication modality 106R. Local user 104L may be associated with local communication device 102L. Local user 104L may be interacting with local communication device 102L via at least one local communication modality 106L. Remote communication device 102R or remote user 104R may be participating in at least one communication with local communication device 102L or local user 104L via one or more channels 108. A channel 108 may comprise, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a public-switched telephone network (PSTN), at least part of a cable network, at least part of a cellular network connection, at least part of an Internet connection, at least part of a Wi-Fi connection, at least part of a WiMax connection, multiple instances of any of the above, any combination of the above, and so forth. A channel 108 may include one or more nodes through which signals are propagated.

For certain example implementations, a communication may be initiated by remote communication device 102R, remote user 104R, local communication device 102L, local user 104L, any combination thereof, and so forth. For certain example implementations, remote communication modality 106R and local communication modality 106L may comprise a same one or more communication modalities 106 or may comprise at least one different communication modality 106. Furthermore, for certain example implementations, remote communication modality 106R or local communication modality 106L may change from one communication modality to another communication modality during a single communication, across different communications, and so forth.

Moreover, it should be understood that the terms "remote" and "local" may, depending on context, be a matter of perspective. For instance, a communication device 102 or user 104 or communication modality 106 may be considered a local one at one moment, for one communication, for one perspective, etc. but may be considered a remote one at a different moment, for a different communication, for a different perspective, etc. However, one of ordinary skill in the art will recognize that the terms "remote" and "local" may serve, depending on context, to indicate that different interactions, acts, operations, functionality, a combination thereof, etc. may be occurring at, may be more closely associated with, a combination thereof etc. one side, aspect, location, combination thereof, etc. of a communication as compared to another side, aspect, location, combination thereof, etc. of the communication. For example, one signal may be transmitted from a remote communication device 102R and received at a local communication device 102L, or another signal may be transmitted from a local communication device 102L and received at a remote communication device 102R.

Figure 2:
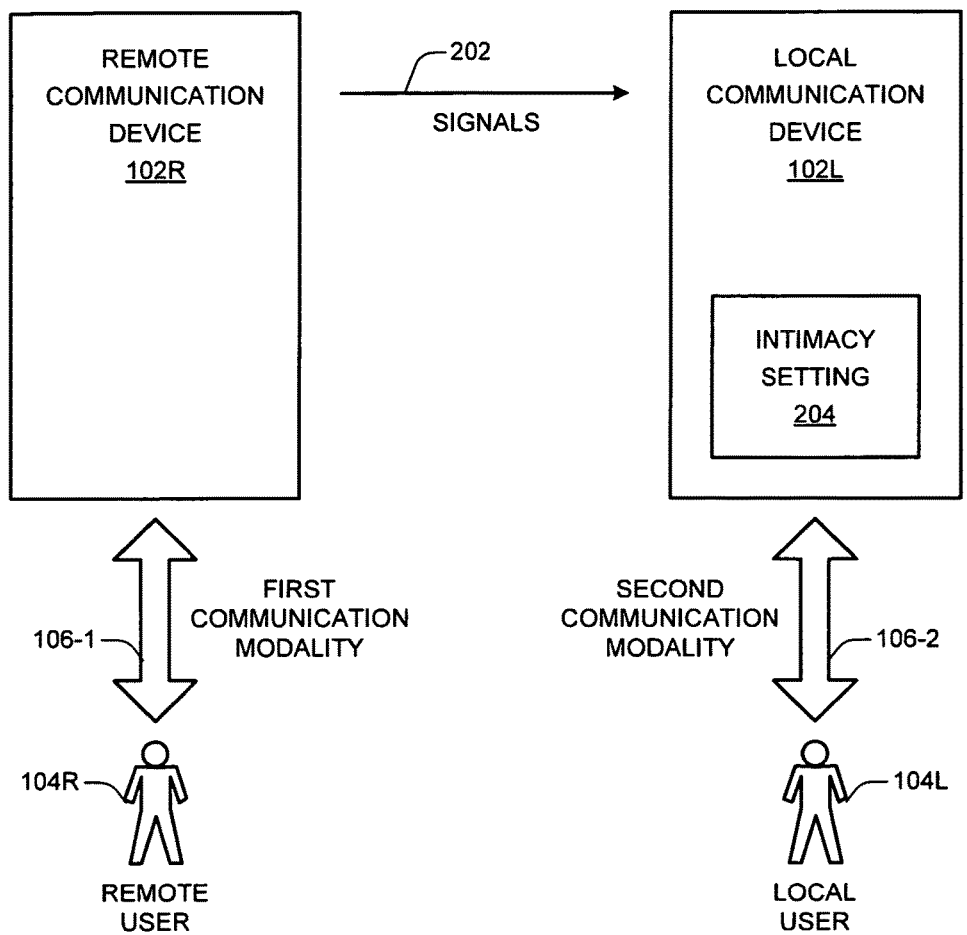
FIG. 2 is schematic diagram of two communication devices that may be participating in a communication involving two communication modalities in accordance with at least one example intimacy setting, in accordance with certain example embodiments.

FIG. 2 is schematic diagram 200 of two communication devices that may be participating in a communication involving two communication modalities in accordance with at least one example intimacy setting, in accordance with certain example embodiments. As shown in FIG. 2, by way of example but not limitation, schematic diagram 200 may include communication devices 102, users 104, communication modalities 106, or at least one signal 202. More specifically, schematic diagram 200 may include a remote communication device 102R, a remote user 104R, a first communication modality 106-1, a local communication device 102L, a local user 104L, a second communication modality 106-2, or one or more signals 202. Furthermore, at least local communication device 102L may include (e.g., store, establish, have access to, a combination thereof, etc.) at least one intimacy setting 204.

For certain example embodiments, remote user 104R may be associated with remote communication device 102R. Remote user 104R may be interacting with remote communication device 102R via at least one first communication modality 106-1. Local user 104L may be associated with local communication device 102L. Local user 104L may be interacting with local communication device 102L via at least one second communication modality 106-2. First communication modality 106-1 may differ from second communication modality 106-2. Remote communication device 102R or remote user 104R may be participating in at least one communication with local communication device 102L or local user 104L via one or more signals 202. Signals 202 may propagate via one or more channels 108 (e.g., of FIG. 1). Signals 202, by way of example but not limitation, may comprise, electrical signals, magnetic signals, electromagnetic signals, photonic signals, wireless signals, wired signals, any combination thereof, and so forth.

For certain example embodiments, a local communication device 102L may receive one or more signals 202 corresponding to a first communication modality 106-1. A local communication device 102L may respond to one or more signals 202 corresponding to first communication modality 106-1 based at least partly on local user 104L interaction via a second communication modality 106-2 in accordance with at least one intimacy setting 204. By way of example but not limitation, at least one intimacy setting 204 may indicate what kind of one or more communication modalities a user is willing to expose for at least one communication.

For certain example embodiments, at least one intimacy setting 204 may indicate how a user 104 is to interact with a communication device 102 with respect to a given communication without condition (e.g., a user may limit any current communications to text). Additionally or alternatively, at least one intimacy setting 204 may indicate how a user 104 is to interact with a communication device with respect to a given communication on a conditional basis. By way of example only, a user 104 may indicate a communication modality in at least partial dependence on whether an associated communication device 102 initiated a communication or terminated a communication. For instance, at least one intimacy setting 204 may indicate that communications are to be initiated using an interaction in accordance with a voice communication modality, but the at least one intimacy setting 204 may indicate that communications are to be terminated using a textual communication modality. Additionally or alternatively, a local user 104L may indicate a local communication modality 106L (e.g., of FIG. 1) in at least partial dependence on a remote communication modality 106R. For instance, at least one intimacy setting 204 may indicate that if a remote communication modality 106R corresponds to text, a local communication modality 106L is also to correspond to text; furthermore, the at least one intimacy setting 204 may indicate that if a remote communication modality 106R corresponds to voice, a local communication modality 106L is to correspond to text; moreover, the at least one intimacy setting 204 may indicate that if a remote communication modality 106R corresponds to video, a local communication modality 106L is to correspond to voice. Additionally or alternatively, a local user 104L may indicate a local communication modality 106L (e.g., of FIG. 1) that is based at least partially on an identity of a remote user 104R; a time of day, day of week, a combination thereof, etc.; an environmental condition (e.g., an ambient lighting level, a level or type of movement—e.g. vehicle motion may be detected, a combination thereof, etc.); any combination thereof; and so forth. However, claimed subject matter is not limited to any particular examples.

Figure 3A:
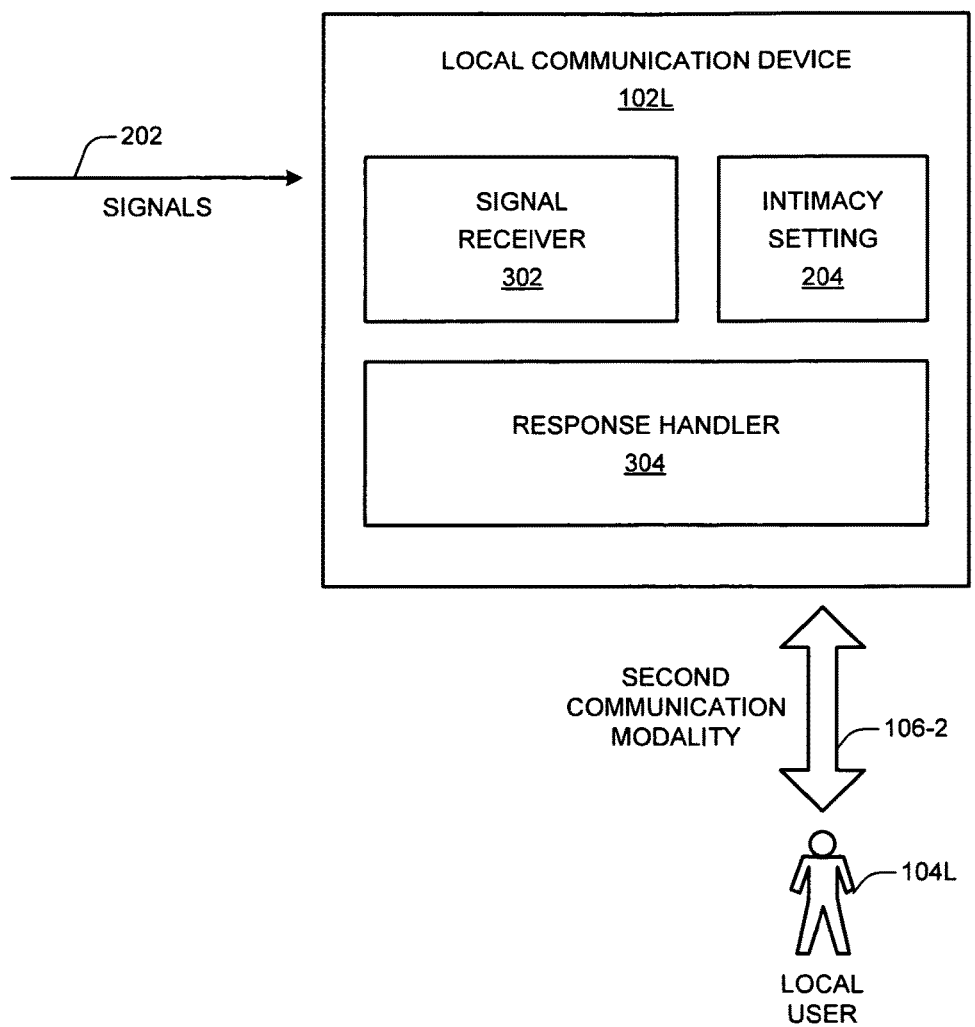
FIG. 3A is schematic diagram of an example communication device that may be participating in a communication using a signal receiver or a response handler in accordance with certain example embodiments.

FIG. 3A is schematic diagram 300A of an example communication device that may be participating in a communication using a signal receiver or a response handler in accordance with certain example embodiments. As shown in FIG. 3A, by way of example but not limitation, schematic diagram 300A may include a local communication device 102L, a local user 104L, a second communication modality 106-2, or one or more signals 202. More specifically, a local communication device 102L of schematic diagram 300 may include at least one intimacy setting 204, a signal receiver 302, or a response handler 304.

For certain example embodiments, a signal receiver 302 may receive one or more signals 202 corresponding to a first communication modality 106-1. By way of example but not limitation, one or more signals 202 may correspond to first communication modality 106-1 if one or more signals 202 originated at remote communication device 102R (e.g., of FIG. 2) in at least partial dependence on interaction by remote user 104R with remote communication device 102R via first communication modality 106-1, if one or more signals 202 are derived at least partly from interaction by remote user 104R with remote communication device 102R via first communication modality 106-1, if one or more signals 202 are encoded to support user input via first communication modality 106-1, if one or more signals 202 are encoded to support user output in accordance with first communication modality 106-1, any combination thereof, and so forth. A response handler 304 may respond to one or more signals 202 corresponding to first communication modality 106-1 based at least partly on local user 104L interaction via a second communication modality 106-2 in accordance with at least one intimacy setting 204. Example implementations with respect to a response handler 304 are described herein below with particular reference to at least FIGS. 4A-4C. Additional and/or alternative implementations are described herein below with respect to at least FIGS. 6A-6K.

For certain example embodiments, signal receiver 302 and response handler 304 may comprise a single component together, a single component apiece, multiple components, or any combination thereof, and so forth. Example components for a communication device 102 are described herein below with particular reference to at least FIG. 5. By way of example but not limitation, signal receiver 302 may comprise an antenna, a wired connector, a signal downconverter, a baseband processor, a signal processing module (e.g., to account for signal manipulation for a communication protocol, to decrypt, to extract data, a combination thereof, etc.), a processor, hardware, software, firmware, logic, circuitry, any combination thereof, and so forth. By way of example but not limitation, response handler 304 may comprise an intimacy-related module, hardware, software, firmware, logic, circuitry, any combination thereof, and so forth.

Figure 3B:
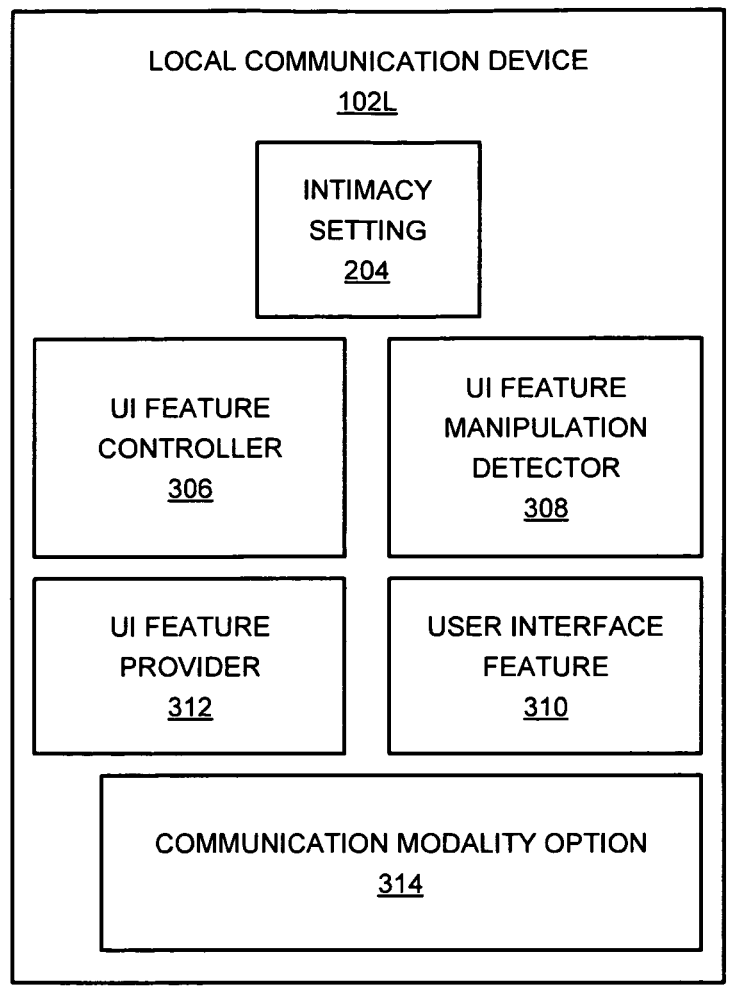
FIG. 3B is a schematic diagram of an example communication device that may realize a user interface feature in accordance with certain example embodiments.
Figure 3B:
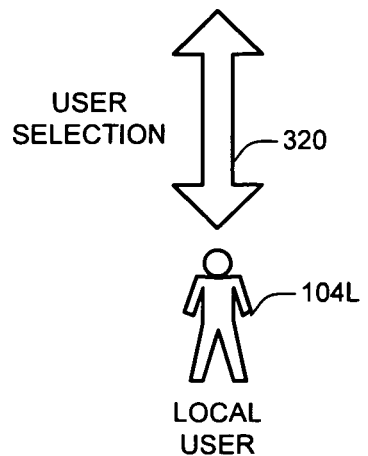

FIG. 3B is a schematic diagram 300B of an example communication device that may realize a user interface feature in accordance with certain example embodiments. As shown in FIG. 3B, by way of example but not limitation, schematic diagram 300B may include a local communication device 102L, a local user 104L, or at least one intimacy setting 204. More specifically, schematic diagram 300B may include at least one user interface (UI) feature controller 306, at least one user interface feature manipulation detector 308, at least one user interface feature 310, at least one user interface feature provider 312, one or more communication modality options 314, or at least one user selection 320.

For certain example embodiments, a user interface feature 310 may be realized by a local communication device 102L. Example implementations for a user interface feature 310 are described herein with particular reference to FIGS. 3C-3F and FIGS. 8A-8I, but by way of example but not limitation. A user interface feature 310 may enable a user 104 to operate a communication device 102 with regard to multi-modality communications. A user interface feature 310 may, for example, provide visual, aural, haptic, etc. output and accept visual, touch, or sound input to enable a user 104 to establish settings (e.g., at least one intimacy setting 204), activate a multi-modality communication, any combination thereof, and so forth. For certain example implementations, a user interface feature 310 may include or present one or more communication modality options 314. Communication modality options 314 are described, by way of example but not limitation, with particular reference to FIGS. 3D-3F. In an example operation, user selection 320 of a communication modality option 314 may enable a user 104 to establish settings, activate a multi-modality communication, any combination thereof, and so forth For certain example embodiments, a user interface feature provider 312 may provide a user interface feature 310. A user interface feature manipulation detector 308 may detect if or when a user interface feature 310 is being manipulated by a user 104. A user interface feature controller 306 may control an implementation or realization of a user interface feature. For certain example implementations, a user interface feature controller 306 may control interactions between user interface feature manipulation detector 308 or user interface feature provider 312 or may control interactions among user interface feature provider 312, user interface feature manipulation detector 308, and other components of a communication device 102. For instance, a user interface feature controller 306 may provide access to one or more signals 202 (e.g., of FIGS. 2 and 3A) for user interface feature provider 312, to calling functionality of a communication device 102, to display functionality of a communication device 102, to an operating system resident on a communication device 102 (e.g., if a user interface feature or multi-modality communication is at least partially implemented by an application that is separate from an operating system), to user interface components 516, any combination thereof, and so forth. However, claimed subject matter is not limited to any particular described embodiments, implementations, examples, etc.

Figure 3C:
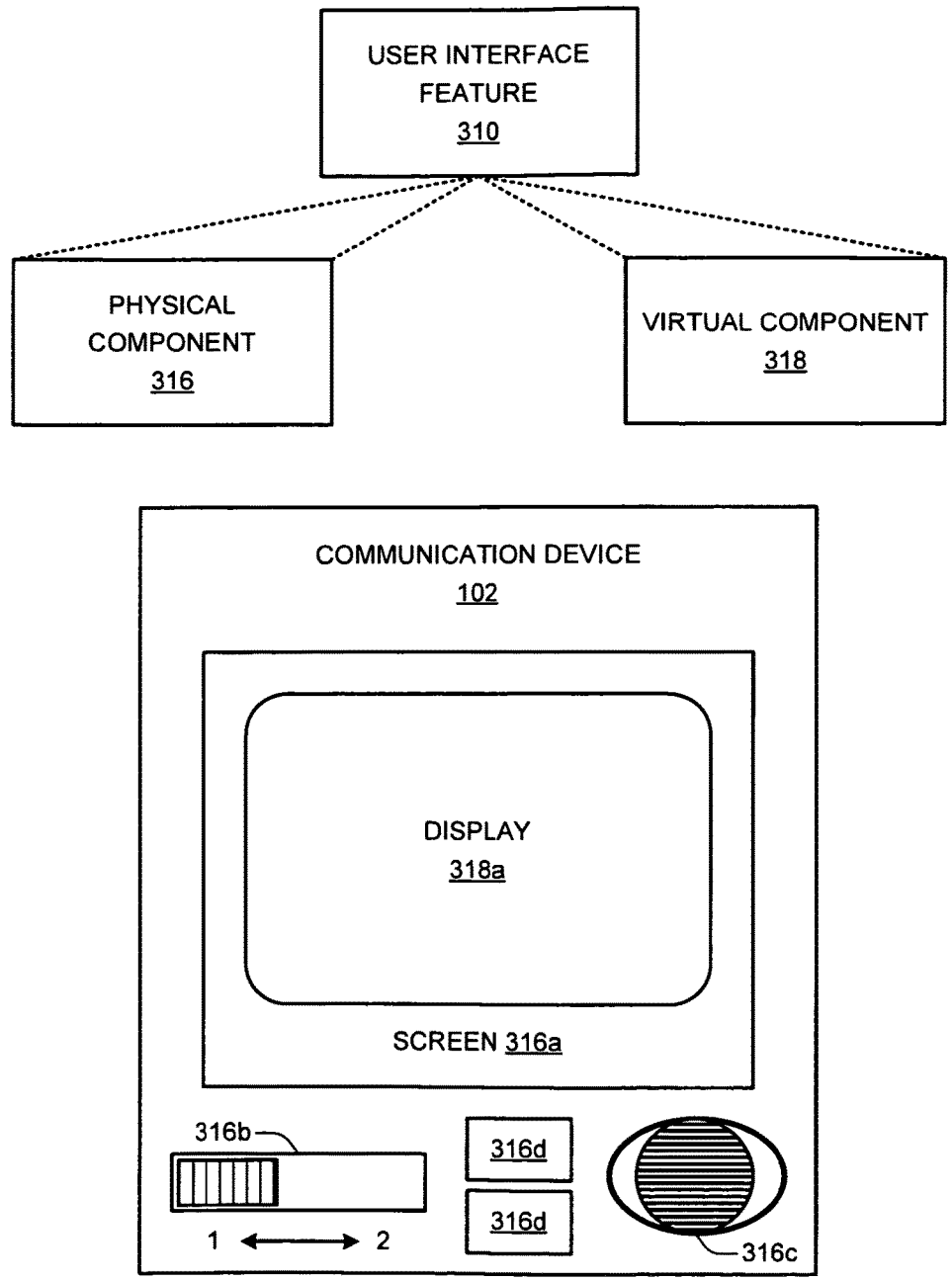
FIG. 3C is a schematic diagram of an example communication device that may include a physical component or a virtual component of a user interface feature in accordance with certain example embodiments.

FIG. 3C is a schematic diagram 300C of an example communication device that may include a physical component or a virtual component of a user interface feature in accordance with certain example embodiments. As shown in FIG. 3C, by way of example but not limitation, schematic diagram 300C may include a communication device 102 or a user interface feature 310. More specifically, schematic diagram 300C may include at least one physical component 316 of a user interface feature 310 or at least one virtual component 318 of a user interface feature 310.

For certain example embodiments, a user interface feature 310 may comprise one or more physical components 316, one or more virtual components 318, any combination thereof, and so forth. By way of example but not limitation, a physical component 316 of a user interface feature 310 may comprise a component that is at least partially implemented in hardware as part of a communication device 102.

Examples of physical components 316 may include, but are not limited to, at least one knob, at least one dial, at least one slider, at least one switch, one or more keys (e.g., that are part of a numeric, alphabetical, alphanumeric, etc. keypad or keyboard), one or more buttons, at least one trackball, at least one track wheel, at least one joystick, a track stick, or at least one touch-sensitive surface (e.g., a touch-sensitive screen, a track pad, etc.). Physical components 316 (e.g., a knob, a switch, a slider, a dial, a key, a button, a trackball, a track wheel, etc.) may be physically moveable by a user. A physical component 316 may be integrated with a communication device 102. A physical component 316 may be a hardware input/output component that is dedicated (e.g., temporarily or permanently) to a user interface feature 310. Examples of physical components 316 that are illustrated in schematic diagram 300C may include, by way of example but not limitation, a touch-sensitive screen 316a, a switch 316b, a trackball or track wheel 316c, a button or key 316d, a combination thereof, and so forth. As shown, by way of example but not limitation, a switch 316b may be switched between a first communication modality 106-1 and a second communication modality 106-2 (e.g., of FIG. 2).

For certain example embodiments, a user interface feature 310 may comprise one or more virtual components 318. By way of example but not limitation, a virtual component 318 of a user interface feature 310 may comprise a component that is at least partially implemented in software or firmware as part of a communication device 102. Examples of virtual components 318 may include, but are not limited to, a visual presentation, an aural presentation, a haptic presentation, any combination thereof, and so forth. For certain example implementations, a virtual component 318 may be displayed on a screen, played on a speaker, projected on a screen, vibrated by a device, any combination thereof, and so forth. A virtual component 318 may be reconfigurable during operation. A virtual component 318 may be displayed at one moment, modified at another moment, removed from a display at another moment, a combination thereof, and so forth. An example of a virtual component 318 that is illustrated in schematic diagram 300C may include, by way of example but not limitation, a display 318a. Physical components 316 or virtual components 318 may not be mutually exclusive. For example, a screen 316a may serve to present a virtual component 318 on a physical component 316. Additionally or alternatively, a physical component 316 (e.g., a trackball 316c or a button/key 316d) may be used to select an aspect of a virtual component 318 (e.g., that is part of a display 318a). However, claimed subject matter is not limited to any particular described embodiments, implementations, examples, etc.

Figure 3D:
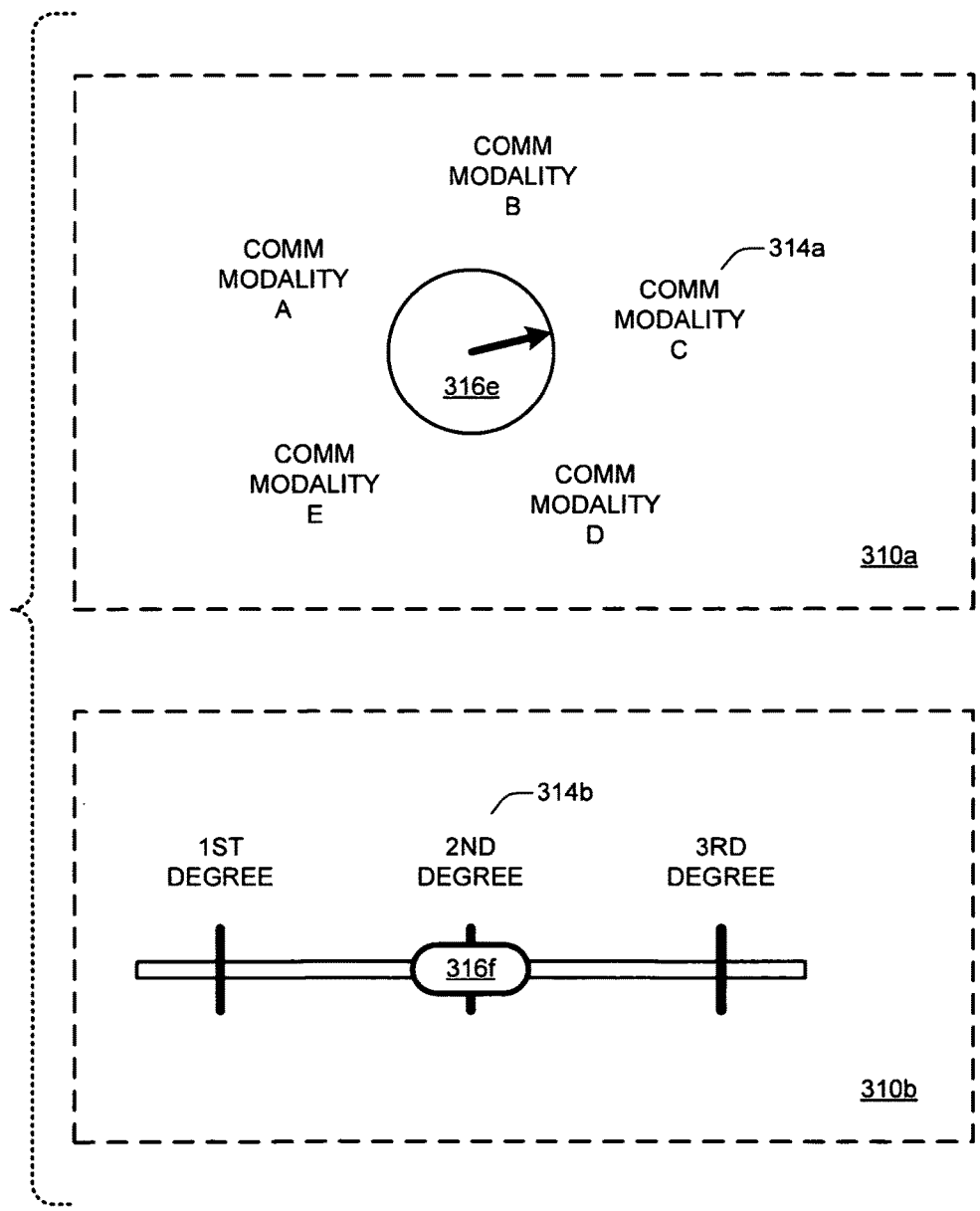
FIGS. 3D-3F are schematic diagrams of example user interface features in accordance with certain example embodiments.
Figure 3E:
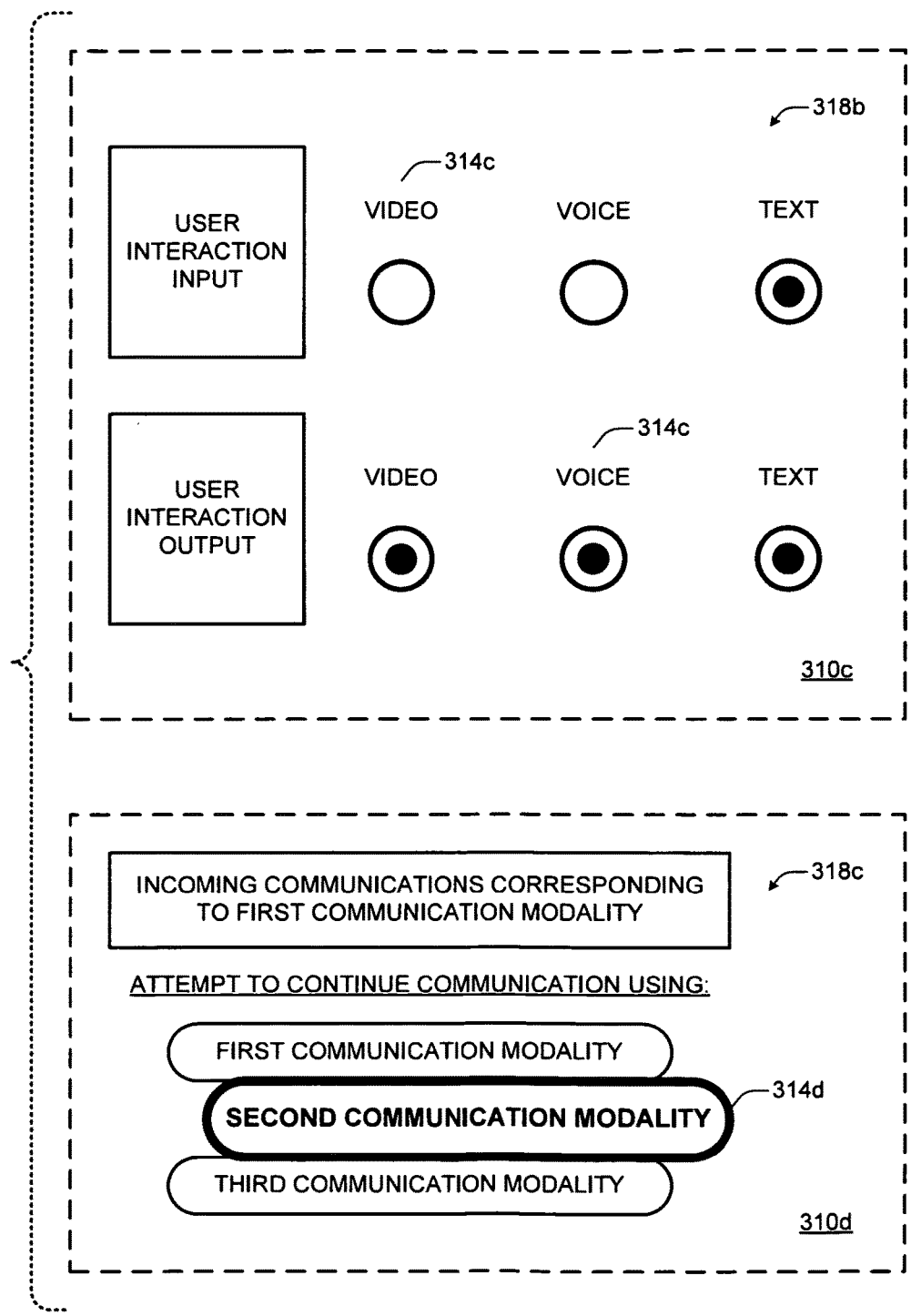
Figure 3F:
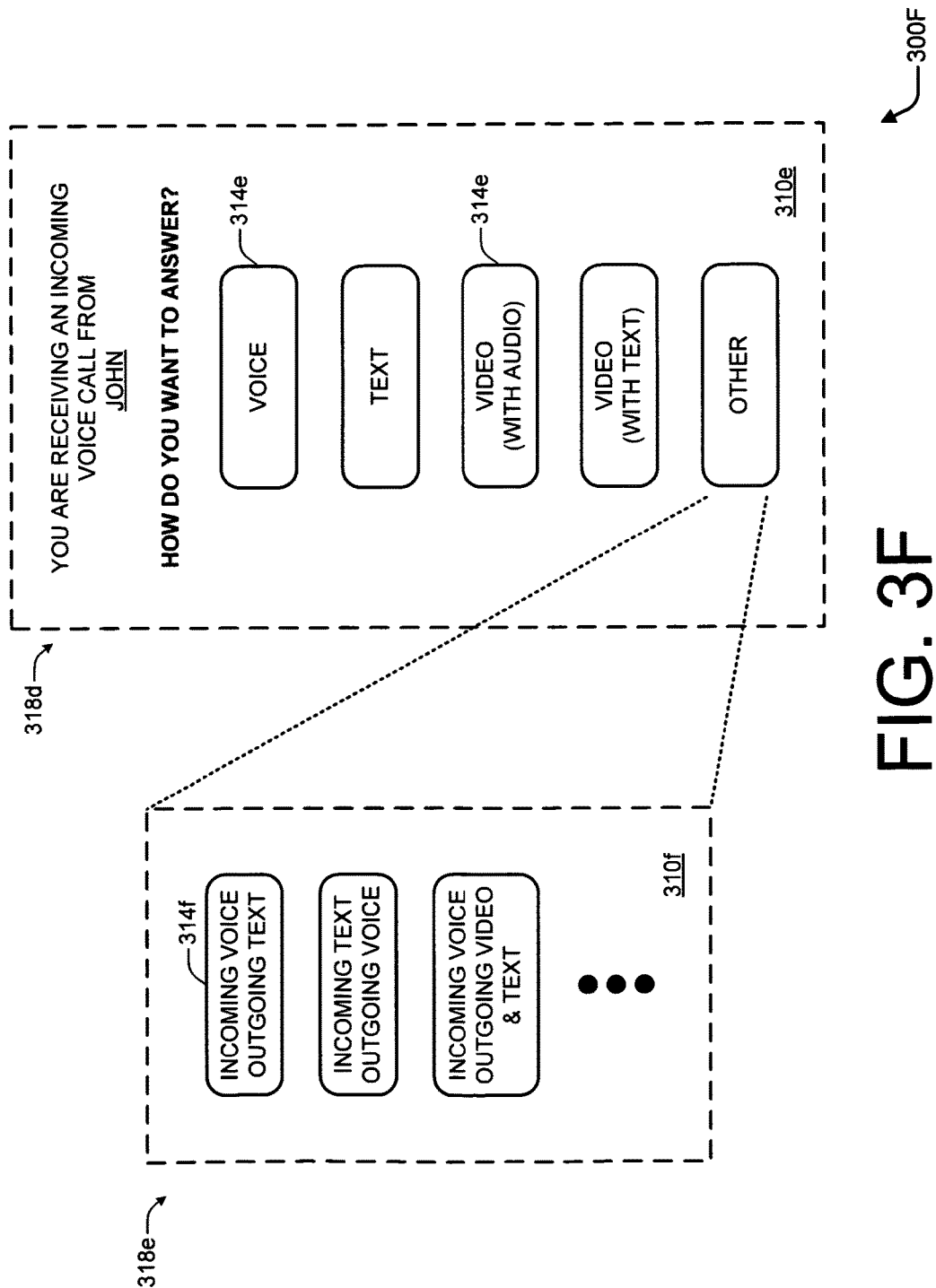

FIGS. 3D-3F are schematic diagrams 300D-300F of example user interface features in accordance with certain example embodiments. As shown in FIGS. 3D-3F, by way of example but not limitation, schematic diagrams 300D-300F may include one or more example user interface features 310a-310f. More specifically, schematic diagram 300D illustrates example user interface features 310a or 310b that may be implemented at least partially as physical components 316. Schematic diagram 300E illustrates example user interface features 310c or 310d that may be implemented at least partially as virtual components 318. Schematic diagram 300F illustrates example user interface features 310e or 310f that may be implemented at least partially as virtual components 318. Schematic diagrams 300D-300F also illustrate examples of communication modality options 314. However, claimed subject matter is not limited to any particular described embodiments, implementations, examples, etc.

For certain example embodiments, as shown in schematic diagram 300D of FIG. 3D, a user interface feature 310a is illustrated. User interface feature 310a may comprise a dial or knob 316e that enables a user to adjust an intimacy setting 204 (e.g., of FIGS. 2, 3A, and 3B). For an example implementation, intimacy knob 316e may be rotated to any of five different communication modalities A, B, C, D, or E. Each respective communication modality A, B, C, D, or E may be represented by a respective communication modality option 314a. (For the sake of visual clarity, each communication modality option 314 may not be separately identified by reference number in each schematic diagram. For instance, one of five communication modality options 314a is explicitly identified for user interface feature 310a.) Each communication modality may correspond, by way of example but not limitation, to a type of user interaction with a communication device, to a type of user interaction with a communication device for user input interaction or user output interaction, any combination thereof, and so forth.

For certain example embodiments, as shown in schematic diagram 300D of FIG. 3D, a user interface feature 310b is illustrated. User interface feature 310b may comprise a slider 316f that enables a user to adjust an intimacy setting. For an example implementation, slider 316f may be slid to any of three different communication modalities that correspond to different degrees of communicative exposure: a first degree, a second degree, or a third degree. Each communicative exposure degree may be represented by a respective communication modality option 314b. Each communication modality may correspond, by way of example but not limitation, to textual communication, speech communication, video communication at a first resolution, video communication at a second higher resolution, video communication with stereoscopic (e.g., 3D) images, facial video communication, full-body video communication, any combination thereof, and so forth. Although shown and described in terms of a physical component 316, a dial 316e or a slider 316f may additionally or alternatively be implemented as a virtual component 318 (e.g., that is displayed on a screen).

For certain example embodiments, as shown in schematic diagram 300E of FIG. 3E, a user interface feature 310c is illustrated. User interface feature 310c may comprise a display 318b that is separated into user input interaction (e.g., at an upper row) and into user output interaction (e.g., at a lower row). For an example implementation, one or more communication modalities that are presented (e.g., in a menu or arrived via a menu) may be selected for user input interaction or user output interaction via one or more buttons (e.g., "radio-style" buttons, but multiple ones of such buttons may be selected as shown in the lower row). Display 318b may be presented to a user so that a user may adjust input or output communication modalities, which may be represented by one or more communication modality options 314c. By way of example but not limitation, a user may select video, voice, or text. As shown for example user interface feature 310c, a user has selected to provide input to a communication device as text but to accept output from a communication device as video, voice, or text. A user may make such selections if, for instance, a user is at home and may see, hear, read, etc. incoming communicative signals but wishes to limit outgoing communicative signals because the user has not yet made themselves professionally presentable.

For certain example embodiments, as shown in schematic diagram 300E of FIG. 3E, a user interface feature 310d is illustrated. User interface feature 310d may comprise a display 318c that is presented in response to receiving an incoming communication that corresponds to, e.g., a first communication modality. A communication device may ask a user if the user wishes to attempt to continue the communication using one or more communication modality options 314d. For an example implementation, one or more communication modality options 314d may be presented to a user via a scrolling menu as shown. A user may scroll through communication modality options 314d until a desired communication modality option is identified and selected. As shown, a second communication modality option may be highlighted for selection by a user via a touch, a movement of a physical component, some combination thereof, and so forth.

For certain example embodiments, as shown in schematic diagram 300F of FIG. 3F, a user interface feature 310e is illustrated. User interface feature 310e may comprise a display 318d having a pop-up menu that is presented to a user if, by way of example but not limitation, an incoming voice call from a particular person (e.g., "John") is received. A communication device may inquire as to how a user wishes to answer John's incoming voice call. Multiple communication modality options 314e are shown as virtual buttons that may be selected. By way of example but not limitation, available communication modality options may comprise "Voice", "Text", "Video (with Audio)", "Video (with Text)", "Other", and so forth. If a local user selects "Video (with Text)", for instance, a local communication device may answer the voice call and offer to continue the communication with a remote user under a condition that the local user may interact with the local communication device in accordance with video and text (e.g., which might be desired if a local user is currently located in a noisy environment).

For certain example embodiments, as shown in schematic diagram 300F of FIG. 3F, a user interface feature 310f is illustrated. User interface feature 310f may comprise a display 318e having another pop-up menu, which may be presented if a user selects an "Other" button of user interface feature 310e. Multiple communication modality options 314f are shown as virtual buttons that may be selected. By way of example but not limitation, available communication modality options may comprise "Incoming Voice-Outgoing Text", "Incoming Text-Outgoing Voice", and "Incoming Voice-Outgoing Video & Text", and so forth. If a user selects an "Incoming Voice-Outgoing Text" button, for instance, a user may interact with a local device in accordance with voice communications for device output interaction and may interact with the local device in accordance with textual communications for device input interaction.

Multiple different embodiments may additionally or alternatively be implemented. For example, degrees of communicative exposure (e.g., of communication modality options 314b) may be presented as radio-style buttons (e.g., like communication modality options 314c). As another example, display(s) at least similar or analogous to display 318c, 318d, or 318e may be presented to establish at least one intimacy setting 204 prior to arrival of an incoming communication notification. As yet another example, communication modality options 314e (e.g., of user interface feature 310e) or communication modality options 314c (e.g., of user interface feature 310c) may be presented as a slider interface (e.g., as shown in schematic diagram 300D as part of user interface feature 310b). As another example, a user interface feature 310 may be accessible via a widget of a communication device 102. However, claimed subject matter is not limited to any particular described embodiments, implementations, examples, etc.

Figure 4A:
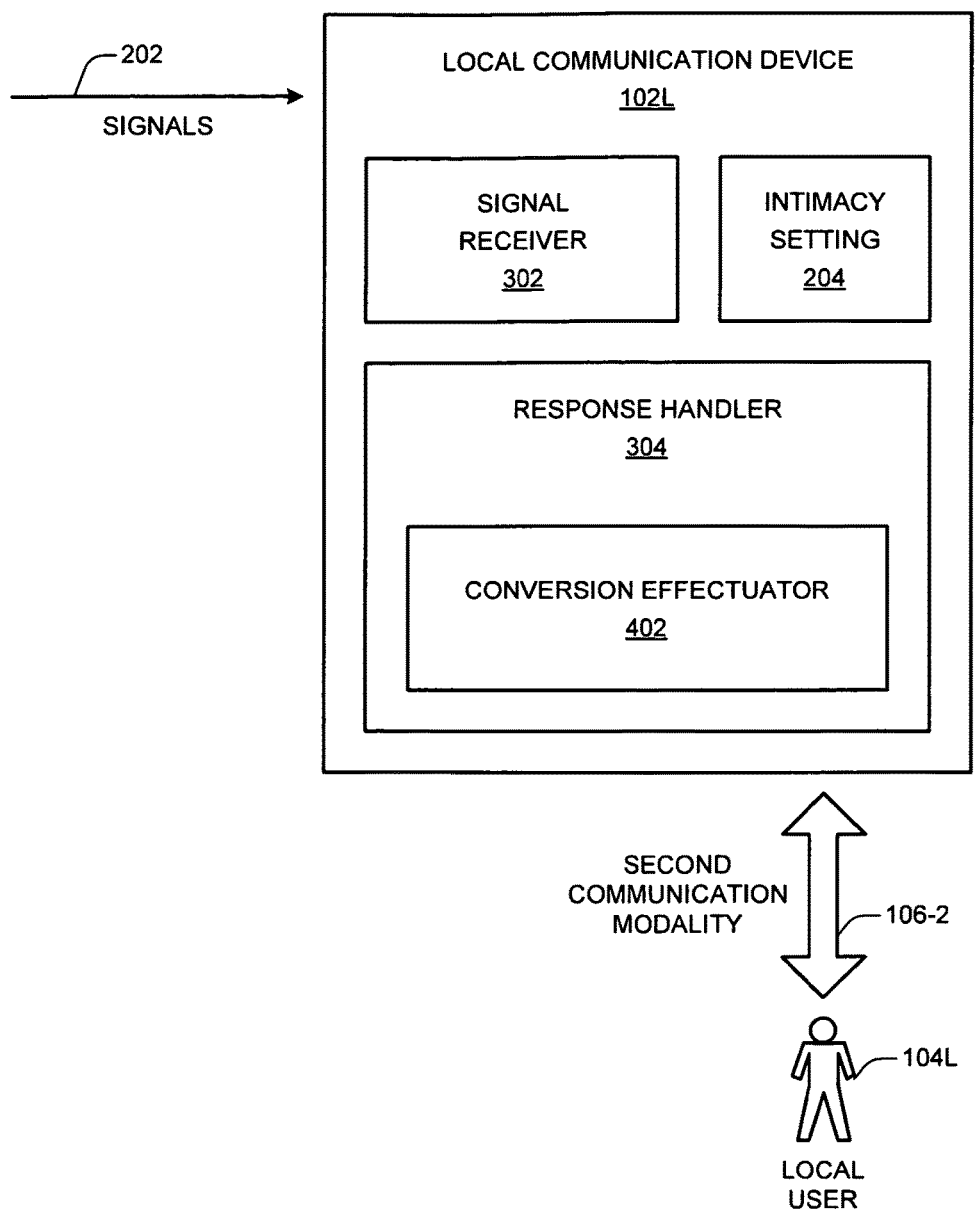
FIG. 4A is schematic diagram of a communication device that may be participating in a communication using an example response handler having a conversion effectuator in accordance with certain example embodiments.

FIG. 4A is schematic diagram 400A of a communication device that may be participating in a communication using an example response handler having a conversion effectuator in accordance with certain example embodiments. As shown in FIG. 4A, by way of example but not limitation, schematic diagram 400A may include a local communication device 102L, a local user 104L, a second communication modality 106-2, or one or more signals 202. More specifically, a local communication device 102L of schematic diagram 400A may include at least one intimacy setting 204, a signal receiver 302, or a response handler 304, which may include a conversion effectuator 402.

For certain example embodiments, a conversion effectuator 402 may cause a conversion of a correspondence with one communication modality to a correspondence with another communication modality. By way of example but not limitation, a conversion effectuator 402 may cause a conversion (e.g., of signals, such as one or more signals 202) from a correspondence with a first communication modality 106-1 to a correspondence with a second communication modality 106-2, may cause a conversion (e.g., of signals derived from user input of local user 104L) from a correspondence with a second communication modality 106-2 to a correspondence with a first communication modality 106-1, some combination thereof, and so forth. Example implementations with respect to a conversion effectuator 402 are described herein below with particular reference to at least FIGS. 4B and 4C. Additional or alternative implementations are described herein below with respect to at least FIGS. 6A-6K.

Figure 4B:
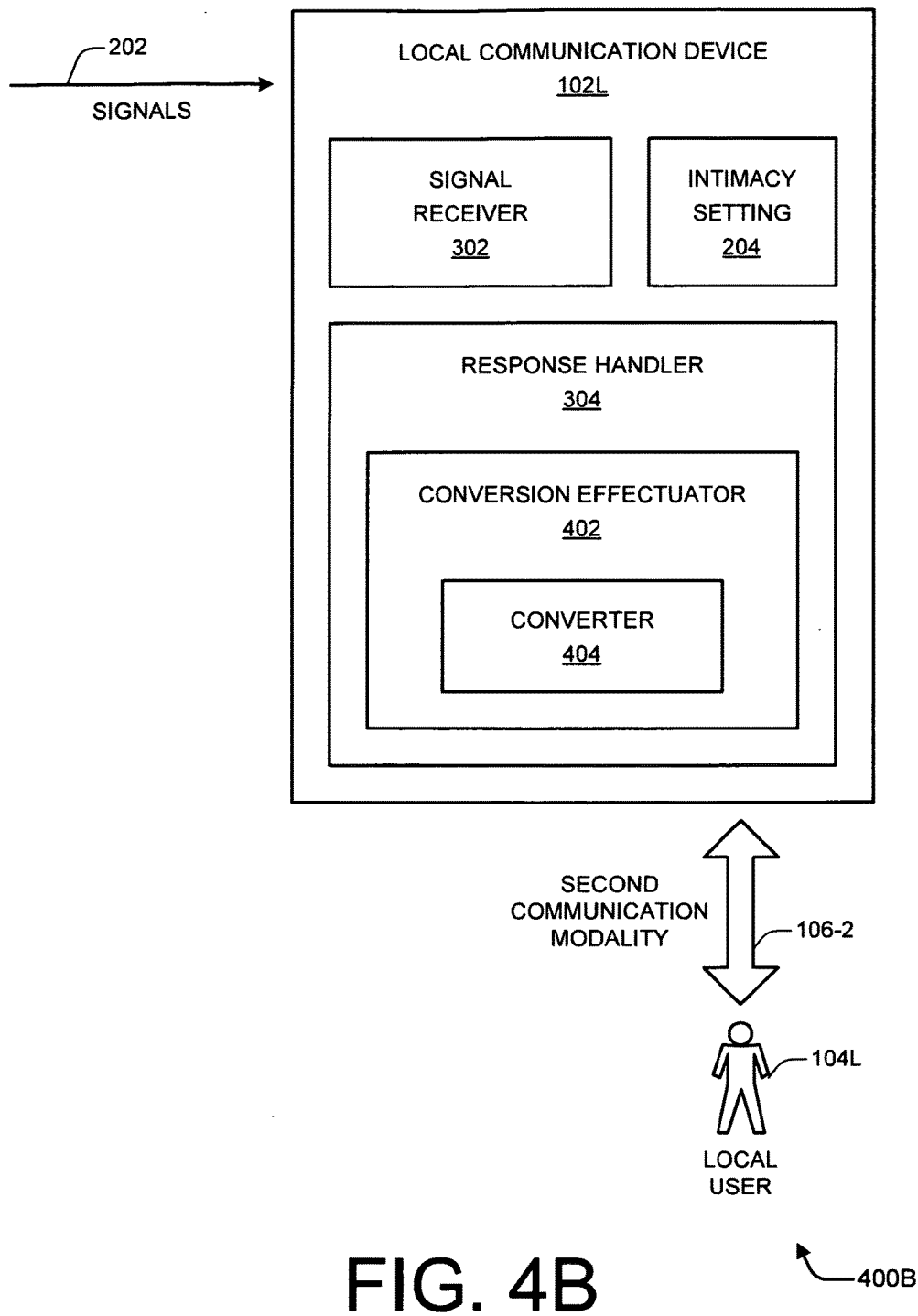
FIG. 4B is schematic diagram of a communication device that may be participating in a communication using an example conversion effectuator having a converter in accordance with certain example embodiments.

FIG. 4B is schematic diagram 400B of a communication device that may be participating in a communication using an example conversion effectuator having a converter in accordance with certain example embodiments. As shown in FIG. 4B, by way of example but not limitation, schematic diagram 400B may include a local communication device 102L that includes at least one intimacy setting 204, a signal receiver 302, or a response handler 304. More specifically, a local communication device 102L of schematic diagram 400B may include a response handler 304 having a conversion effectuator 402, which may include a converter 404.

For certain example embodiments, a converter 404 may perform a conversion of a correspondence with one communication modality to a correspondence with another communication modality. By way of example but not limitation, a converter 404 may perform a conversion (e.g., of signals) from a correspondence with a first communication modality 106-1 to a correspondence with a second communication modality 106-2, may perform a conversion (e.g., of signals) from a correspondence with a second communication modality 106-2 to a correspondence with a first communication modality 106-1, some combination thereof, and so forth. Additional or alternative implementations are described herein.

Figure 4C:
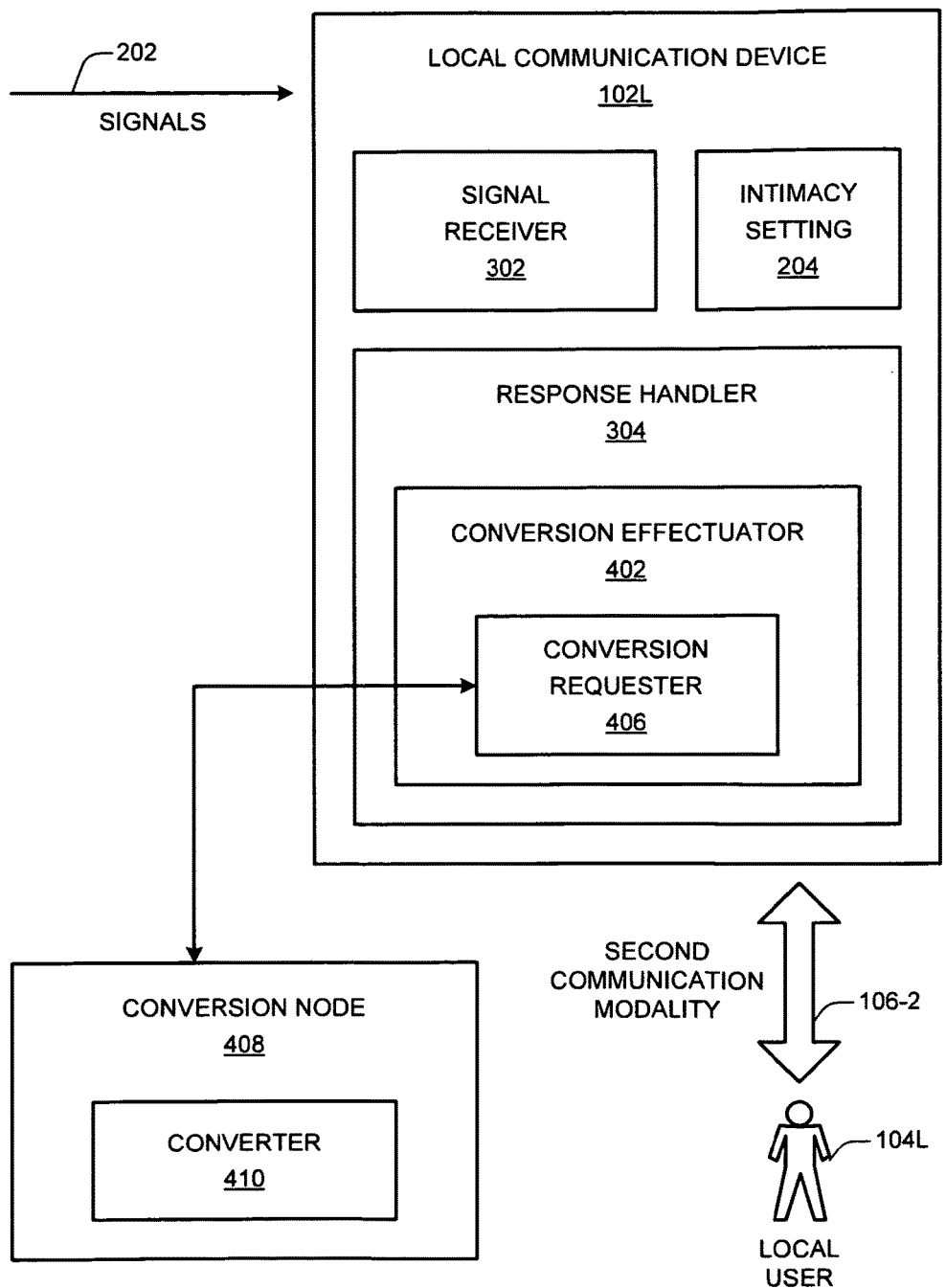
FIG. 4C is schematic diagram of a communication device that may be participating in a communication using an example conversion effectuator having a conversion requester in accordance with certain example embodiments.

FIG. 4C is schematic diagram 400C of a communication device that may be participating in a communication using an example conversion effectuator having a conversion requester in accordance with certain example embodiments. As shown in FIG. 4C, by way of example but not limitation, schematic diagram 400C may include a local communication device 102L that includes at least one intimacy setting 204, a signal receiver 302, or a response handler 304. More specifically, a local communication device 102L of schematic diagram 400C may include a response handler 304 having a conversion effectuator 402, which may include a conversion requester 406. Furthermore, by way of example but not limitation, schematic diagram 400C may include a conversion node 408, which may include a converter 410.

For certain example embodiments, a conversion effectuator 402 may cause a conversion of a correspondence with one communication modality to a correspondence with another communication modality based, at least partly, on one or more interactions with a conversion node 408 using a conversion requester 406. For certain example implementations, a conversion node may be external to local communication device 102L. A conversion node 408 may comprise, by way of example but not limitation, a telecommunications node (e.g., a telecom switch or router, a base station, a base station controller, a mobile switching center, a public switched telephone network node, a gateway to a telecommunications network, some combination thereof, etc.), an Internet node (e.g., a switch, a router, a server, a server blade, a virtual server machine, a combination thereof, etc.), a local area network (LAN) node, a computer, some combination thereof, and so forth.

For certain example embodiments, conversion requester 406 may transmit one or more signals (e.g., one or more signals 202 or a derivative thereof) corresponding to a first communication modality 106-1 to conversion node 408. Using converter 410, conversion node 408 may perform a conversion (e.g., of signals) from a correspondence with a first communication modality 106-1 to a correspondence with a second communication modality 106-2. Conversion node 408 may transmit one or more signals corresponding to a second communication modality 106-2 to conversion effectuator 402 (e.g., to conversion requester 406) of local communication device 102L. Additionally or alternatively, conversion requester 406 may transmit one or more signals corresponding to a second communication modality 106-2 to conversion node 408. Using converter 410, conversion node 408 may perform a conversion (e.g., of signals) from a correspondence with a second communication modality 106-2 to a correspondence with a first communication modality 106-1. Conversion node 408 may transmit one or more signals corresponding to a first communication modality 106-1 to conversion effectuator 402 (e.g., to conversion requester 406) of local communication device 102L. However, claimed subject matter is not limited to examples as described herein.

FIGS. 4D, 4E, 4F, and 4G depict different example sequence diagrams 400D, 400E, 400F, and 400G, respectively, for example multi-modality communications. As shown, by way of example but not limitation, each sequence diagram may include a remote communication device 102R or a local communication device 102L, as well as multiple actions. Although actions of sequence diagrams 400D, 400E, 400F, and 400G are shown or described in a particular sequence, it should be understood that methods or processes may be performed in alternative manners without departing from claimed subject matter, including, but not limited to, with a different sequence or number of actions, with a different relationship between or among actions, with a different communication device (or node) performing action(s). Also, at least some actions of sequence diagrams 400D, 400E, 400F, and 400G may be performed so as to be fully or partially overlapping with other action(s) in a temporal sense, in a communication sense (e.g., over one or more channels), in a processing sense (e.g., using multiple cores, multitasking, a combination thereof, etc.), some combination thereof, and so forth. By way of example only, a given communication may comprise a fully or partially duplex communication, thereby enabling independent or overlapping transmissions or receptions.

As depicted, by way of example but not limitation, each example multi-modality communication includes a communication that may be initiated by a remote communication device 102R. However, multi-modality communications may alternatively or additionally include communications that may be initiated by a local communication device 102L. As illustrated, by way of example but not limitation, each example multi-modality communication may involve two communication modalities including voice interaction and text interaction. However, multi-modality communications may alternatively or additionally involve two or more communication modalities that include voice interaction, text interaction, video interaction, any combination thereof, and so forth. As shown, by way of example but not limitation, a local communication device 102L, in conjunction with an indication from a local user 104L, may determine that a communication is to be a multi-modality communication at or around when a communication is initiated. However, a remote communication device 102R may additionally or alternatively determine that a communication is to be a multi-modality communication. Furthermore, a communication may be migrated to a multi-modality communication at virtually any time during a communication. Moreover, a communication device may additionally or alternatively initiate a communication as a multi-modality communication.

For certain example embodiments, sequence diagrams 400D, 400E, 400F, and 400G may include one or more transmissions or receptions. Transmissions or receptions may be made, by way of example but not limitation, from or to a remote communication device 102R or from or to a local communication device 102L. A given transmission or reception may be made via any one or more channels 108 (e.g., of FIG. 1). Examples of channels may include, but are not limited to, a voice connection channel, a voice data channel, a voice over internet protocol (VOIP) channel, a packet data channel, a signaling channel, a channel over the Internet, a cellular-text-messaging channel, any combination thereof, and so forth. Additionally or alternatively, although two communication devices are shown as participating in a given communication, more than two communication devices or more than two users may participate in a given communication.

Figure 4D:
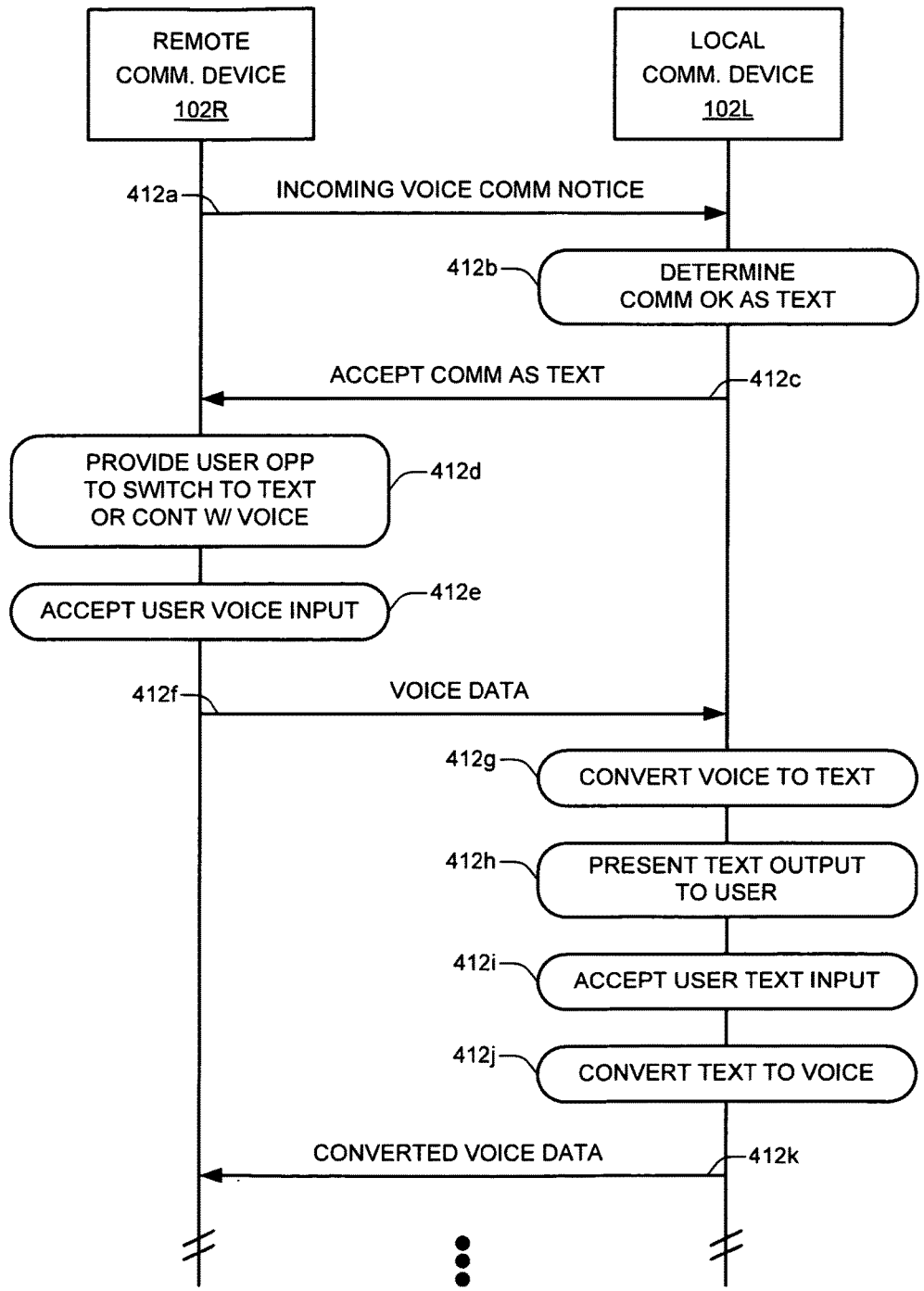
FIG. 4D is a sequence diagram of an example multi-modality communication in which conversion occurs at a local communication device.

FIG. 4D is a sequence diagram 400D of an example multi-modality communication in which conversion occurs at a local communication device. As shown in FIG. 4D, by way of example but not limitation, one or more of actions 412a-412k may be performed for a communication. For an example sequence diagram 400D, a local communication device 102L may cause two conversions to be performed.

For certain example embodiments, at action 412a, a remote communication device 102R may transmit or a local communication device 102L may receive a notification of an incoming communication that corresponds to voice. By way of example but not limitation, a notification may comprise a text message, a ringing signal, a communication inquiry, a communication notice, any combination thereof, and so forth. At action 412b, local communication device 102L may determine that the communication may continue in a manner that is at least partially corresponding to text. For certain example implementations, local communication device 102L may make a determination based, at least partly, on an existing intimacy setting (e.g., on a current default intimacy setting), on a contemporaneous intimacy setting indication provided by local user 104L (e.g., by a local user without prompting, by a local user in response to options presented by a local communication device in conjunction with presentation of a call notification to the local user, some combination thereof, etc.), any combination thereof, and so forth.

For certain example embodiments, at action 412c, a local communication device 102L may transmit or a remote communication device 102R may receive a message indicating that a communication is accepted if it may correspond at least partially to text. At action 412d, a remote communication device 102R may provide a remote user 104R with an opportunity to switch to text (e.g., to establish a single-modality textual communication), with an opportunity to continue a communication with remote user interactivity including voice (e.g., to establish a dual-modality voice and textual communication), with an opportunity to propose a different one or more interactivity-types of communication(s), any combination thereof, and so forth. For certain examples as described herein, with respect to action 412d, it is given that a remote user 104R elects to continue a communication as a multi-modality communication with voice interaction for remote user 104R and (at least partial) textual interaction for local user 104L.

For certain example embodiments, at action 412e, a remote communication device 102R may accept user voice input. For an example implementation, a remote communication device 102R may enable voice interaction with a remote user 104R by accepting voice input via at least one user input interface 516a (e.g., of FIG. 5), such as at least one microphone. At action 412f, a remote communication device 102R may transmit or a local communication device 102L may receive voice data.

For certain example embodiments, at action 412g, a local communication device 102L may cause a conversion of voice data (e.g., as received from a remote communication device 102R) to text data. For an example implementation, a local communication device 102L may cause a conversion from voice data to text data using a converter 404 (e.g., of FIG. 4B), using a conversion requester 406 (e.g., of FIG. 4C) (e.g., that communicates with a conversion node 408 having a converter 410), any combination thereof, and so forth. At action 412h, a local communication device 102L may present text output (e.g., as converted as a result of action 412g) to a local user 104L. For an example implementation, a local communication device 102L may display text to a local user 104L via at least one user output interface 516b (e.g., of FIG. 5), such as at least one display screen. At action 412i, a local communication device 102L may accept user text input. For an example implementation, a local communication device 102L may accept text input from a local user 104L via at least one user input interface 516a, such as a physical or virtual keyboard. A user input interface 516a for accepting text input may alternatively or additionally comprise a text message application, a text message module of an operating system, a general text entry application, a general text entry module of an operation system, a specialized text entry application, a specialized text entry module of operating system, any combination thereof, and so forth. A specialized text entry application or operating system module may, by way of example but not limitation, be linked to a voice capability (e.g., a calling feature) or video capability or be designed at least partially to implement multi-modality communications in accordance with certain embodiments that are described herein.

For certain example embodiments, at action 412j, a local communication device 102L may cause text data of accepted text to be converted to voice data. For an example implementation, a local communication device 102L may cause a conversion from text to voice using a converter 404 (e.g., of FIG. 4B), using a conversion requester 406 (e.g., of FIG. 4C), any combination thereof, and so forth. At action 412k, a local communication device 102L may transmit or a remote communication device 102R may receive converted voice data. A remote communication device 102R may present the converted voice data (e.g., play the voice data over one or more speakers) in accordance with a voice communication modality of interaction by remote user 104R at remote communication device 102R.

Figure 4E:
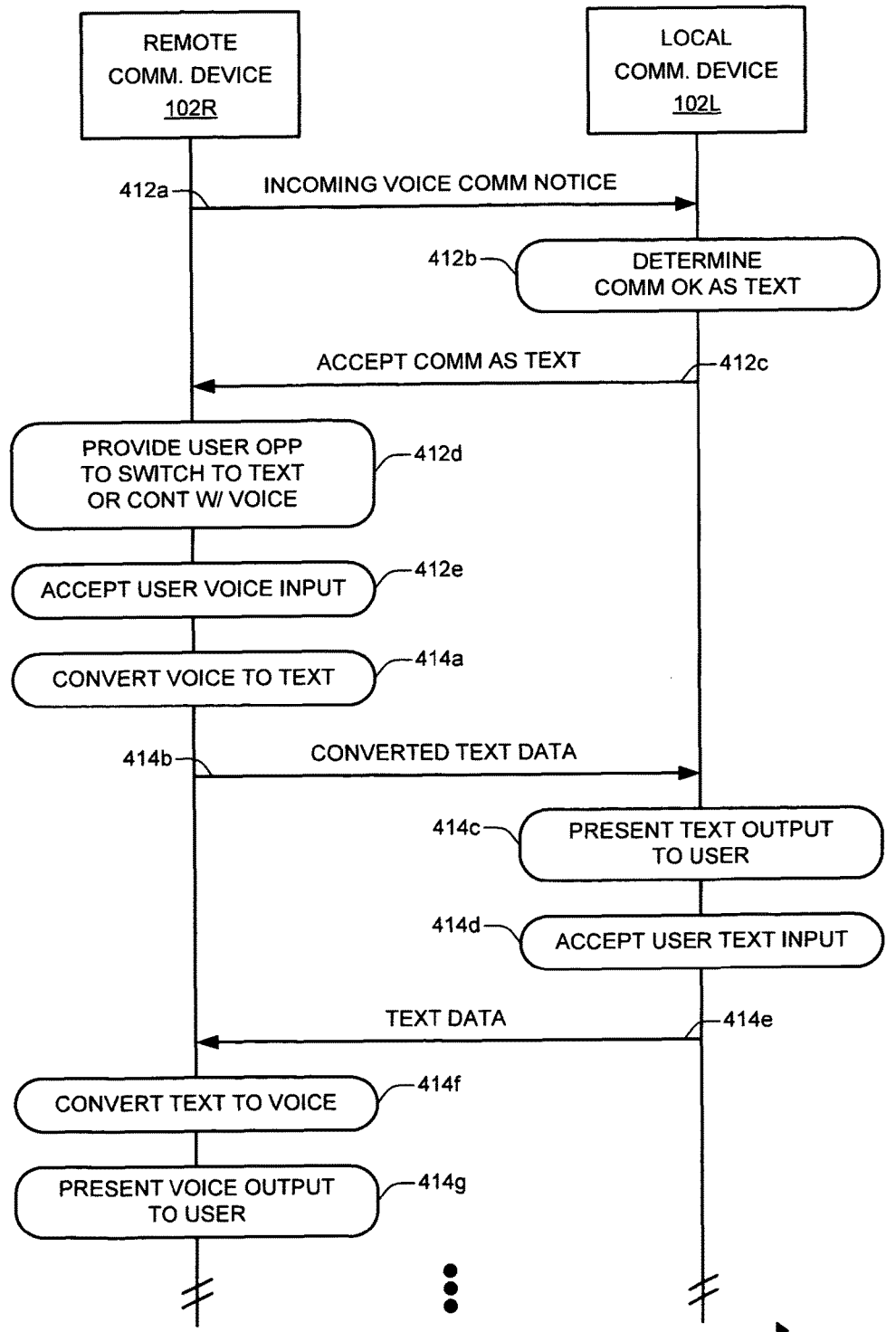
FIG. 4E is a sequence diagram of an example multi-modality communication in which conversion occurs at a remote communication device.

FIG. 4E is a sequence diagram 400E of an example multi-modality communication in which conversion occurs at a remote communication device. As shown in FIG. 4E, by way of example but not limitation, one or more of actions 412a-412e or 414a-414g may be performed for a communication. For an example sequence diagram 400E, a remote communication device 102R may cause two conversions to be performed. Actions 412a-412e of sequence diagram 400E may be at least similar or analogous to actions 412a-412e, respectively, of sequence diagram 400D.

For certain example embodiments, at action 412e, a remote communication device 102R may accept user voice input. For an example implementation, a remote communication device 102R may enable voice interaction with a remote user 104R by accepting voice input via at least one user input interface 516a (e.g., of FIG. 5), such as at least one microphone. At action 414a, a remote communication device 102R may cause a conversion of voice data (e.g., as accepted from a remote user 104R) to text data. For an example implementation, a remote communication device 102R may cause a conversion using a converter 404 (e.g., of FIG. 4B), using a conversion requester 406 (e.g., of FIG. 4C), any combination thereof, and so forth.

For certain example embodiments, at action 414b, a remote communication device 102R may transmit or a local communication device 102L may receive converted text data. At action 414c, a local communication device 102L may present text output to a local user 104L. For an example implementation, a local communication device 102L may display converted text to a local user 104L via at least one user output interface 516b (e.g., of FIG. 5), such as at least one display screen, wherein the converted text was caused to be converted from voice data by a remote communication device 102R. A user output interface 516b for presenting text output may alternatively or additionally comprise a text message application, a text message module of an operating system, a general text output application, a general text output module of an operation system, a specialized text output application, a specialized text output module of operating system, any combination thereof, and so forth. A specialized text output application or operating system module may, by way of example but not limitation, be linked to a voice capability (e.g., a calling feature) or video capability or be designed at least partially to implement multi-modality communications in accordance with certain embodiments that are described herein. A user input interface 516a for accepting text input may be separate from or fully or partially combined with a user output interface 516b for presenting text output. At action 414d, a local communication device 102L may accept user text input. At action 414e, a local communication device 102L may transmit or a remote communication device 102R may receive text data.

For certain example embodiments, at action 414f, a remote communication device 102R may cause received text data to be converted to voice data. For an example implementation, a remote communication device 102R may cause a conversion from text to voice using a converter 404 (e.g., of FIG. 4B), using a conversion requester 406 (e.g., of FIG. 4C), any combination thereof, and so forth. At action 414g, a remote communication device 102R may present voice data (e.g., as converted from received text data as a result of action 414f) to a remote user 104R. For an example implementation, a remote communication device 102R may present voice data as converted from text data to a remote user 104R via at least one user output interface 516b (e.g., of FIG. 5), such as at least one speaker.

For certain example implementations, e.g.—as described with reference to sequence diagram 400E, text data is transmitted between remote communication device 102R and local communication device 102L. Text data may consume less bandwidth than voice data (or less than video data). Generally, transmission of data corresponding to one type of communication modality may consume less bandwidth than transmission of data corresponding to another type of communication modality. Accordingly, a determination or selection of a location or a communication device at which to perform a conversion of data corresponding to one communication modality to data corresponding to another communication modality may be based, at least in part, on a bandwidth consumed by data of each communication modality. By way of example but not limitation, a location or communication device for conversion may be determined or selected such that relatively lower bandwidth data is transmitted.

Figure 4F:
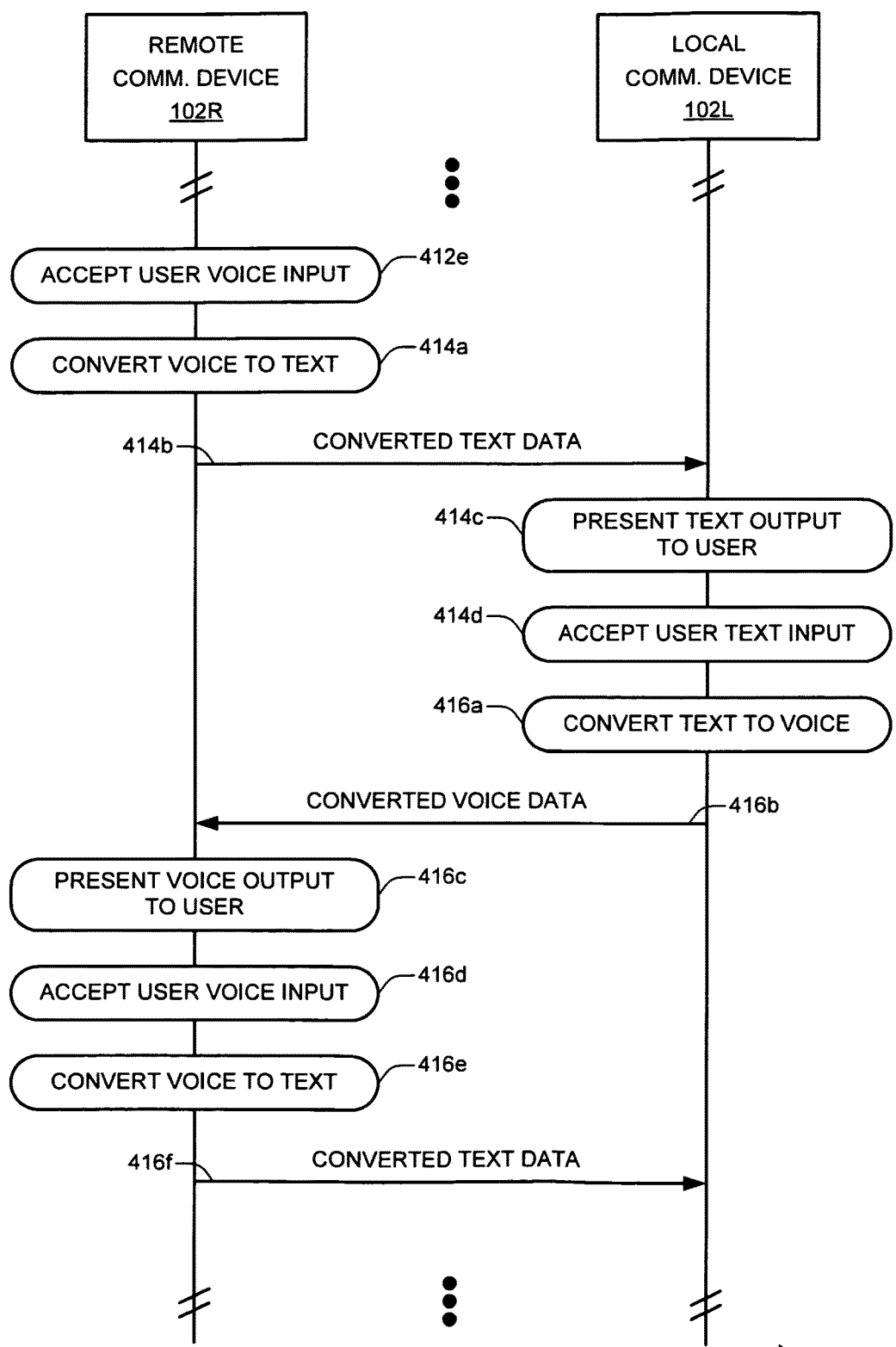
FIG. 4F is a sequence diagram of an example multi-modality communication in which conversion occurs at a local communication device and at a remote communication device.

FIG. 4F is a sequence diagram 400F of an example multi-modality communication in which conversion occurs at a local communication device and at a remote communication device. As shown in FIG. 4F, by way of example but not limitation, one or more of actions 412a-412e, 414a-414d, or 416a-416f may be performed for a communication. For an example sequence diagram 400F, a remote communication device 102R may cause a conversion to be performed, and a local communication device 102L may cause a conversion to be performed. Action 412e (plus actions 412a-412d, which are not shown in FIG. 4F for the sake of clarity) of sequence diagram 400E and actions 414a-414d may be at least similar or analogous to actions 412e (plus 412a-412d) of sequence diagram 400O and actions 414a-414d of sequence diagram 400E, respectively.

For certain example embodiments, at action 414a, a remote communication device 102R may cause a conversion of voice data (e.g., as accepted from a remote user 104R at action 412e) to text data. At action 414b, a remote communication device 102R may transmit or a local communication device 102L may receive converted text data. At action 414c, a local communication device 102L may present text data as text output to a local user 104L, which text data may comprise converted text data that was caused to be converted from voice data by another communication device, such as a remote communication device 102R. At action 414d, a local communication device 102l may accept user text input. At action 416a, a local communication device 102L may cause text data of accepted text to be converted to voice data. At action 416b, a local communication device 102l may transmit or a remote communication device 102R may receive converted voice data.

For certain example embodiments, at action 416c, a remote communication device 102R may present voice data as voice output to a remote user 104R, which voice data may comprise converted voice data that was caused to be converted by another communication device, such as local communication device 102L. At action 416d, a remote communication device 102R may accept user voice input. At action 416e, a remote communication device 102R may cause a conversion of voice data (e.g., as accepted from a remote user 104R) to text data. At action 416f, a remote communication device 102R may transmit or a local communication device 102L may receive converted text data.

Figure 4G:
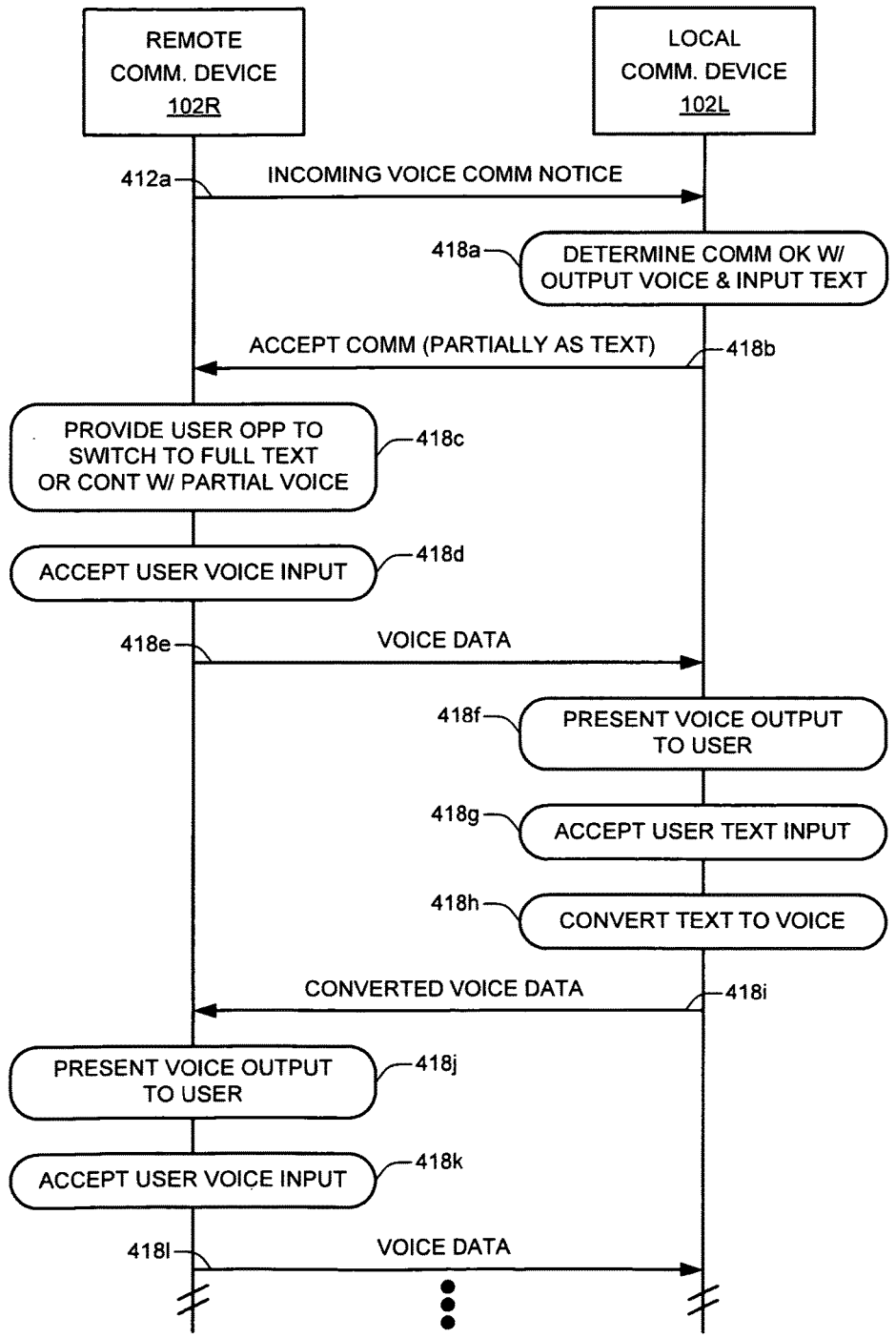
FIG. 4G is a sequence diagram of an example multi-modality communication in which conversion occurs at a local communication device and in which a multi-modality input/output interaction occurs at the local communication device.

FIG. 4G is a sequence diagram 400G of an example multi-modality communication in which conversion occurs at a local communication device and in which a multi-modality input/output interaction occurs at the local communication device. As shown in FIG. 4G, by way of example but not limitation, one or more of actions 412a or 418a-418k may be performed for a communication. For an example sequence diagram 400G, a local communication device 102L may cause a conversion to be performed. Action 412a of sequence diagram 400G may be at least similar or analogous to action 412a of sequence diagram 400D.

For certain example embodiments, at action 412a, a remote communication device 102R may transmit or a local communication device 102L may receive a notification of an incoming communication that corresponds to voice. At action 418a, local communication device 102L may determine that the communication may continue as at least partially corresponding to text. For certain example implementations, local communication device 102L may make a determination based, at least partly, on an existing intimacy setting (e.g., a current default intimacy setting), on a contemporaneous intimacy setting indication provided by local user 104L (e.g., by a local user without prompting, by a local user in response to options presented by a local communication device in conjunction with presentation of a call notification to the local user, some combination thereof, etc.), any combination thereof, and so forth.

For certain example embodiments, at least one user may engage in a multi-modality communication in which a user interacts with a communication device using two (or more) different communication modalities. For certain example implementations, a user may select to interact with a communication device via voice for input and via text for output. For instance, a user may speak to provide user voice input, but a user may read to acquire user text output for a single communication. As shown for an example of sequence diagram 400G, a user has instead selected for user output interaction to comprise voice and for user input interaction to comprise text. This may occur, for instance, if a user having a wireless or wired headset is located in an environment in which quiet is expected, such as a library or "quiet car" of a train. For a given communication, a user may be presented voice data output (e.g., may hear voice sounds) from another participant of the given communication, but may provide text input that is ultimately sent to the other participant (e.g., before or after conversion, if any, from text data to voice data).

For certain example embodiments, at action 418b, a local communication device 102L may transmit or a remote communication device 102R may receive a message indicating that a communication is accepted if it may correspond at least partially to text. For an example implementation, a message may indicate that a local user 104L intends to continue a communication by interacting with local communication device 102l via voice for user output and via text for user input. At action 418c, a remote communication device 102R may provide a remote user 104R with an opportunity to switch to full or partial text (e.g., to request to establish a single-modality textual communication, to establish that remote user 104R is willing to receive text output thereby obviating a conversion), with an opportunity to continue a communication with remote user interactivity including voice (e.g., to accept a multi-modality communication in which remote user 104R provides user input interaction via voice and accepts user output interaction via converted voice data), with an opportunity to propose a different one or more interactivity-types of communication(s), any combination thereof, and so forth. For certain examples described herein with respect to action 418*c*, it is given that a remote user 104R elects to continue a communication as a multi-modality communication with (i) voice input and voice output interaction for remote user 104R and (ii) textual input and voice output interaction for local user 104L.

For certain example embodiments, at action 418*d*, a remote communication device 102R may accept user voice input. At action 418*e*, a remote communication device 102R may transmit or a local communication device 102L may receive voice data. At action 418*f*, a local communication device 102L may present voice data to a local user 104L. For an example implementation, a local communication device 102L may present voice data (e.g., without conversion) to a local user 104L via at least one user output interface 516*b* (e.g., of FIG. 5), such as at least one speaker, including but not limited to a speaker of a headset. At action 418*g*, a local communication device 102L may accept user text input. For an example implementation, a local communication device 102L may accept text input from a local user 104L via at least one user input interface 516*a*, such as a physical or virtual keyboard. At action 418*h*, a local communication device 102L may cause text data of accepted text to be converted to voice data.

For certain example embodiments, at action 418*i*, a local communication device 102L may transmit or a remote communication device 102R may receive converted voice data. At action 418*j*, a remote communication device 102R may present voice data to a remote user 104R, which voice data may comprise converted voice data that was caused to be converted by another communication device, such as local communication device 102L. Additionally or alternatively, local communication device 102L may transmit (unconverted) text data to remote communication device 102R, and remote communication device 102R may cause text data to be converted to voice data prior to its presentation to remote user 104R. At action 418*k*, a remote communication device 102R may accept user voice input. At action 418*l*, a remote communication device 102R may transmit or a local communication device 102L may receive voice data.

For certain example embodiments, a communication may be initiated (e.g., by a remote communication device 102R or a local communication device 102L or another communication device) that is to be a multi-modality communication from a perspective of an initiating user or device alone. By way of example but not limitation, a remote user 104R of a remote communication device 102R may initiate a communication in which interaction by remote user 104R is to comprise text output interaction and voice input interaction (e.g., if a remote user 104R is located in a noisy environment and possesses noise canceling microphone(s) but no noise canceling speaker). By way of example but not limitation, a remote user 104R of a remote communication device 102R may instead initiate a communication in which interaction by remote user 104R is to comprise voice output interaction and text input interaction (e.g., remote user 104R is to receive voice output from a remote communication device 102R via at least one speaker but is to provide text input for a remote communication device 102R via at least one keyboard). For certain example implementations, a remote user 104R may initiate a voice communication and then subsequently send a message to migrate the voice communication to a multi-modality communication in which text is used for at least one of user input interaction or user output interaction for at least interaction by remote user 104R with remote communication device 102R. However, claimed subject matter is not limited to any particular example embodiments, implementations, etc. that are described herein or illustrated in the accompanying drawings (e.g., including but not limited to FIGS. 4D-4G).

Figure 5:
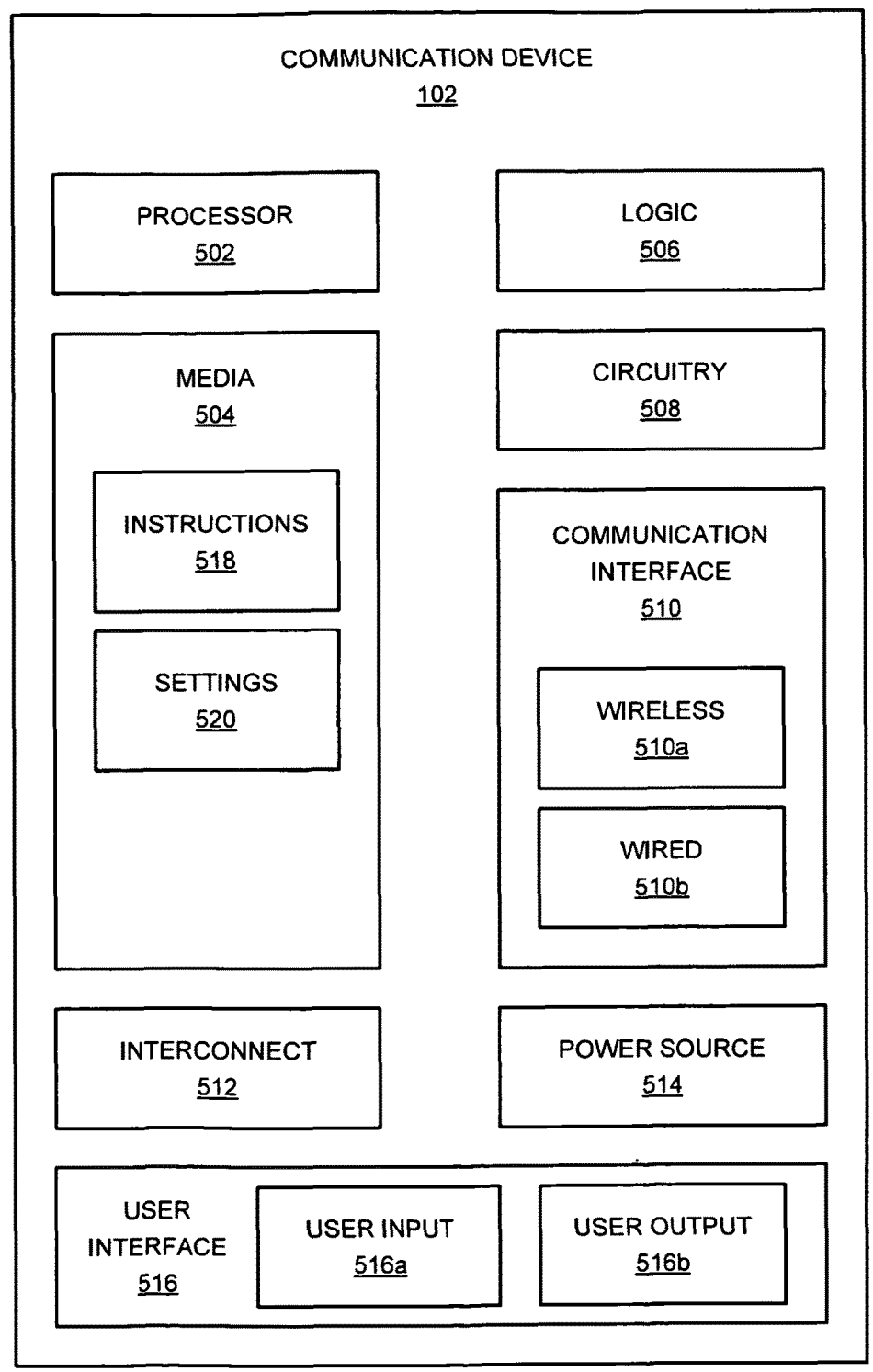
FIG. 5 is a schematic diagram of an example communication device including one or more example components in accordance with certain example embodiments.

FIG. 5 is a schematic diagram 500 of an example communication device including one or more example components in accordance with certain example embodiments. As shown in FIG. 5, a communication device 102 may include one or more components such as: at least one processor 502, one or more media 504, logic 506, circuitry 508, at least one communication interface 510, at least one interconnect 512, at least one power source 514, or at least one user interface 516, any combination thereof, and so forth. Furthermore, as shown in schematic diagram 500, one or more media may comprise one or more instructions 518, one or more settings 520, some combination thereof, and so forth; communication interface 510 may comprise at least one wireless communication interface 510*a*, at least one wired communication interface 510*b*, some combination thereof, and so forth; or user interface 516 may comprise at least one user input interface 516*a*, at least one user output interface 516*b*, some combination thereof, and so forth. However, a communication device 102 may alternatively include more, fewer, or different components from those that are illustrated without deviating from claimed subject matter.

For certain example embodiments, a communication device 102 may include or comprise at least one electronic device. Communication device 102 may comprise, for example, a computing platform or any electronic device having at least one processor or memory. Processor 502 may comprise, by way of example but not limitation, any one or more of a general-purpose processor, a specific-purpose processor, a digital signal processor (DSP), a processing unit, a combination thereof, and so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, a combination thereof, and so forth. Media 504 may bear, store, contain, provide access to, a combination thereof, etc. instructions 518, which may be executable by processor 502. Instructions 518 may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. Media 504 may comprise, by way of example but not limitation, processor-accessible or non-transitory media that is capable of bearing instructions, settings, a combination thereof, and so forth.

For certain example embodiments, execution of instructions 518 by one or more processors 502 may transform communication device 102 into a special-purpose computing device, apparatus, platform, or any combination thereof, etc. Instructions 518 may correspond to, for example, instructions that are capable of realizing at least a portion of one or more flow diagrams methods, processes, operations, functionality, technology, or mechanisms, etc. that are described herein or illustrated in the accompanying drawings. Settings 520 may comprise, by way of example but not limitation, one or more indicators that may be established by a user or other entity, one or more indicators that may determine at least partly how a communication device 102 is to operate or respond to situations, one or more indicators or other values that may be used to realize flow diagrams, methods, processes, operations, functionality, technology, or mechanisms, etc. that are described herein or illustrated in the accompanying drawings.

For certain example embodiments, logic 506 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry 508 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry 508 comprises at least one physical or hardware component or aspect.

For certain example embodiments, one or more communication interfaces 510 may provide one or more interfaces between communication device 102 and another device or a person/operator. With respect to a person/operator, a communication interface 510 may include, by way of example but not limitation, a screen, a speaker, a keyboard or keys, or other person-device input/output features. A communication interface 510 may also or alternatively include, by way of example but not limitation, a transceiver (e.g., transmitter or receiver), a radio, an antenna, a wired interface connector or other similar apparatus (e.g., a universal serial bus (USB) connector, a proprietary connector, a Thunderbolt® or Light Peak® connector, a combination thereof, etc.), a physical or logical network adapter or port, or any combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of communication device 102. Interconnect 512 may comprise, by way of example but not limitation, one or more buses, channels, switching fabrics, or combinations thereof, and so forth. Although not explicitly illustrated in FIG. 5, one or more components of communication device 102 may be coupled to interconnect 512 via a discrete or integrated interface. By way of example only, one or more interfaces may couple a communication interface 510 or a processor 502 to at least one interconnect 512. At least one power source 514 may provide power to components of communication device 102. Power source 514 may comprise, by way of example but not limitation, a battery, a power connector, a solar power source or charger, a mechanical power source or charger, a fuel source, any combination thereof, and so forth.

For certain example embodiments, a user interface 516 may enable one or more users to interact with communication device 102. Interactions between a user and device may relate, by way of example but not limitation, to touch/tactile/feeling/haptic sensory (e.g., a user may shake or move a device which may be detected by a gyroscope, an accelerometer, a compass, a combination thereof, etc; a user may press a button, slide a switch, rotate a knob, etc.; a user may touch a touch-sensitive screen; a device may vibrate; some combination thereof; etc.), to sound/hearing/speech sensory (e.g., a user may speak into a microphone, a device may generate sounds via a speaker, some combination thereof, etc.), to sights/vision sensory (e.g., a device may activate one or more lights, modify a display screen, a combination thereof, etc.), any combination thereof, and so forth.

For certain example embodiments, a user interface 516 may comprise a user interface input 516a, a user output interface 516b, a combination thereof, and so forth. A user input interface 516a may comprise, by way of example but not limitation, a microphone, a button, a switch, a dial, a knob, a wheel, a trackball, a key, a keypad, a keyboard, a touch-sensitive screen, a touch-sensitive surface, a camera, a gyroscope, an accelerometer, a compass, any combination thereof, and so forth. A user output interface 516b may comprise, by way of example but not limitation, a speaker, a screen (e.g., with or without touch-sensitivity), a vibrating haptic feature, any combination thereof, and so forth. Certain user interfaces 516 may enable both user input and user output. For example, a touch-sensitive screen may be capable of providing user output and accepting user input. Additionally or alternatively, a user interface component (e.g., that may be integrated with or separate from a communication device 102), such as a headset that has a microphone and a speaker, may enable both user input and user output.

It should be understood that for certain example implementations components illustrated separately in FIG. 5 are not necessarily separate or mutually exclusive. For example, a given component may provide multiple functionalities. By way of example only, a single component such as a USB connector may function as a wired communication interface 510b and a power source 514. Additionally or alternatively, a single component such as a display screen may function as a communication interface 510 with a user, as a user input interface 516a, or as a user output interface 516b. Additionally or alternatively, one or more instructions 518 may function to realize at least one setting 520.

It should also be understood that for certain example implementations components illustrated in schematic diagram 500 or described herein may not be integral or integrated with a communication device 102. For example, a component may be removably connected to a communication device 102, a component may be wirelessly coupled to a communication device 102, any combination thereof, and so forth. By way of example only, instructions 518 may be stored on a removable card having at least one medium 504. Additionally or alternatively, a user interface 516 (e.g., a wired or wireless headset, a screen, a video camera, a keyboard, a combination thereof, etc.) may be coupled to communication device 102 wirelessly or by wire. For instance, a user may provide user input or accept user output corresponding to a voice communication modality to or from, respectively, a communication device 102 via a wireless (e.g., a Bluetooth®) headset.

Figure 6:
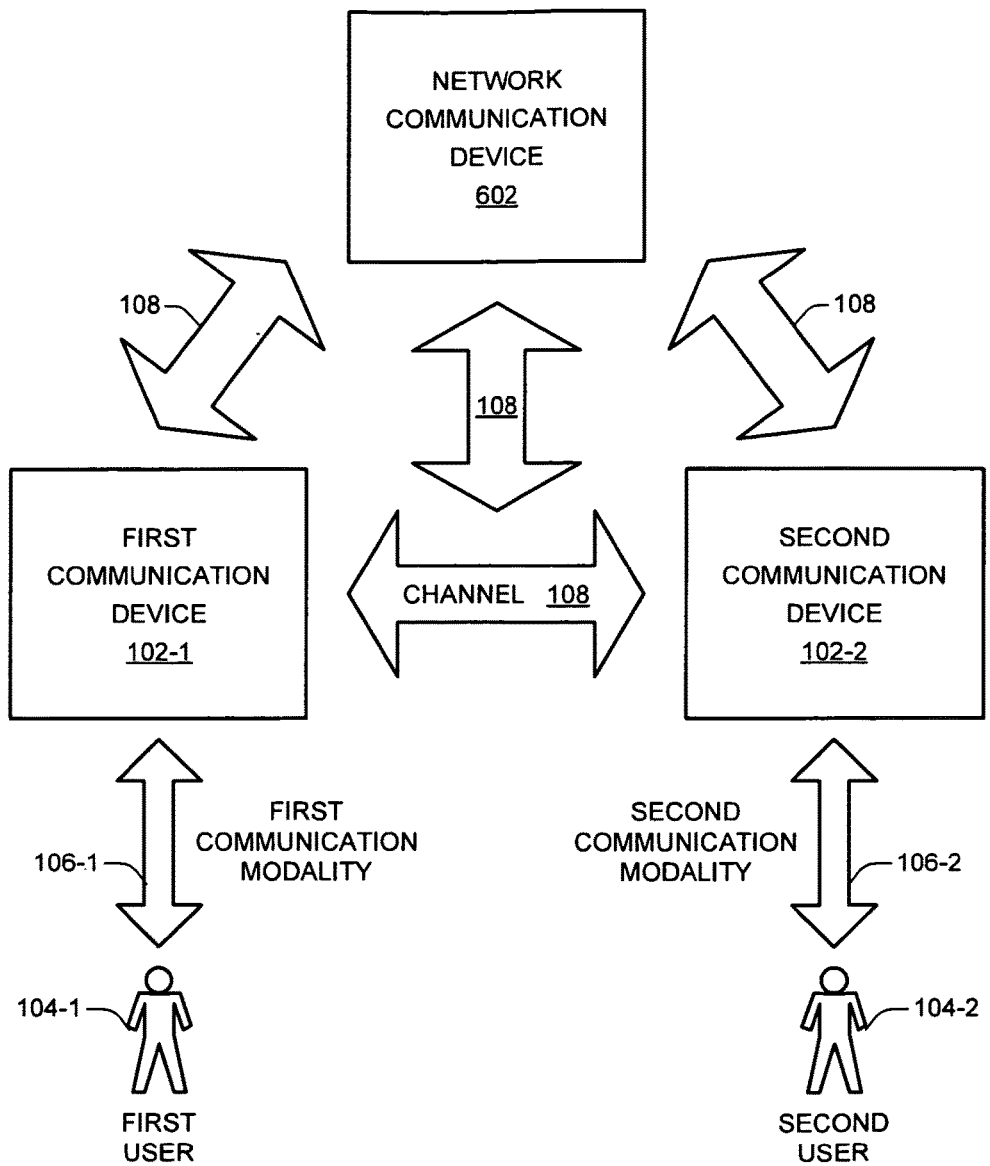
FIG. 6 is an example schematic diagram of a network communication device and two communication devices that may be participating in a communication flow in accordance with certain example embodiments.

FIG. 6 is an example schematic diagram 600 of a network communication device and two communication devices that may be participating in a communication flow in accordance with certain example embodiments. As shown in FIG. 6, by way of example but not limitation, schematic diagram 600 may include communication devices 102, users 104, communication modalities 106, at least one channel 108, or at least one network communication device 602. More specifically, schematic diagram 600 may include a first communication device 102-1, a first user 104-1, a first communication modality 106-1, a second communication device 102-2, a second user 104-2, a second communication modality 106-2, one or more channels 108, or at least one network communication device 602.

For certain example embodiments, a user 104 may be associated with a communication device 102. A user 104 may be interacting with a communication device 102 via at least one communication modality 106. More specifically, but by way of example only, first user 104-1 may be associated with first communication device 102-1. First user 104-1 may be interacting with first communication device 102-1 via at least one first communication modality 106-1. Additionally or alternatively, second user 104-2 may be associated with second communication device 102-2. Second user 104-2 may be interacting with second communication device 102-2 via at least one second communication modality 106-2. First communication device 102-1 or first user 104-1 may be participating in at least one communication flow (not explicitly shown in FIG. 6) with second communication device 102-2 or second user 104-2 via one or more channels 108.

For certain example embodiments, a channel 108 may comprise, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a public-switched telephone network (PSTN), at least part of a cable network, at least part of a cellular network connection, at least part of an Internet connection, at least part of a Wi-Fi connection, at least part of a WiMax connection, at least part of an internet backbone, at least part of a satellite network, at least part of a fibre network, multiple instances of any of the above, any combination of the above, and so forth. A channel 108 may include one or more nodes (e.g., a telecommunication node, an access point, a base station, an internet server, a gateway, any combination thereof, etc.) through which signals are propagated. A network communication device 602 may communicate with first communication device 102-1 or second communication device 102-2 using any one or more of multiple channels 108, a few examples of which are shown in schematic diagram 600.

For certain example implementations, a communication may be initiated by first communication device 102-1, first user 104-1, second communication device 102-2, second user 104-2, any combination thereof, and so forth. For certain example implementations, first communication modality 106-1 and second communication modality 106-2 may comprise a same one or more communication modalities 106 or may comprise at least one different communication modality 106. Furthermore, for certain example implementations, first communication modality 106-1 or second communication modality 106-2 may change from one communication modality to another communication modality during a single communication, across different communications, and so forth. Additionally or alternatively, a different communication modality may be referred to herein as a "third communication modality" or a "fourth communication modality", for example.

Moreover, it should be understood that the terms "first" or "second" may, depending on context, be a matter of perspective. For instance, a communication device 102 or a user 104 or a communication modality 106 may be considered a first one at a given moment, for a given communication, from a given perspective, etc. but may be considered a second one at a different moment, for a different communication, from a different perspective, etc. However, one of ordinary skill in the art will recognize that the term "first" or "second" (or "third" or "fourth" etc.) may serve, depending on context, to indicate that different interactions, acts, operations, functionality, a combination thereof, etc. may be occurring at, may be more closely associated with, a combination thereof etc. one side, aspect, location, combination thereof, etc. of a particular communication flow as compared to another side, aspect, location, combination thereof, etc. of the particular communication flow. For example, one signal including data may be transmitted from a first communication device 102-1 and received at a second communication device 102-2, or another signal including data may be transmitted from a second communication device 102-2 and received at a first communication device 102-1.

Figure 7A:
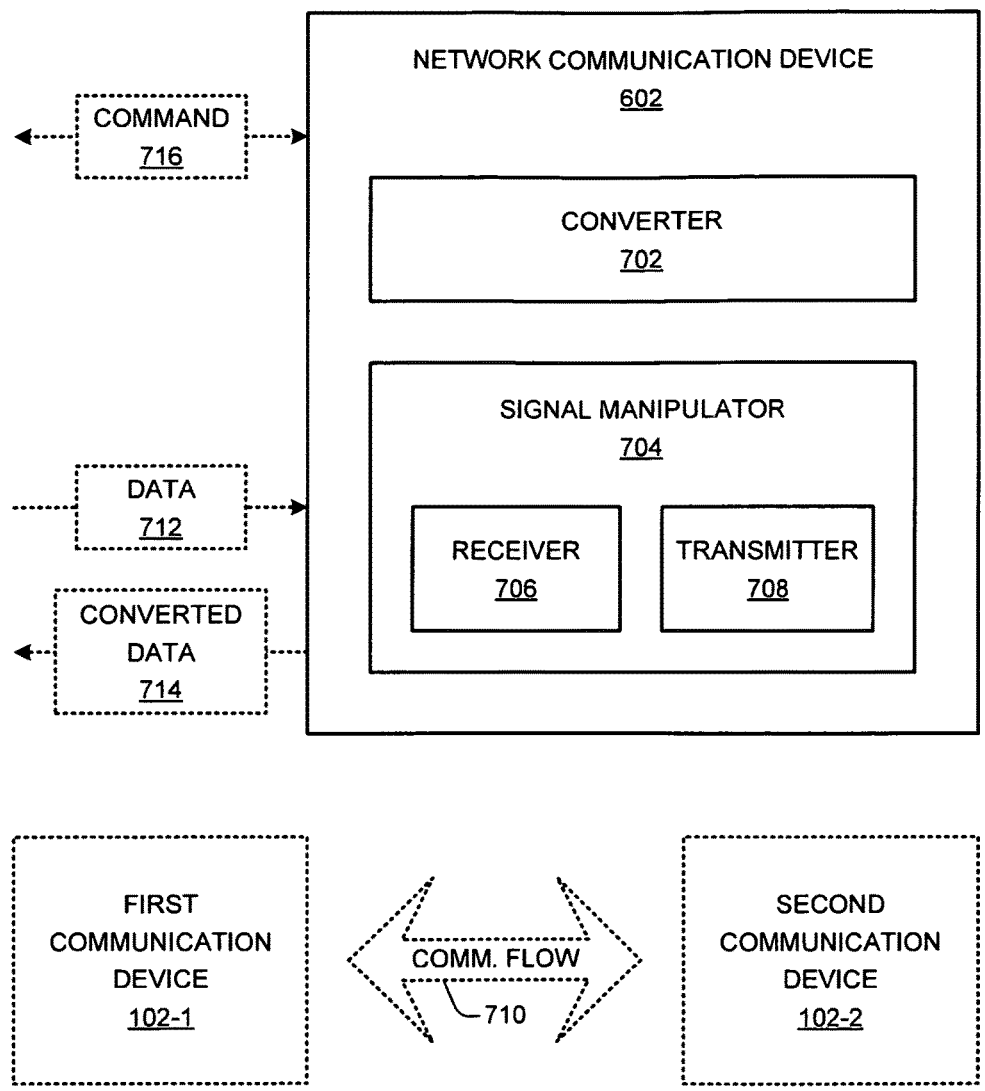
FIG. 7A is a schematic diagram of an example network communication device in accordance with certain example embodiments.

FIG. 7A is a schematic diagram 700A of an example network communication device in accordance with certain example embodiments. As shown in FIG. 7A, by way of example but not limitation, schematic diagram 700A may include communication devices 102, at least one network communication device 602, or at least one communication flow 710. More specifically, schematic diagram 700A may include a first communication device 102-1, a second communication device 102-2, at least one network communication device 602, at least one communication flow 710, data 712, converted data 714, or one or more commands 716. As illustrated, an example network communication device 602 may include a converter 702 or a signal manipulator 704, which may include a receiver 706 or a transmitter 708.

For certain example embodiments, a communication flow 710 may be created, may be extant, may be terminated, may be facilitated, some combination thereof, etc. between a first communication device 102-1 and a second communication device 102-2. A communication flow 710 may comprise, by way of example but not limitation, a transmission, a reception, an exchange, etc. of data for a communication between two or more communication devices 102, such as first communication device 102-1 and second communication device 102-2. Data for a communication may correspond to any one or more of multiple communication modalities. Communication flows are described further herein below, by way of example but not limitation, with particular reference to at least FIGS. 10A-10D.

For certain example embodiments, a network communication device 602 may include a converter 702, a signal manipulator 704, a combination thereof, and so forth. A signal manipulator 704 may include, by way of example but not limitation, a receiver 706, a transmitter 708, a combination thereof (e.g., a transceiver), and so forth. In certain example implementations, a converter 702, a signal manipulator 704, a receiver 706, a transmitter 708, or any combination thereof, etc. may be realized using any one or more components. Components are described herein below, by way of example but not limitation, with particular reference to at least FIG. 9.

For certain example embodiments, a network communication device 602 may receive data 712. A network communication device 602 may transmit converted data 714. Although not explicitly indicated in schematic diagram 700A, a network communication device 602 may additionally or alternatively transmit data 712 or receive converted data 714. (Illustrated arrow directions are provided by way of example only.) For certain example implementations, network communication device 602 may transmit one or more commands 716 or may receive one or more commands 716. Commands 716 may be transmitted to or received from a first communication device 102-1, a second communication device 102-2, another network communication device 602, a telecommunications node, any combination thereof, and so forth.

For certain example embodiments, a network communication device 602 may enable the offloading of modality conversion for multi-modality communications. A receiver 706 may receive data corresponding to a first communication modality from at least one of a first communication device 102-1 or a second communication device 102-2, with the data associated with a communication flow 710 between first communication device 102-1 and second communication device 102-2. Communication flow 710 may comprise a multi-modality communication in which a first user (e.g., a first user 104-1 (e.g., of FIG. 6)) interacts with first communication device 102-1 using at least one different communication modality than a second user (e.g., a second user 104-2 (e.g., of FIG. 6)) interacts with second communication device 102-2. For instance, a first communication modality (e.g., a first communication modality 106-1 (e.g., of FIG. 6)) may differ from a second communication modality (e.g., a second communication modality 106-2 (e.g., of FIG. 6)). A converter 702 may convert the data corresponding to the first communication modality to data corresponding to a second communication modality. A transmitter 708 may transmit the data corresponding to the second communication modality to at least one of the first communication device or the second communication device. However, a network communication device 602 may alternatively include more, fewer, or different modules from those that are illustrated without deviating from claimed subject matter.

Figure 7B:
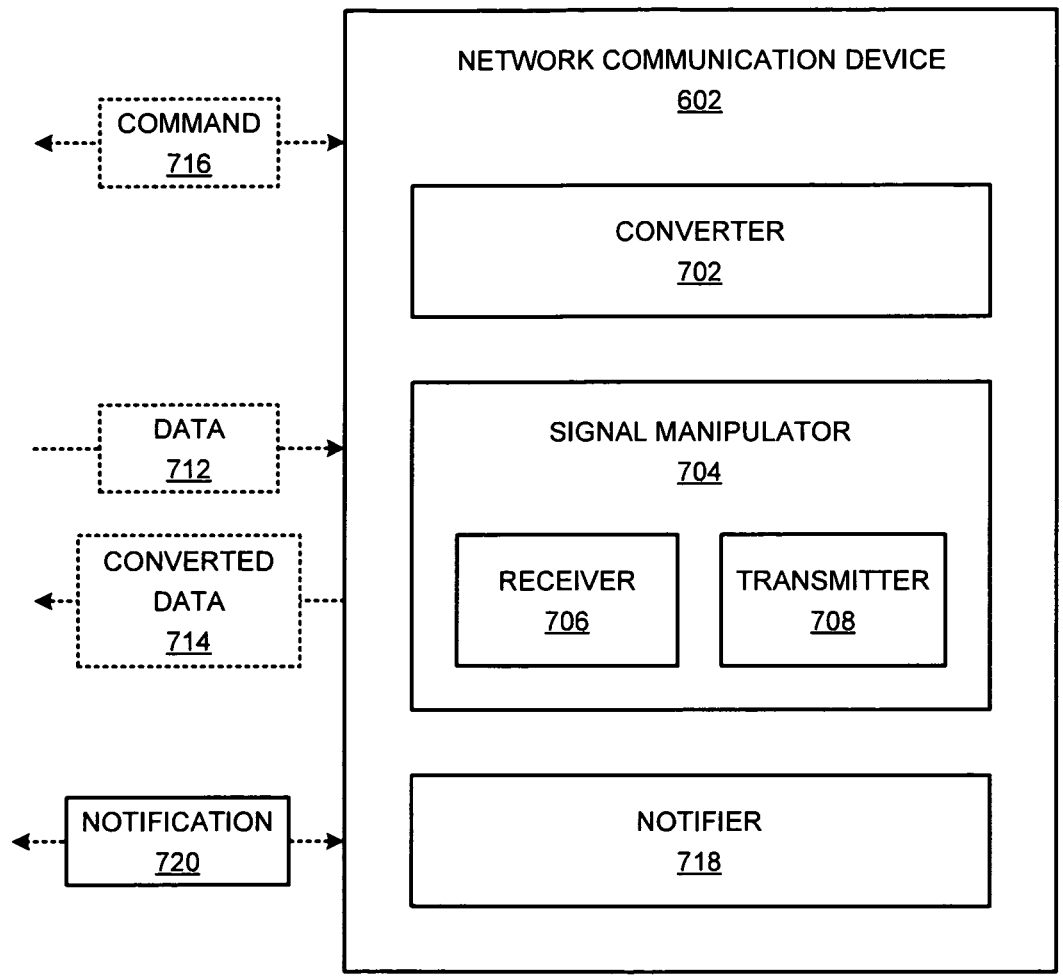
FIG. 7B is a schematic diagram of another example network communication device in accordance with certain example embodiments.
Figure 7B:
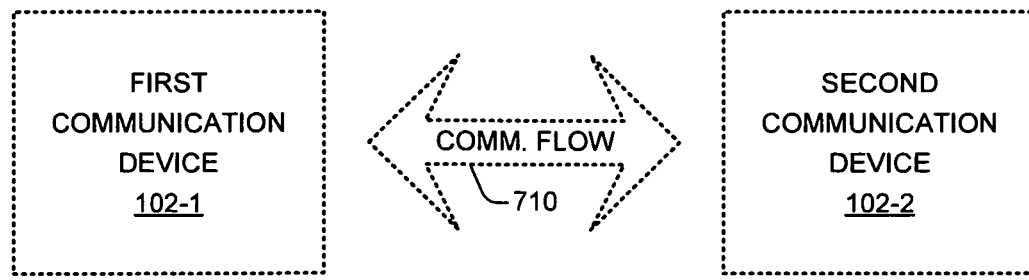

FIG. 7B is a schematic diagram 700B of an example network communication device in accordance with certain example embodiments. As shown in FIG. 7B, by way of example but not limitation, schematic diagram 700B may include communication devices 102, at least one network communication device 602, or at least one communication flow 710. More specifically, schematic diagram 700B may include a first communication device 102-1, a second communication device 102-2, at least one network communication device 602, at least one communication flow 710, data 712, converted data 714, one or more commands 716, or at least one notification 720. As illustrated, an example network communication device 602 may include a converter 702; a signal manipulator 704, which may include a receiver 706 or a transmitter 708; or a notifier 718.

For certain example embodiments, a communication flow 710 may be created, may be extant, may be terminated, may be facilitated, some combination thereof, etc. between a first communication device 102-1 and a second communication device 102-2. A communication flow 710 may comprise, by way of example but not limitation, a transmission, a reception, an exchange, etc. of data for a communication between two or more communication devices 102, such as first communication device 102-1 and second communication device 102-2. Data for a communication may correspond to any one or more of multiple communication modalities. Communication flows are described further herein below, by way of example but not limitation, with particular reference to at least FIGS. 10E-10H.

For certain example embodiments, a network communication device 602 may include a converter 702, a signal manipulator 704, a notifier 718, a combination thereof, and so forth. A signal manipulator 704 may include, by way of example but not limitation, a receiver 706, a transmitter 708, a combination thereof (e.g., a transceiver), and so forth. In certain example implementations, a converter 702, a signal manipulator 704, a receiver 706, a transmitter 708, a notifier 718, or any combination thereof, etc. may be realized using any one or more components. Components are described herein below, by way of example but not limitation, with particular reference to at least FIG. 9.

For certain example embodiments, a network communication device 602 may receive data 712. A network communication device 602 may transmit converted data 714. Although not explicitly indicated in schematic diagram 700B, a network communication device 602 may additionally or alternatively transmit data 712 or receive converted data 714. (Illustrated arrow directions are provided by way of example only.) For certain example embodiments, a network communication device 602 may generate, analyze, process, transmit, receive, any combination thereof, etc. one or more notifications 720. Examples of notifications 720 may include, but are not limited to, a signal, a message, a request, a packet, any combination thereof, and so forth. A notification 720 may pertain, by way of example but not limitation, to at least one aspect of a conversion related to a communication flow 710. A notification 720 may be received from or transmitted to a communication device 102, another network communication device 602, a conversion service, any combination thereof, and so forth. Notification 720 examples are additionally or alternatively described herein below, by way of example but not limitation, with particular reference to FIGS. 10E-10H. For certain example implementations, network communication device 602 may transmit one or more commands 716 or may receive one or more commands 716 or may process or generate one or more commands 716. Commands 716 may be transmitted to or received from a first communication device 102-1, a second communication device 102-2, another network communication device 602, a telecommunications node, any combination thereof, and so forth.

For certain example embodiments, a network communication device 602 may implement interceptive conversion with multi-modality communications. A receiver 706 may receive from a first communication device 102-1 data 712 corresponding to a first communication modality (e.g., a first communication modality 106-1 (e.g., of FIG. 6)), with data 712 corresponding to the first communication modality being associated with a communication flow 710 between first communication device 102-1 and a second communication device 102-2. Communication flow 710 may comprise a multi-modality communication in which a first user (e.g., a first user 104-1 (e.g., of FIG. 6)) is to interact with first communication device 102-1 using a first communication modality and a second user (e.g., a second user 104-2 (e.g., of FIG. 6)) is to interact with second communication device 102-2 using a second communication modality (e.g., a second communication modality 106-2 (e.g., of FIG. 6)). A converter 702 may convert data 712 corresponding to the first communication modality to data corresponding to the second communication modality (e.g., to produce converted data 714). A transmitter 708 may transmit to second communication device 102-2 the data corresponding to the second communication modality. A transmitter 708 may also transmit to first communication device 102-1a notification 720 of at least one aspect of a conversion applicable to communication flow 710, wherein first communication device 102-1 is to have initiated communication flow 710. However, a network communication device 602 may alternatively include more, fewer, or different components or modules from those that are illustrated without deviating from claimed subject matter. Moreover, although schematic diagrams 700A and 700B (e.g., of FIGS. 7A and 7B, respectively) are illustrated and described herein separately, one or more aspects of either may be implemented with respect to the other, unless context dictates otherwise.

Figure 8:
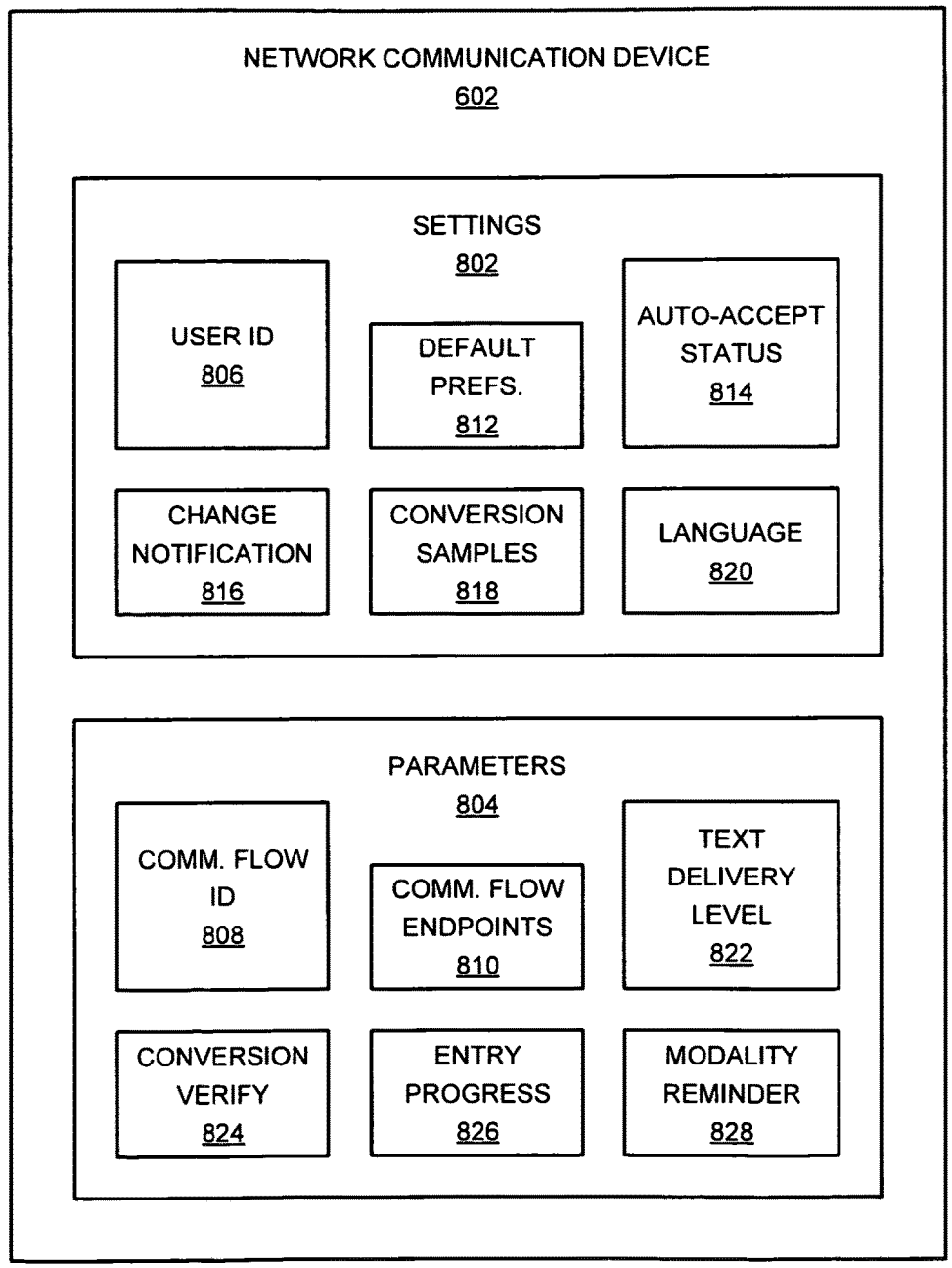
FIG. 8 is a schematic diagram of a network communication device including example settings or example parameters in accordance with certain example embodiments.

FIG. 8 is a schematic diagram 800 of a network communication device including example settings or example parameters in accordance with certain example embodiments. As shown in FIG. 8, by way of example but not limitation, schematic diagram 800 may include at least one network communication device 602. More specifically, at least one network communication device 602 may include one or more settings 802, one or more parameters 804, any combination thereof, and so forth. As illustrated, settings 802 may include at least a user identification (ID) 806, one or more default preferences 812, at least one auto-accept status 814, at least one change notification indicator 816, one or more conversion samples 818, at least one language indication 820, any combination thereof, and so forth. As illustrated, parameters 804 may include at least a communication flow identifier (ID) 808, one or more communication flow endpoints 810, at least one text delivery level indicator 822, at least one conversion verification indicator 824, at least one entry progress indicator 826, at least one modality reminder indicator 828, any combination thereof, and so forth. Although shown separately, different aspects that are described as a setting 802 or as a parameter 804 may additionally or alternatively be implemented as a parameter 804 or as a setting 802, respectively. For certain example embodiments, different conversion-related aspects, including but not limited to changes thereto, may be sent to an associated user or another party that is participating in a communication flow with an associated user as one or more notifications (e.g., as one or more notifications 720 (e.g., of FIG. 7B)).

For certain example embodiments, a setting 802 may be associated with a user (e.g., a user 104 (e.g., of FIG. 6)), an account for an entity (e.g., a person, a business, a group, an organization, a combination thereof, etc.), a communication device (e.g., a communication device 102 (e.g., of FIG. 6)), any combination thereof, and so forth. A setting 802 may, by way of example only, persist across multiple communication flows. By way of example but not limitation, settings 802 may include a user ID 806, indicia of equipment (e.g., a communication device 102 (e.g., of FIG. 6)) that is or are associated with a user, indicia of account(s) or contact information (e.g., phone numbers, messaging identifiers, a combination thereof, etc.) associated with a user, account information (e.g., billing information, contact information, a combination thereof, etc.), default user preferences 812 (e.g., preferences that may be implemented across multiple communication flows), any combination thereof, and so forth. A parameter 804 may correspond to a particular communication flow (or particular communication flows having at least one commonality) (e.g., a communication flow 710 (e.g., of FIG. 7A or 7B)). By way of example but not limitation, parameters 804 may include a communication flow ID 808, current preferences (e.g., one or more preferences to be implemented for a particular communication flow (or particular communication flows having at least one commonality)), indicia of one or more endpoints of a communication flow (e.g., communication flow endpoints 810), redirect information for a communication flow (e.g., identification of one or more nodes to perform conversion), routing information for a communication flow, conversion parameters for data of a communication flow, any combination thereof, and so forth.

For certain example embodiments, one or more settings 802 may pertain to a user, a communication device, an account, any combination thereof, and so forth. For certain example implementations, at least one auto-accept status 814 may relate to whether an auto-accept feature is active. An auto-accept status 814 may additionally or alternatively indicate whether a conversion is to be implemented for a communication flow if auto-accept is implemented for an incoming communication notification. For certain example implementations, at least one change notification indicator 816 may indicate whether an associated user wishes to be notified if another participant in a communication flow makes a change (e.g., changes a conversion parameter). For certain example implementations, one or more conversion samples 818 may include one or more conversion samples from an associated user. By way of example but not limitation, a conversion sample may comprise sound samples from a user that may be utilized to generate synthesized voice from text. Also by way of example but not limitation, a conversion sample may comprise word vocalization samples from a user that may be utilized to enhance a conversion from voice to text. For certain example implementations, at least one language indication 820 may identify one or more languages that an associated user is capable of understanding (e.g., in text, in voice, in both text and voice, etc.).

For certain example embodiments, one or more parameters 804 may pertain to a user, a communication device, a particular communication flow or flows having at least one commonality, any combination thereof, and so forth. For certain example implementations, at least one text delivery level indicator 822, may indicate a level of text to be delivered. Examples of text delivery levels may include, but are not limited to, an amount of text that may be transmitted as a block (e.g., at one time, in one transmission, until a response is made or received, a combination thereof, etc.), a speed of transmission or reception of text (e.g., characters per second, words per minute, a combination thereof, etc.), any combination thereof, and so forth. For certain example implementations, at least one conversion verification indicator 824 may indicate if a user, another participant, each participant, a combination thereof, etc. wishes to be provided an opportunity to receive a proposed conversion and approve or disapprove it prior to transmission to another party. For certain example implementations, at least one entry progress indicator 826 may indicate if a user wishes to be notified if another communication participant is currently entering communication data (e.g., speaking for voice, typing for text, a combination thereof, etc.). By way of example but not limitation, a notification may be presented to a user as a beep or other sound, a light or other visual indicator, an icon, a recorded message, a synthesized message, a combination thereof, and so forth. For certain example implementations, at least one modality reminder indicator 828 may indicate if a user wishes to be reminded of a communication modality with which another participant is currently interacting. By way of example but not limitation, a user that is interacting with text while another participant is interacting with voice may be reminded that the other participant is expecting real-time responses so that too much time does not elapse between consecutive responses. Also by way of example but not limitation, a user that is interacting with voice while another participant is interacting with text may be reminded that the other participant may prefer briefer communications relative to if the other participant was also interacting with voice. Reminders may comprise a beep or other sound, a light or other visual indicator, an icon, a recorded or synthesized message, a combination thereof, and so forth. Reminders may be provided at regular intervals, after a period of inactivity, a combination thereof, and so forth.

Figure 9:
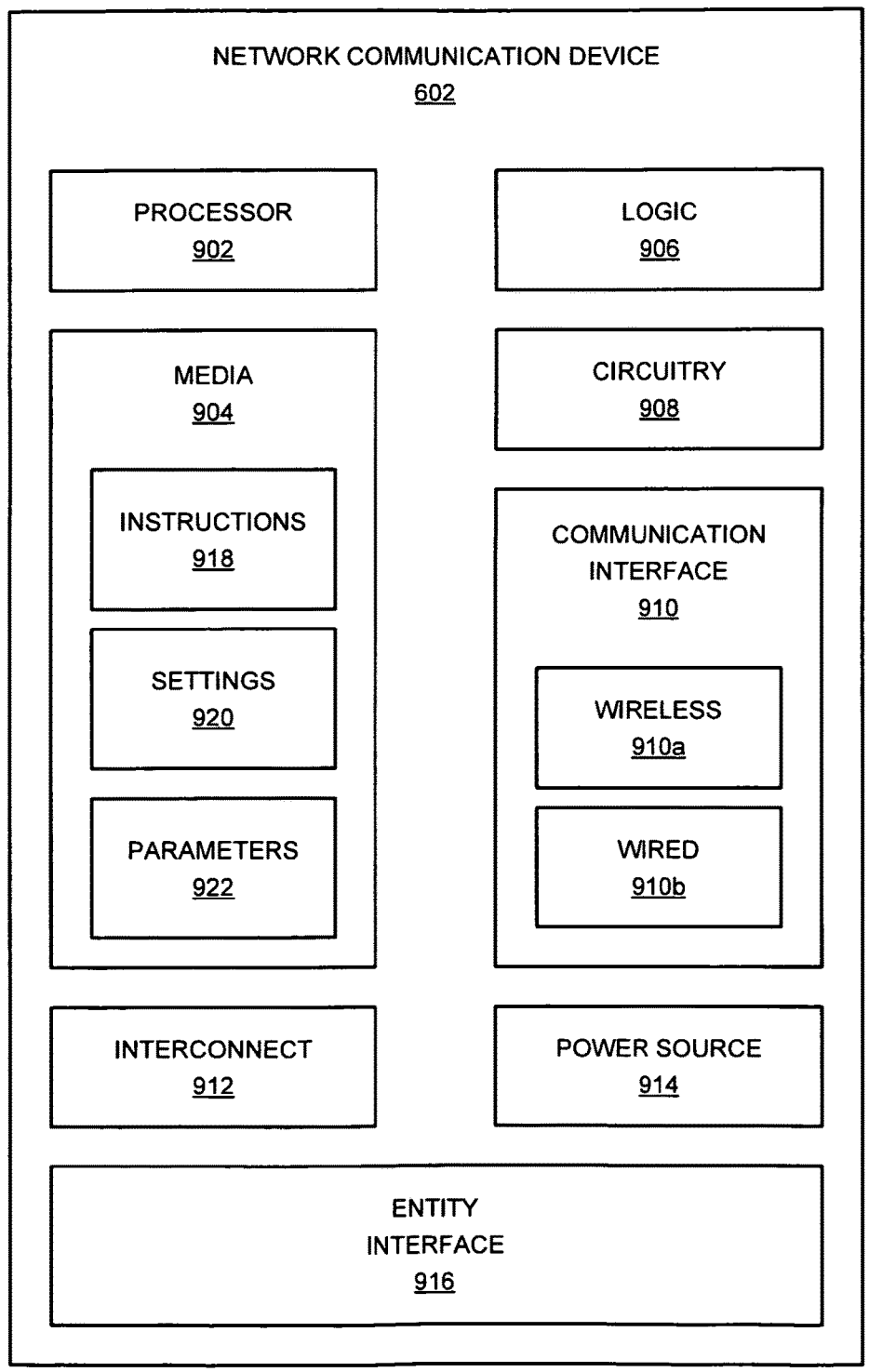
FIG. 9 is a schematic diagram of an example network communication device including one or more example components in accordance with certain example embodiments.

FIG. 9 is a schematic diagram 900 of an example network communication device including one or more example components in accordance with certain example embodiments. As shown in FIG. 9, a network communication device 602 may include one or more components such as: at least one processor 902, one or more media 904, logic 906, circuitry 908, at least one communication interface 910, at least one interconnect 912, at least one power source 914, or at least one entity interface 916, any combination thereof, and so forth. Furthermore, as shown in schematic diagram 900, one or more media may comprise one or more instructions 918, one or more settings 920, one or more parameters 922, some combination thereof, and so forth; or communication interface 910 may comprise at least one wireless communication interface 910a, at least one wired communication interface 910b, some combination thereof, and so forth. However, a network communication device 602 may alternatively include more, fewer, or different components from those that are illustrated without deviating from claimed subject matter.

For certain example embodiments, a network communication device 602 may include or comprise at least one processing or computing device or machine. Network communication device 602 may comprise, for example, a computing platform or any electronic device or devices having at least one processor or memory. Processor 902 may comprise, by way of example but not limitation, any one or more of a general-purpose processor, a specific-purpose processor, a digital signal processor (DSP), a processing unit, a combination thereof, and so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, a combination thereof, and so forth. Media 904 may bear, store, contain, provide access to, a combination thereof, etc. instructions 918, which may be executable by processor 902. Instructions 918 may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. Media 904 may comprise, by way of example but not limitation, processor-accessible or non-transitory media that is capable of bearing instructions, settings, parameters, a combination thereof, and so forth.

For certain example embodiments, execution of instructions 918 by one or more processors 902 may transform network communication device 602 into a special-purpose computing device, apparatus, platform, or any combination thereof, etc. Instructions 918 may correspond to, for example, instructions that are capable of realizing at least a portion of one or more flow diagrams methods, processes, operations, functionality, technology, or mechanisms, etc. that are described herein or illustrated in the accompanying drawings. Settings 920 (e.g., which may correspond to settings 802 (e.g., of FIG. 8)) may comprise, by way of example but not limitation, one or more indicators that may be established by a user or other entity, one or more indicators that may determine at least partly how a network communication device 602 is to operate or respond to situations, one or more indicators or other values that may be used to realize flow diagrams, methods, processes, operations, functionality, technology, or mechanisms, etc. that are described herein or illustrated in the accompanying drawings. Parameters 922 (e.g., which may correspond to parameters 804 (e.g., of FIG. 8)) may comprise, by way of example but not limitation, one or more indicators that may be established by a user or other entity, one or more indicators that may determine at least partly how a network communication device 602 is to operate or respond to situations, one or more indicators or other values that may be used to realize flow diagrams, methods, processes, operations, functionality, technology, or mechanisms, etc. that are described herein or illustrated in the accompanying drawings.

For certain example embodiments, logic 906 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry 908 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry 908 comprises at least one physical or hardware component or aspect.

For certain example embodiments, one or more communication interfaces 910 may provide one or more interfaces between network communication device 602 and another device or a person/operator/entity indirectly. A communication interface 910 may also or alternatively include, by way of example but not limitation, a transceiver (e.g., transmitter or receiver), a radio, an antenna, a wired interface connector or other similar apparatus (e.g., a network connector, a universal serial bus (USB) connector, a proprietary connector, a Thunderbolt® or Light Peak® connector, a combination thereof, etc.), a physical or logical network adapter or port, an internet or telecommunications backbone connector, or any combination thereof, etc. to communicate wireless signals or wired signals via one or more wireless communication links or wired communication links, respectively. Communications with at least one communication interface 910 may enable transmitting, receiving, or initiating of transmissions, just to name a few examples.

For certain example embodiments, at least one interconnect 912 may enable signal communication between or among components of network communication device 602. Interconnect 912 may comprise, by way of example but not limitation, one or more buses, channels, switching fabrics, local area networks (LANs), storage area networks (SANs), or combinations thereof, and so forth. Although not explicitly illustrated in FIG. 9, one or more components of network communication device 602 may be coupled to interconnect 912 via a discrete or integrated interface. By way of example only, one or more interfaces may couple a communication interface 910 or a processor 902 to at least one interconnect 912. At least one power source 914 may provide power to components of network communication device 602. Power source 914 may comprise, by way of example but not limitation, a power connector for accessing an electrical grid, a fuel cell, a solar power source, any combination thereof, and so forth.

For certain example embodiments, an entity interface 916 may enable one or more entities (e.g., other devices, persons, groups, a combination thereof, etc.) to provide input to or receive output from network communication device 602. Interactions between entities and a device may relate, by way of example but not limitation, to inputting instructions, commands, settings, parameters, any combination thereof, and so forth. Certain entity interfaces 916 may enable both entity input and entity output.

It should be understood that for certain example implementations components illustrated separately in FIG. 9 are not necessarily separate or mutually exclusive. For example, a given component may provide multiple functionalities. By way of example only, hard-wired logic 906 may form circuitry 908. Additionally or alternatively, a single component such as connector may function as a communication interface 910 or as an entity interface 916. Additionally or alternatively, one or more instructions 918 may function to realize at least one setting 920 or at least one parameter 922.

It should also be understood that for certain example implementations components illustrated in schematic diagram 900 or described herein may not be integral or integrated with a network communication device 602. For example, a component may be removably connected to a network communication device 602, a component may be wirelessly coupled to a network communication device 602, any combination thereof, and so forth. By way of example only, instructions 918 may be stored on one medium 904, and settings 902 or parameters 922 may be stored on a different medium 904. Additionally or alternatively, respective processor-media pairs may be physically realized on respective server blades. Multiple server blades, for instance, may be linked to realize at least one network communication device 602.

FIGS. 10A, 10B, 10C, and 10D depict example sequence diagrams 1002, 1004, 1006, and 1008, respectively, for example multi-modality communications. As shown, by way of example but not limitation, each sequence diagram may include a first communication device 102-1, a second communication device 102-2, or a network communication device 602, as well as multiple actions. Although actions of sequence diagrams 1002, 1004, 1006, and 1008 are shown or described in a particular sequence, it should be understood that methods or processes may be performed in alternative manners without departing from claimed subject matter, including, but not limited to, with a different sequence or number of actions, with a different relationship between or among actions, with a different communication device (or node) performing action(s), or any combination thereof, and so forth. Also, at least some actions of sequence diagrams 1002, 1004, 1006, and 1008 may be performed so as to be fully or partially overlapping with other action(s) in a temporal sense, in a communication sense (e.g., over one or more channels), in a processing sense (e.g., using multiple cores, multitasking, a combination thereof, etc.), some combination thereof, and so forth. By way of example only, a given communication or channel may comprise a fully or partially duplex communication, thereby enabling independent or overlapping transmissions or receptions.

As depicted, by way of example but not limitation, each example multi-modality communication includes a communication flow that may be initiated by a first communication device 102-1. However, multi-modality communications may alternatively or additionally include communications that may be initiated by a second communication device 102-2. As illustrated, by way of example but not limitation, each example multi-modality communication may involve at least two communication modalities that include voice interaction or text interaction by a user of a first or a second communication device 102-1 or 102-2. However, multi-modality communications may alternatively or additionally involve two or more communication modalities that include voice interaction, text interaction, video interaction, any combination thereof, and so forth. As shown, by way of example but not limitation, a second communication device 102-2, in conjunction with an indication from a second user 104-2 (e.g., of FIG. 6), may determine that a communication is to comprise a multi-modality communication at or around when a communication flow is initiated. However, a first communication device 102-1 (or a user thereof) may additionally or alternatively determine that a communication flow is to comprise a multi-modality communication. Furthermore, a communication flow may be migrated to a multi-modality communication or from one modality type conversion to another modality type conversion at virtually any time during a communication by a communication device or a network communication device. Moreover, a communication device may additionally or alternatively initiate a communication flow as a multi-modality communication.

For certain example embodiments, sequence diagrams 1002, 1004, 1006, and 1008 may include one or more transmissions or receptions. Transmissions or receptions may be made, by way of example but not limitation, from or to a first communication device 102-1, from or to a second communication device 102-2, or from or to a network communication device 602. A given transmission or reception may be made via any one or more channels 108 (e.g., of FIG. 6). Examples of channels may include, but are not limited to, a voice connection channel, a voice data channel, a voice over internet protocol (VOIP) channel, a packet data channel, a signaling channel, a channel over the Internet (e.g., a session), a cellular-text-messaging channel, an internet or telecommunications backbone, any combination thereof, and so forth. Additionally or alternatively, although two communication devices and one network communication device are shown as participating in a given communication flow, more than two communication devices, more than two users, or more than one network communication device may participate in a given communication flow.

Figure 10A:
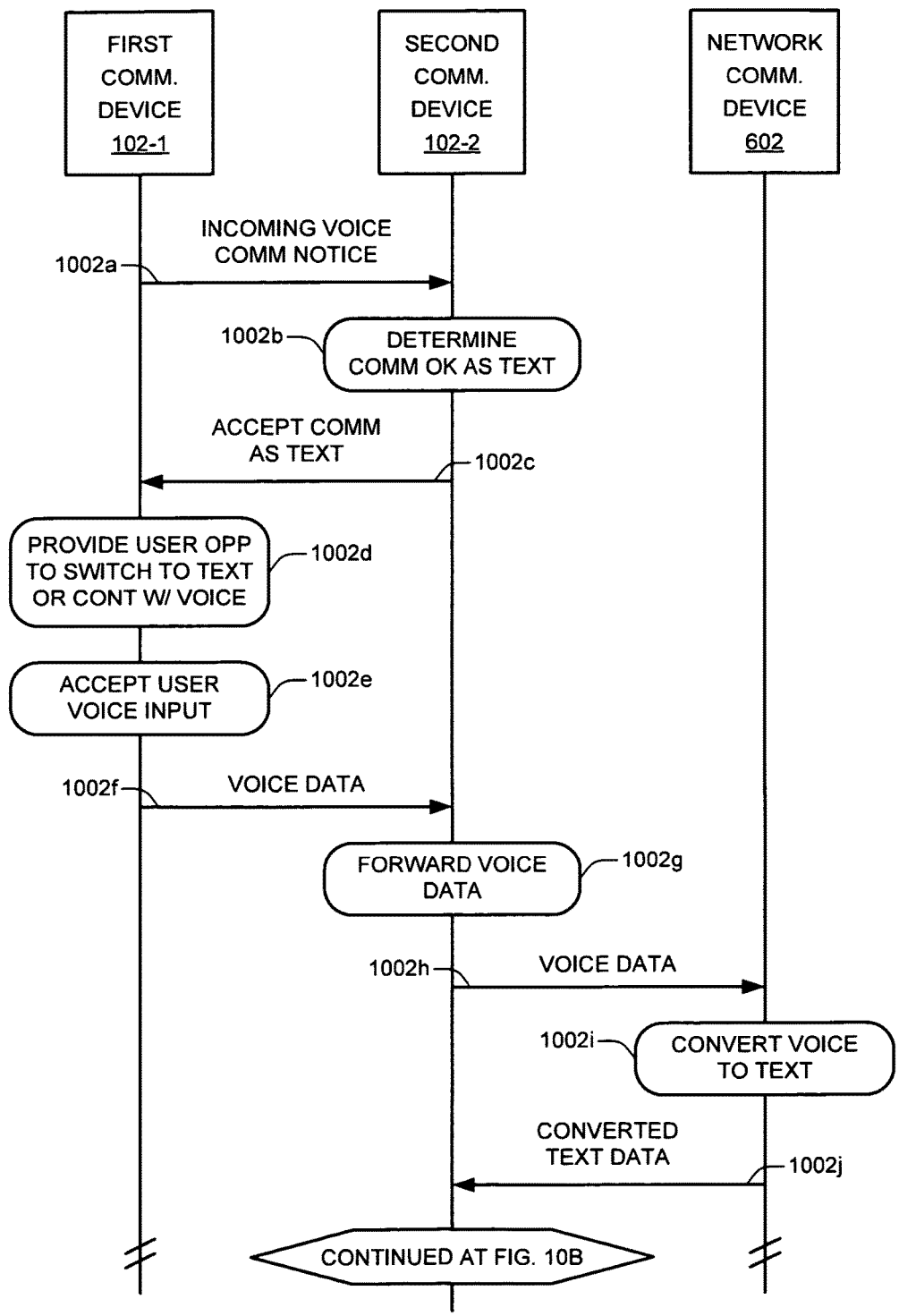
FIGS. 10A and 10B are sequence diagrams that jointly illustrate an example multi-modality communication in which conversion may be performed at a network communication device via transmission of data external to a core communication flow in accordance with certain example embodiments.
Figure 10B:
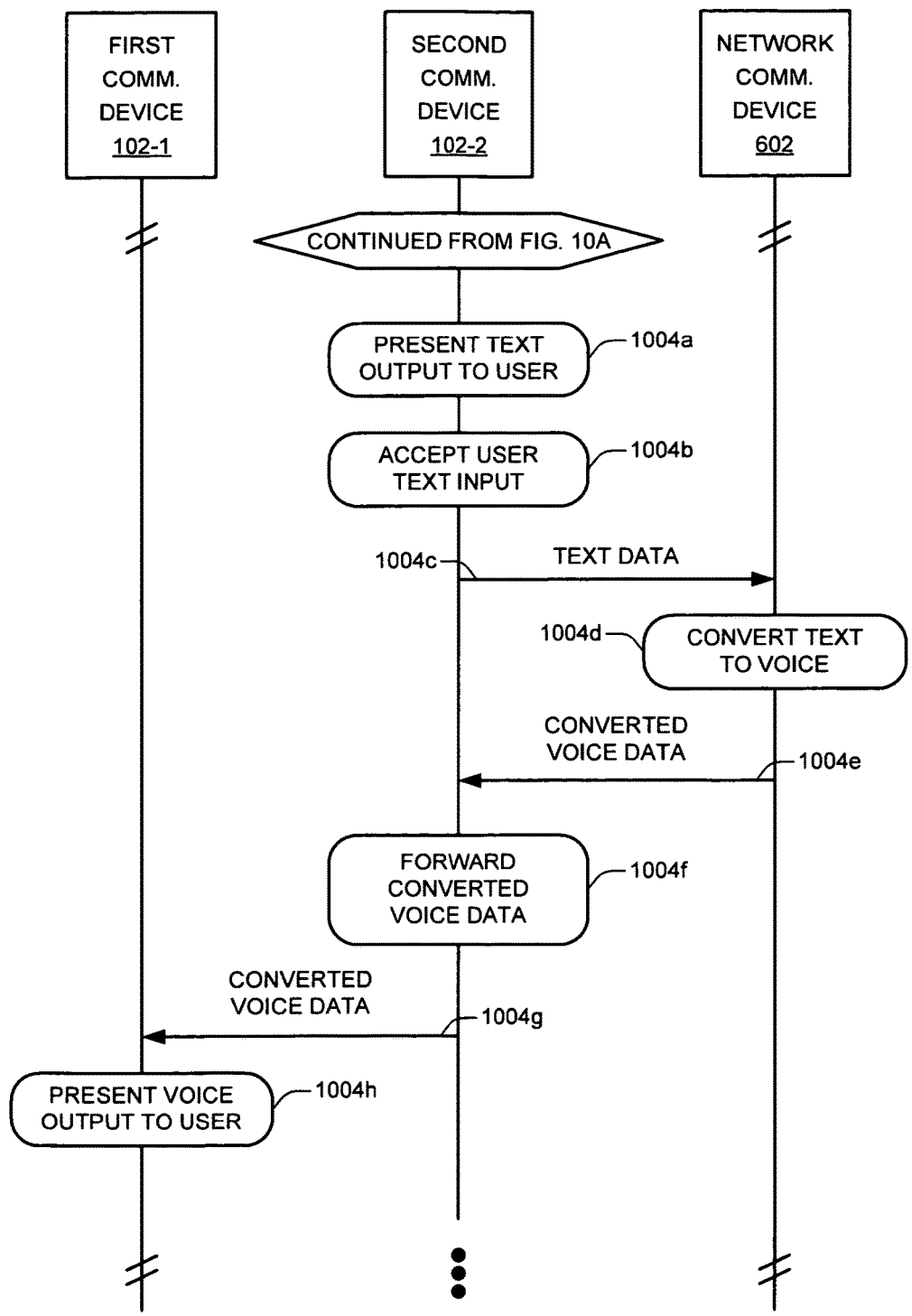

FIGS. 10A and 10B are sequence diagrams 1002 and 1004 that jointly illustrate an example multi-modality communication in which conversion may be performed at a network communication device via transmission of data external to a core communication flow in accordance with certain example embodiments. As shown in FIGS. 10A and 10B, by way of example but not limitation, one or more of actions 1002a-1002j or 1004a-1004h may be performed for a communication flow. For example sequence diagrams 1002 and 1004, a network communication device 602 may perform conversions that have been farmed out by a communication device, such as second communication device 102-2.

For certain example embodiments, at action 1002a, a first communication device 102-1 may transmit or a second communication device 102-2 may receive a notification of an incoming communication that corresponds to voice. By way of example but not limitation, a notification may comprise a text message, a ringing signal, a communication inquiry, a communication notice, a session initiation message, any combination thereof, and so forth. At action 1002b, second communication device 102-2 may determine that a communication flow may continue in a manner that is at least partially corresponding to text. For certain example implementations, second communication device 102-2 may make a determination based, at least partly, on an existing intimacy setting (e.g., on a current default intimacy setting), on a contemporaneous intimacy setting indication provided by second user 104-2 (e.g., by a second user without prompting, by a second user in response to options presented by a second communication device in conjunction with presentation of a call notification to the second user, some combination thereof, etc.), any combination thereof, and so forth.

For certain example embodiments, at action 1002c, a second communication device 102-2 may transmit or a first communication device 102-1 may receive a message indicating that a communication flow is accepted if it may correspond at least partially to text. At action 1002d, a first communication device 102-1 may provide a first user 104-1 with an opportunity to switch to text (e.g., to establish a single-modality textual communication), with an opportunity to continue a communication with first user interactivity including voice (e.g., to establish a dual-modality voice and textual communication), with an opportunity to propose a different one or more interactivity-types of communication(s), any combination thereof, and so forth. For certain examples as described herein, with respect to action 1002d, it is given that a first user 104-1 elects to continue a communication flow as a multi-modality communication with voice interaction for first user 104-1 and (at least partial) textual interaction for second user 104-2. This election may be communicated to second communication device 102-2.

For certain example embodiments, at action 1002e, a first communication device 102-1 may accept user voice input. For an example implementation, a first communication device 102-1 may enable voice interaction with a first user 104-1 (not shown in FIG. 10A) by accepting voice input via at least one user input interface 516a (e.g., of FIG. 5), such as at least one microphone. At action 1002f, a first communication device 102-1 may transmit or a second communication device 102-2 may receive voice data. At action 1002g, second communication device 102-2 may forward the received voice data. For an example implementation, a second communication device 102-2 may forward voice data to a known web service that provides conversion services from voice to text. A known web service may be free and usable without registration, may be free and usable upon registration, may impose a fee and involve registration, any combination thereof, and so forth.

For certain example embodiments, at action 1002h, a second communication device 102-2 may transmit or a network communication device 602 may receive voice data. At action 1002i, a network communication device 602 may convert voice data to text (e.g., to converted text data). At action 1002j, a network communication device 602 may transmit or a second communication device 102-2 may receive converted text data. As indicated in FIG. 10A, sequence diagram 1002 is continued with sequence diagram 1004 of FIG. 10B.

With reference to FIG. 10B, for certain example embodiments, at action 1004a, a second communication device 102-2 may present text output (e.g., as converted by network communication device 602) to a second user 104-2 (not shown in FIG. 10B). For an example implementation, a second communication device 102-2 may display text to a second user 104-2 via at least one user output interface 516b (e.g., of FIG. 5), such as at least one display screen. At action 1004b, a second communication device 102-2 may accept user text input. For an example implementation, a second communication device 102-2 may accept text input from a second user 104-2 via at least one user input interface 516a, such as a physical or virtual keyboard.

For certain example embodiments, at action 1004c, a second communication device 102-2 may transmit or a network communication device 602 may receive text data. At action 1004d, a network communication device 602 may convert text data to voice (e.g., to converted voice data). At action 1004e, a network communication device 602 may transmit or a second communication device 102-2 may receive converted voice data.

For certain example embodiments, at action 1004f, a second communication device 102-2 may determine that the received converted voice data is to be forwarded to a first communication device 102-1. For an example implementation, the converted voice data may be forwarded to first communication device 102-1 via a voice channel already established (and maintained) between second communication device 102-2 and first communication device 102-1 for a given communication flow. At action 1004g, a second communication device 102-2 may transmit or a first communication device 102-1 may receive converted voice data. At action 1004h, a first communication device 102-1 may present voice data as voice output to a first user 104-1, which voice data may comprise converted voice data that was converted by a network communication device 602 and forwarded by another communication device, such as second communication device 102-2.

Figure 10C:
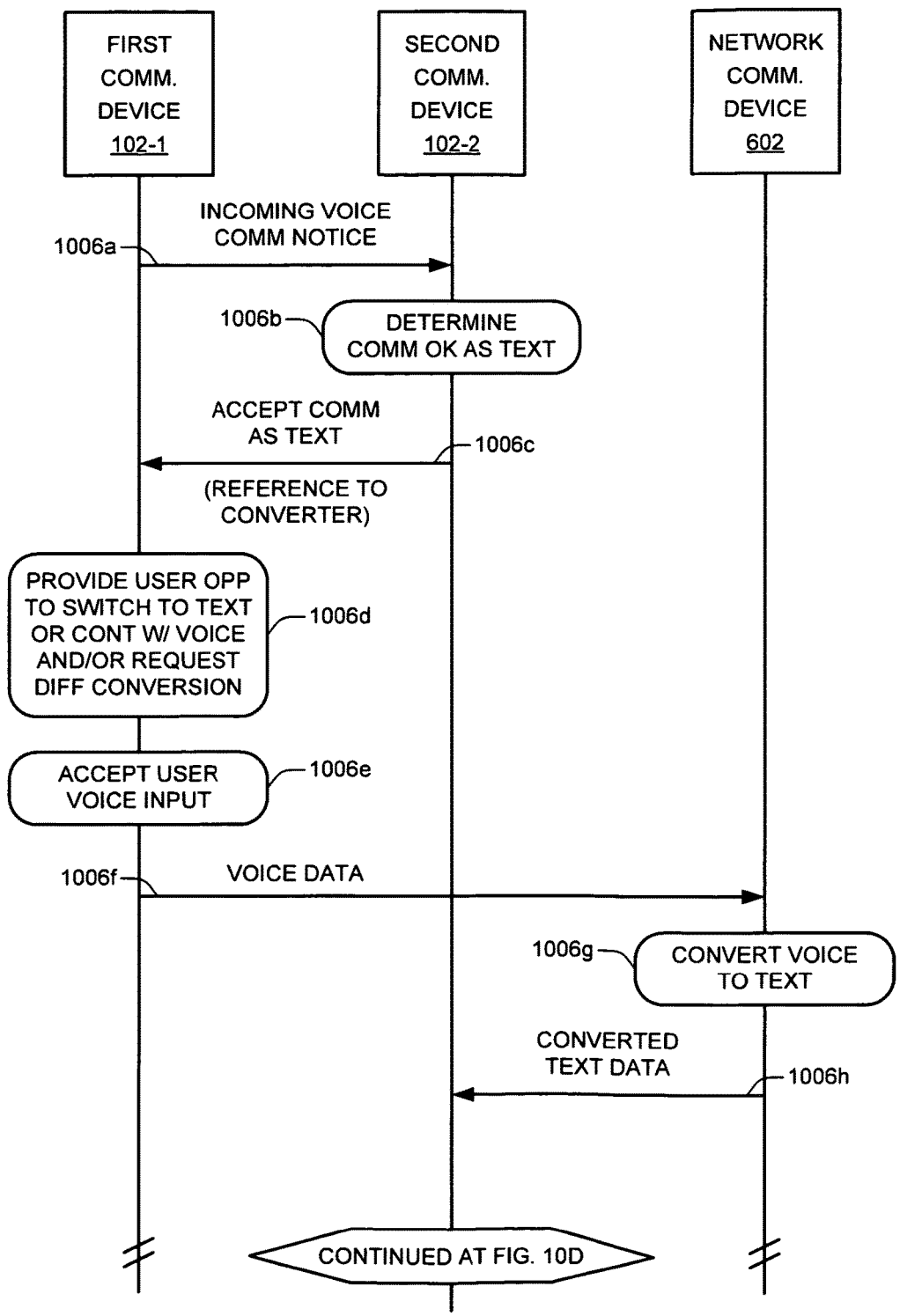
FIGS. 10C and 10D are sequence diagrams that jointly illustrate an example multi-modality communication in which conversion may be performed at a network communication device via transmission of data within a core communication flow in accordance with certain example embodiments.
Figure 10D:
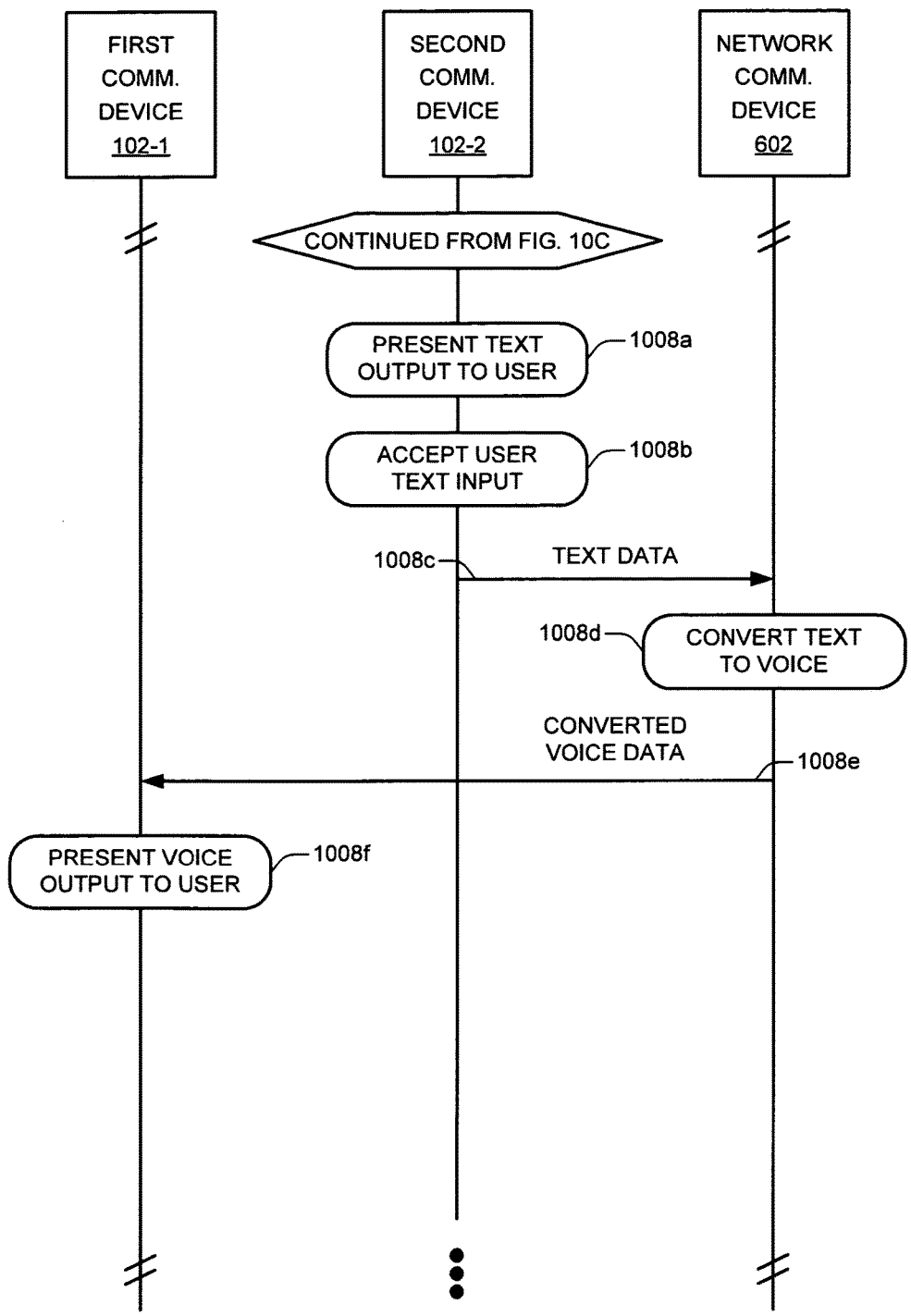

FIGS. 10C and 10D are sequence diagrams 1006 and 1008 that jointly illustrate an example multi-modality communication in which conversion may be performed at a network communication device via transmission of data within a core communication flow in accordance with certain example embodiments. As shown in FIGS. 10C and 10D, by way of example but not limitation, one or more of actions 1006a-1006h or 1008a-1008f may be performed for a communication flow. For example sequence diagrams 1006 and 1008, a network communication device 602 may perform conversions via a detour of a communication flow to network communication device 602.

For certain example embodiments, at action 1006a, a first communication device 102-1 may transmit or a second communication device 102-2 may receive a notification of an incoming communication that corresponds to voice. By way of example but not limitation, a notification may comprise a text message, a ringing signal, a communication inquiry, a session initiation message, a communication notice, any combination thereof, and so forth. At action 1006b, second communication device 102-2 may determine that a communication flow may continue in a manner that is at least partially corresponding to text. For certain example implementations, second communication device 102-2 may make a determination based, at least partly, on an existing intimacy setting (e.g., on a current default intimacy setting), on a contemporaneous intimacy setting indication provided by second user 104-2 (e.g., by a second user without prompting, by a second user in response to options presented by a second communication device in conjunction with presentation of a call notification to the second user, some combination thereof, etc.), any combination thereof, and so forth. Second communication device 102-2 or a user thereof may also determine that conversions are to be performed by a network communication device, such as network communication device 602, via a detour of a communication flow. A designated network communication device may be accessible via a reference. By way of example but not limitation, a reference may comprise a network address, a uniform resource locator (URL), any combination thereof, and so forth.

For certain example embodiments, at action 1006c, a second communication device 102-2 may transmit or a first communication device 102-1 may receive a message indicating that a communication flow is accepted if it may correspond at least partially to text. For certain example implementations, a message may include a reference to a network communication device that is to perform conversions. At action 1006d, a first communication device 102-1 may provide a first user 104-1 with an opportunity to switch to text (e.g., to establish a single-modality textual communication), with an opportunity to continue a communication with first user interactivity including voice (e.g., to establish a dual-modality voice and textual communication), with an opportunity to propose a different one or more interactivity-types of communication(s), with an opportunity to approve a designated conversion service, with an opportunity to request a different conversion service, any combination thereof, with an opportunity to perform the conversion itself, and so forth. For certain examples as described herein, with respect to action 1006d, it is given that a first user 104-1 elects to continue a communication flow as a multi-modality communication with voice interaction for first user 104-1 and (at least partial) textual interaction for second user 104-2 and that a referenced conversion service may be used for conversion.

For certain example embodiments, at action 1006e, a first communication device 102-1 may accept user voice input. At action 1006f, a first communication device 102-1 may transmit (e.g., to a destination corresponding to a reference received at action 1006c) or a network communication device 602 may receive voice data. At action 1006g, a network communication device 602 may convert voice data to text (e.g., to converted text data). At action 1006h, a network communication device 602 may transmit or a second communication device 102-2 may receive converted text data. Network communication device 602 may be informed of a destination for converted text data of a given communication flow as part of action 1006f (e.g., from first communication device 102-1). Additionally or alternatively, network communication device 602 may be informed of a destination for converted text data of a given communication flow via a message (not explicitly shown) that is received from second communication device 102-2. As indicated in FIG. 10C, sequence diagram 1006 is continued with sequence diagram 1008 of FIG. 10D.

With reference to FIG. 10D, for certain example embodiments, at action 1008a, a second communication device 102-2 may present text output (e.g., as converted by network communication device 602) to a second user 104-2. At action 1008b, a second communication device 102-2 may accept user text input. At action 1008c, a second communication device 102-2 may transmit or a network communication device 602 may receive text data. At action 1008d, a network communication device 602 may convert text data to voice (e.g., to converted voice data). For certain example implementations, a network communication device 602 may access parameters 804 (e.g., of FIG. 8) at an entry that corresponds to a given communication flow (e.g., as indicated by a communication flow ID 808) to determine a communication flow endpoint (e.g., from communication flow endpoint(s) 810) or a channel on which to transmit converted voice data. At action 1008e, a network communication device 602 may transmit or a first communication device 102-1 may receive converted voice data. For an example implementation, the converted voice data may be sent to first communication device 102-1 via a voice channel already established (and maintained) between network communication device 602 and first communication device 102-1 for a given communication flow (e.g., that is used for action 1006f). At action 1008f, a first communication device 102-1 may present voice data as voice output to a first user 104-1, which voice data may comprise converted voice data that was converted by a network communication device 602 and sent to first communication device 102-1 by network communication device 602.

FIGS. 10E, 10F, 10G, and 10H depict example sequence diagrams 1010, 1012, 1014, and 1016, respectively, for example multi-modality communications. As shown, by way of example but not limitation, each sequence diagram may include a first communication device 102-1, a second communication device 102-2, or a network communication flow device 602*, as well as multiple actions. Although actions of sequence diagrams 1010, 1012, 1014, and 1016 are shown or described in a particular sequence, it should be understood that methods or processes may be performed in alternative manners without departing from claimed subject matter, including, but not limited to, with a different sequence or number of actions, with a different relationship between or among actions, with a different communication device (or node) performing action(s), or any combination thereof, and so forth. Also, at least some actions of sequence diagrams 1010, 1012, 1014, and 1016 may be performed so as to be fully or partially overlapping with other action(s) in a temporal sense, in a communication sense (e.g., over one or more channels), in a processing sense (e.g., using multiple cores, multitasking, a combination thereof, etc.), some combination thereof, and so forth. By way of example only, a given communication or channel may comprise a fully or partially duplex communication, thereby enabling independent or overlapping transmissions or receptions.

For certain example embodiments, a network communication device 602 may comprise a network communication flow device 602*. As used herein, a network communication flow device 602* may comprise a network communication device 602 through which data of a communication flow is to propagate regardless of whether a conversion is to be applied to the communication flow. By way of example but not limitation, a telecommunications node that is routing data for a communication flow between two communication devices 102 regardless of whether communication-modality-conversion processing is to be applied to the communication flow may comprise a network communication flow device 602*. As another example, but not by way of limitation, an Internet server or cable node that is routing voice-over-IP (VoIP) data between two communication devices 102 regardless of whether communication-modality-conversion processing is to be applied to the communication flow may comprise a network communication flow device 602*. Although schematic diagrams 1010, 1012, 1014, and 1016 (e.g., of FIGS. 10E, 10F, 10G, and 10H, respectively) are illustrated and described with regard to an example network communication flow device 602* and schematic diagrams 1002, 1004, 1006, and 1008 (e.g., of FIGS. 10A, 10B, 10c, and 10D, respectively) are illustrated and described with regard to an example network communication device 602, one or more aspects of any schematic diagram may be implemented with respect to another schematic diagram, unless context dictates otherwise.

As depicted, by way of example but not limitation, each example multi-modality communication includes a communication flow that may be initiated by a first communication device 102-1. However, multi-modality communications may alternatively or additionally include communications that may be initiated by a second communication device 102-2. As illustrated, by way of example but not limitation, each example multi-modality communication may involve at least two communication modalities that include voice interaction or text interaction by a user of a first or a second communication device 102-1 or 102-2. However, multi-modality communications may alternatively or additionally involve two or more communication modalities that include voice interaction, text interaction, video interaction, any combination thereof, and so forth. As shown in sequence diagrams 1010 and 1012, by way of example but not limitation, a second communication device 102-2, such as in conjunction with an indication from a second user 104-2 (e.g., of FIG. 6), may determine that a communication is to comprise a multi-modality communication at or around when a communication flow is initiated. However, a first communication device 102-1 (or a user thereof) may additionally or alternatively determine that a communication flow is to comprise a multi-modality communication at or around a time of initiation of the communication flow.

Additionally or alternatively, as shown in sequence diagrams 1014 and 1016, by way of example but not limitation, a second communication device 102-2, such as in conjunction with an indication from a second user 104-2 (e.g., of FIG. 6), may determine that one or more future communications are to comprise one or more multi-modality communications prior to when a communication flow is initiated (e.g., by establishing one or more settings at a network communication flow device 602*). However, a first communication device 102-1 (or a user thereof) may additionally or alternatively determine that a communication flow is to be a multi-modality communication prior to a time of initiation of the communication flow. Furthermore, a communication flow may be migrated to a multi-modality communication or from one modality type conversion to another modality type conversion at virtually any time during a communication by a communication device or a network communication device. Moreover, a communication device may additionally or alternatively initiate a communication flow as a multi-modality communication.

For certain example embodiments, sequence diagrams 1010, 1012, 1014, and 1016 may include one or more transmissions or receptions. Transmissions or receptions may be made, by way of example but not limitation, from or to a first communication device 102-1, from or to a second communication device 102-2, or from or to a network communication flow device 602*. A given transmission or reception may be made via any one or more channels 108 (e.g., of FIG. 6). Examples of channels may include, but are not limited to, a voice connection channel, a voice data channel, a voice over internet protocol (VOIP) channel, a packet data channel, a signaling channel, a channel over the Internet (e.g., a session), a cellular-text-messaging channel, an Internet or telecommunications backbone, any combination thereof, and so forth. Additionally or alternatively, although two communication devices and one network communication device (e.g., a network communication flow device 602*) are shown as participating in a given communication flow, more than two communication devices, more than two users, or more than one network communication device may participate in a given communication flow.

Figure 10E:
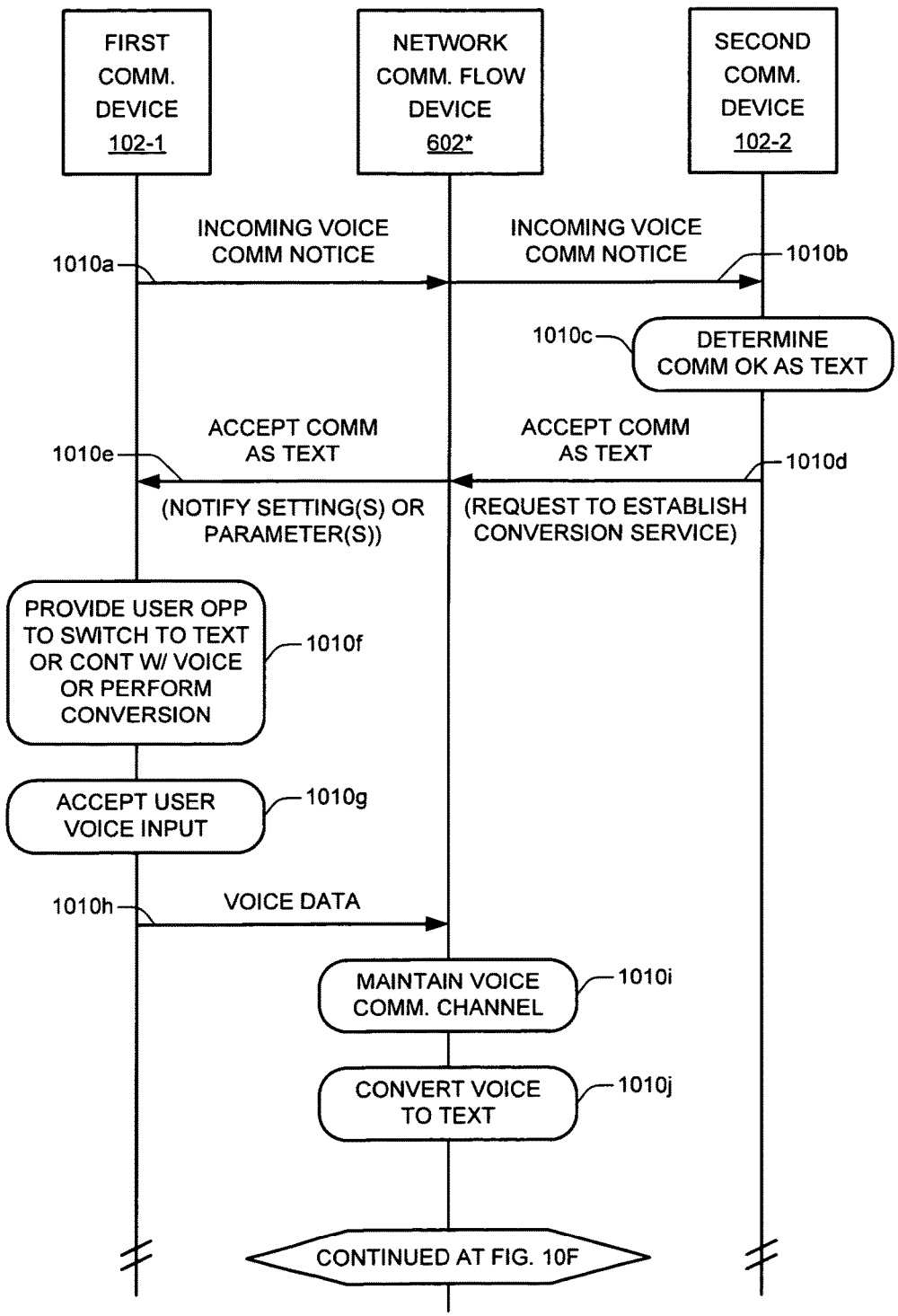
FIGS. 10E and 10F are sequence diagrams that jointly illustrate an example multi-modality communication in which interceptive conversion may be performed at a network communication flow device responsive to a current request from a destination device in accordance with certain example embodiments.
Figure 10F:
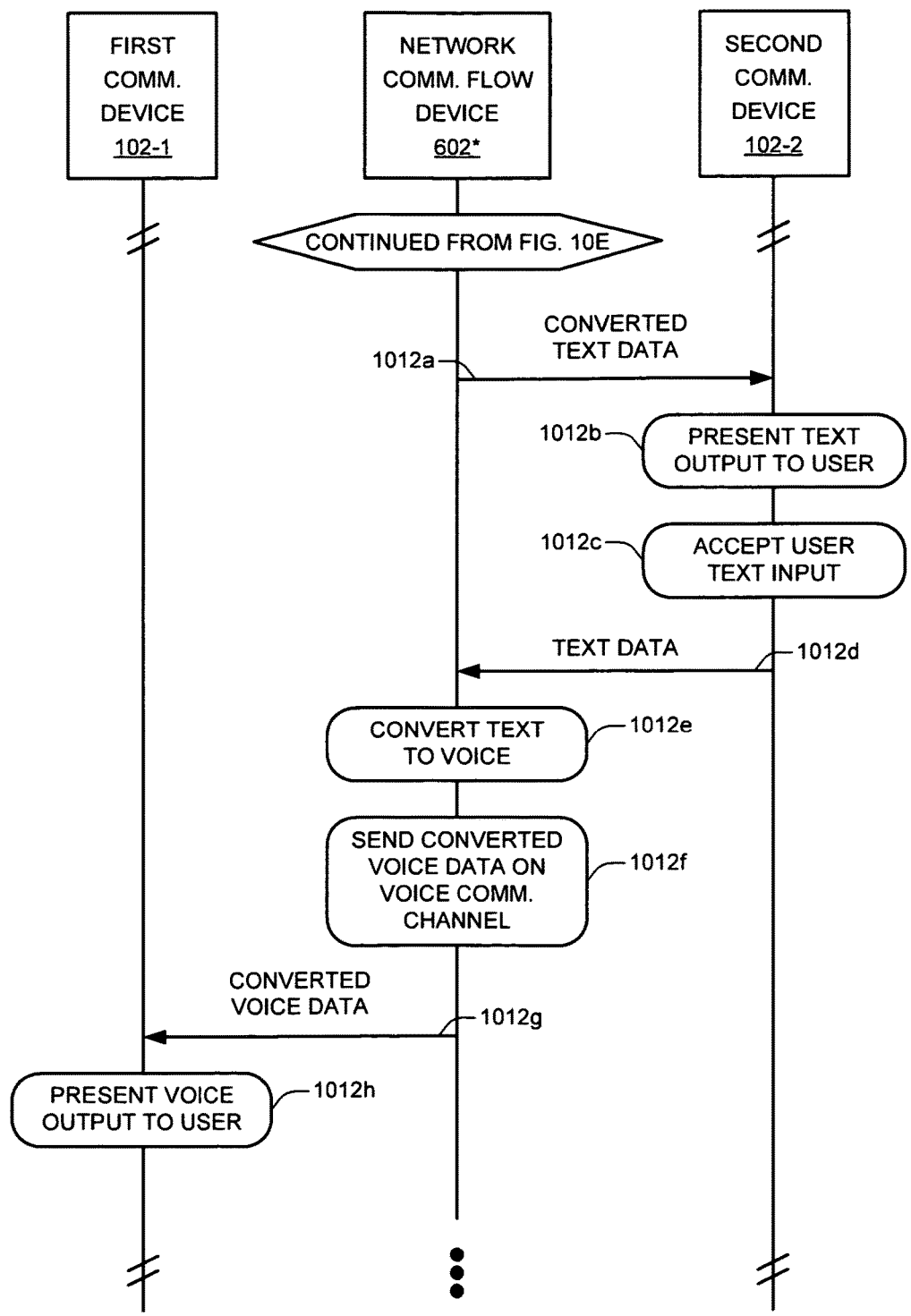

FIGS. 10E and 10F are sequence diagrams 1010 and 1012 that jointly illustrate an example multi-modality communication in which interceptive conversion may be performed at a network communication flow device responsive to a current request from a destination device in accordance with certain example embodiments. As shown in FIGS. 10E and 10F, by way of example but not limitation, one or more of actions 1010a-1010j or 1012a-1012h may be performed for a communication flow. For example sequence diagrams 1010 and 1012, a network communication flow device 602* may perform conversions by virtue of being positioned to intercept data sent between first communication device 102-1 and second communication device 102-2 or responsive to a roughly contemporaneous request from a second communication device 102-2.

For certain example embodiments, at action 1010a, a first communication device 102-1 may transmit or a network communication flow device 602* may receive a notification of an incoming communication that corresponds to voice. By way of example but not limitation, a notification may comprise a text message, a ringing signal, a communication inquiry, a communication notice, a session initiation message, any combination thereof, and so forth. At action 1010b, a network communication flow device 602* may transmit or a second communication device 102-2 may receive a notification of an incoming communication that corresponds to voice (e.g., a network communication flow device 602* may generate or may forward or route to second communication device 102-2 a notification of an incoming communication that corresponds to voice).

For certain example embodiments, at action 1010c, second communication device 102-2 may determine that a communication flow may continue in a manner that is at least partially corresponding to text. For certain example implementations, second communication device 102-2 may make a determination based, at least partly, on an existing intimacy setting (e.g., on a current default intimacy setting), on a contemporaneous intimacy setting indication provided by second user 104-2 (e.g., of FIG. 6) (e.g., by a second user without prompting, by a second user in response to options presented by a second communication device in conjunction with presentation of a call notification to the second user, some combination thereof, etc.), any combination thereof, and so forth.

For certain example embodiments, at action 1010d, a second communication device 102-2 may transmit or a network communication flow device 602* may receive a message indicating that a communication flow is accepted if it may correspond at least partially to text. For certain example implementations, a message indicating that a communication flow is accepted or a different message may request that a conversion service be established by network communication flow device 602* for the instant communication flow. A message or messages may specify parameters (e.g., parameters 804 (e.g., of FIG. 8)) for a conversion, may reference conversion settings (e.g., settings 802 (e.g., of FIG. 8)) for second communication device 102-2 or a user of second communication device 102-2, some combination thereof, and so forth. At action 1010e, a network communication flow device 602* may transmit or a first communication device 102-1 may receive a message indicating that a communication flow is accepted if it may correspond at least partially to text. For certain example implementations, a message indicating that a communication flow is accepted or a different message may notify a first communication device 102-1 of one or more settings or one or more parameters related to at least one aspect of a requested conversion.

For certain example embodiments, at action 1010f, a first communication device 102-1 may provide a first user 104-1 (e.g., of FIG. 6) with an opportunity to switch to text (e.g., to establish a single-modality textual communication), with an opportunity to continue a communication with first user interactivity including voice (e.g., to establish a dual-modality voice and textual communication), with an opportunity to propose a different one or more interactivity-types of communication(s), with an opportunity to request one or more settings or parameters be changed, with an opportunity to elect to perform a conversion (e.g., fully or partially in lieu of a conversion being performed by a network communication flow device 602*), any combination thereof, and so forth. For certain examples as described herein, with respect to action 1010f, it is given that a first user 104-1 elects to continue a communication flow as a multi-modality communication with voice interaction for first user 104-1 and (at least partial) textual interaction for second user 104-2 and with conversion being performed by network communication flow device 602*. This election may be communicated to a network communication flow device 602* or second communication device 102-2 (not explicitly shown in FIG. 10E). At action 1010g, a first communication device 102-1 may accept user voice input. For an example implementation, a first communication device 102-1 may enable voice interaction with a first user 104-1 by accepting voice input via at least one user input interface 516a (e.g., of FIG. 5), such as at least one microphone. At action 1010h, a first communication device 102-1 may transmit or a network communication flow device 602* may receive voice data.

For certain example embodiments, at action 1010i, a network communication flow device 602* may maintain a voice communication channel. For certain example implementations, a network communication flow device 602* may maintain at least a voice communication channel at least with first communication device 102-1 (e.g., at least partially while network communication flow device 602* communicates with second communication device 102-2 via at least text). At action 1010j, a network communication flow device 602* may convert voice data to text (e.g., to converted text data). As indicated in FIG. 10E, sequence diagram 1010 is continued with sequence diagram 1012 of FIG. 10F.

With reference to FIG. 10F, for certain example embodiments, at action 1012a, a network communication flow device 602* may transmit or a second communication device 102-2 may receive converted text data. At action 1012b, a second communication device 102-2 may present text output (e.g., as converted by network communication flow device 602*) to a second user 104-2 (e.g., of FIG. 6). For an example implementation, a second communication device 102-2 may display text to a second user 104-2 via at least one user output interface 516b (e.g., of FIG. 5), such as at least one display screen. At action 1012c, a second communication device 102-2 may accept user text input. For an example implementation, a second communication device 102-2 may accept text input from a second user 104-2 via at least one user input interface 516a, such as a physical or virtual keyboard. At action 1012d, a second communication device 102-2 may transmit or a network communication flow device 602* may receive text data.

For certain example embodiments, at action 1012e, a network communication flow device 602* may convert text data to voice (e.g., to converted voice data). At action 1012f, a network communication flow device 602* may determine that the converted voice data is to be sent to a first communication device 102-1. For an example implementation, the converted voice data may be sent to first communication device 102-1 via a voice channel already established (and maintained) between network communication flow device 602* and first communication device 102-1 for a given communication flow. At action 1012g, a network communication flow device 602* may transmit or a first communication device 102-1 may receive converted voice data. At action 1012h, a first communication device 102-1 may present voice data as voice output to a first user 104-1, which voice data may comprise converted voice data that was converted by a network communication flow device 602*.

Figure 10G:
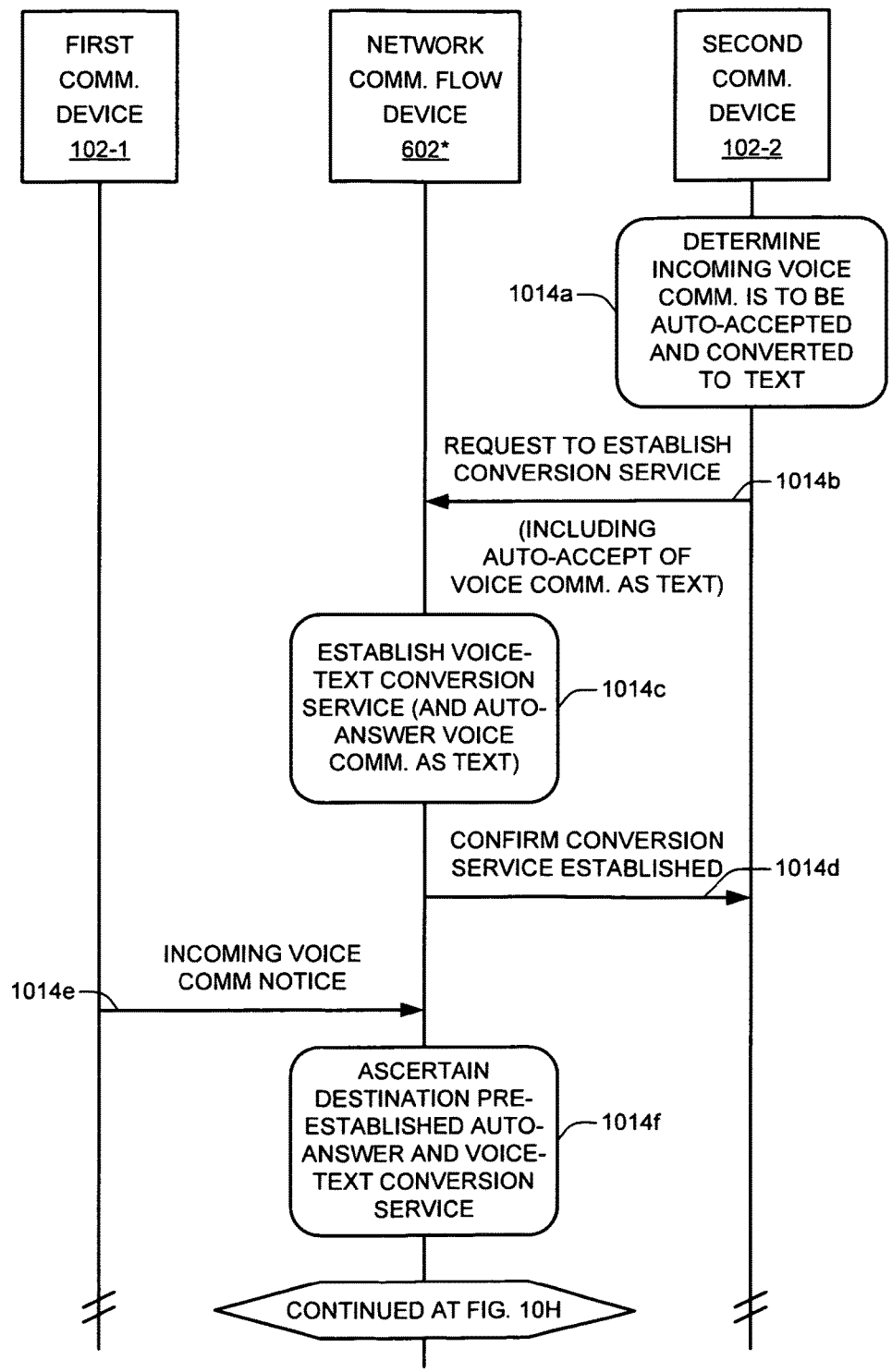
FIGS. 10G and 10H are sequence diagrams that jointly illustrate an example multi-modality communication in which interceptive conversion may be performed at a network communication flow device responsive to a previous request or an established setting from a destination device in accordance with certain example embodiments.
Figure 10H:
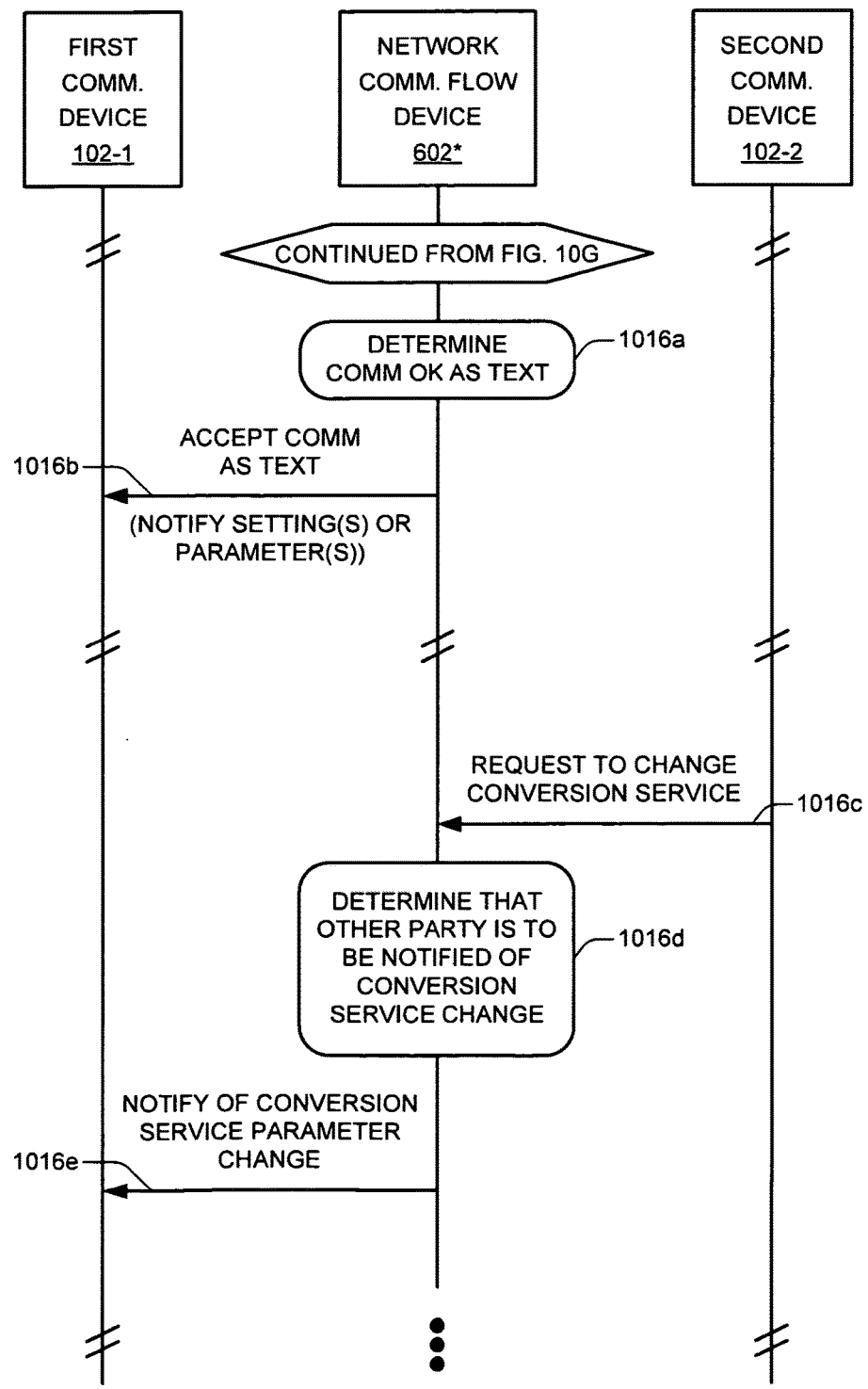

FIGS. 10G and 10H are sequence diagrams 1014 and 1016 that jointly illustrate an example multi-modality communication in which interceptive conversion may be performed at a network communication flow device responsive to a previous request or an established setting from a destination device in accordance with certain example embodiments. As shown in FIGS. 10G and 10H, by way of example but not limitation, one or more of actions 1014a-1014f or 1016a-1016e may be performed for a communication flow. For example sequence diagrams 1014 and 1016, a network communication flow device 602* may perform conversions by virtue of being positioned to intercept data sent between first communication device 102-1 and second communication device 102-2 or responsive to a previous request or a stored setting from a second communication device 102-2 or a user thereof.

For certain example embodiments, at action 1014a, a second communication device 102-2 or a second user 104-2 (e.g., of FIG. 6) may determine that a future incoming voice communication is to be auto-accepted and converted to text. At action 1014b, a second communication device 102-2 may transmit or a network communication flow device 602* may receive a request to establish a conversion service. A request may indicate that incoming voice communications are to be auto-accepted as text (e.g., by a network communication flow device 602*) and that voice data is to be converted to text data (e.g., by a network communication flow device 602*). Additionally or alternatively, a second user 104-2 may establish settings or parameters for conversion of communications in which a second communication device 102-2 is to participate using a different device than second communication device 102-2.

For certain example embodiments, at action 1014c, a network communication flow device 602* may establish a voice-text conversion service or an auto-accept (e.g., an auto-answer) service for second communication device 102-2 responsive to a request. For an example implementation, a network communication flow device 602* may establish an auto-answer setting for incoming voice calls that are to be accepted as corresponding at least partially to text and may establish a voice-text conversion service. At action 1014d, a network communication flow device 602* may transmit or a second communication device 102-2 may receive a notification confirming that a conversion service or an auto-accept setting has been established.

For certain example embodiments, after an auto-answer or conversion service has been established (e.g., at action 1014c), at action 1014e, a first communication device 102-1 may transmit or a network communication flow device 602* may receive an incoming voice communication notice. By way of example but not limitation, a notification may comprise a text message, a ringing signal, a communication inquiry, a communication notice, a session initiation message, any combination thereof, and so forth. For certain example implementations, a notification may include a destination, such as second communication device 102-2 or a second user 104-2, for a communication flow. At action 1014f, a network communication flow device 602* may ascertain that a destination for an incoming voice communication notice has pre-established an auto-answer service or a voice-text conversion service. As indicated in FIG. 10G, sequence diagram 1014 is continued with sequence diagram 1016 of FIG. 10H.

With reference to FIG. 10H, for certain example embodiments, at action 1016a, a network communication flow device 602* may determine that a communication flow may continue in a manner that is at least partially corresponding to text based on, at least partly, at least one auto-answer voice calls setting, at least one voice-text conversion setting, at least one auto-answer-voice-calls-as-text setting, some combination thereof, and so forth. For certain example implementations, a network communication flow device 602* may make a determination responsive to a previous request by a second communication device 102-2 or a second user 104-2, responsive to stored settings (e.g., settings 802 (e.g., of FIG. 8)), responsive to stored parameters (e.g., parameters 804 (e.g., of FIG. 8)), any combination thereof, and so forth. At action 1016b, a network communication flow device 602* may transmit or a first communication device 102-1 may receive a message indicating that a communication flow is accepted if it may correspond at least partially to text. For certain example implementations, a message indicating that a communication flow is accepted or a different message may notify a first communication device 102-1 of one or more settings or one or more parameters related to a conversion for a requested communication. Although not shown in sequence diagram 1016 of FIG. 10H, a communication flow between first communication device 102-1 and second communication device 102-2 may continue after action 1016b in accordance with actions 1010f-1010j of sequence diagram 1010 (e.g., of FIG. 10E) or actions 1012a-1012h of sequence diagram 1012 (e.g., of FIG. 10F).

For certain example embodiments, e.g. during a communication flow between first communication device 102-1 and second communication device 102-2, second communication device 102-2 may request to change one or more aspects of a conversion service. At action 1016c, a second communication device 102-2 may transmit or a network communication flow device 602* may receive a request to change at least one aspect of a conversion service that is being provided by network communication flow device 602*. At action 1016d, network communication flow device 602* may determine that another participant is to be notified of a conversion service change. At action 1016e, a network communication flow device 602* may transmit or a first communication device 102-1 may receive a notification of a change to at least one aspect of conversion service, such as a change to at least one conversion parameter, at least one conversion setting, at least one communication modality, any combination thereof, and so forth. Although not shown in sequence diagram 1016, in response to a notification, first communication device 102-1 may be afforded an opportunity to terminate a communication flow, reject a (proposed) conversion parameter change, request a conversion parameter change, negotiate a different conversion parameter change, any combination thereof, and so forth. Although not shown in sequence diagram 1016, first communication device 102-1 may additionally or alternatively request a change to a conversion service (e.g., request from or request a change by network communication flow device 602*), or second communication device 102-2 may receive a notification of a requested conversion service parameter change from network communication flow device 602*.

Figure 11:
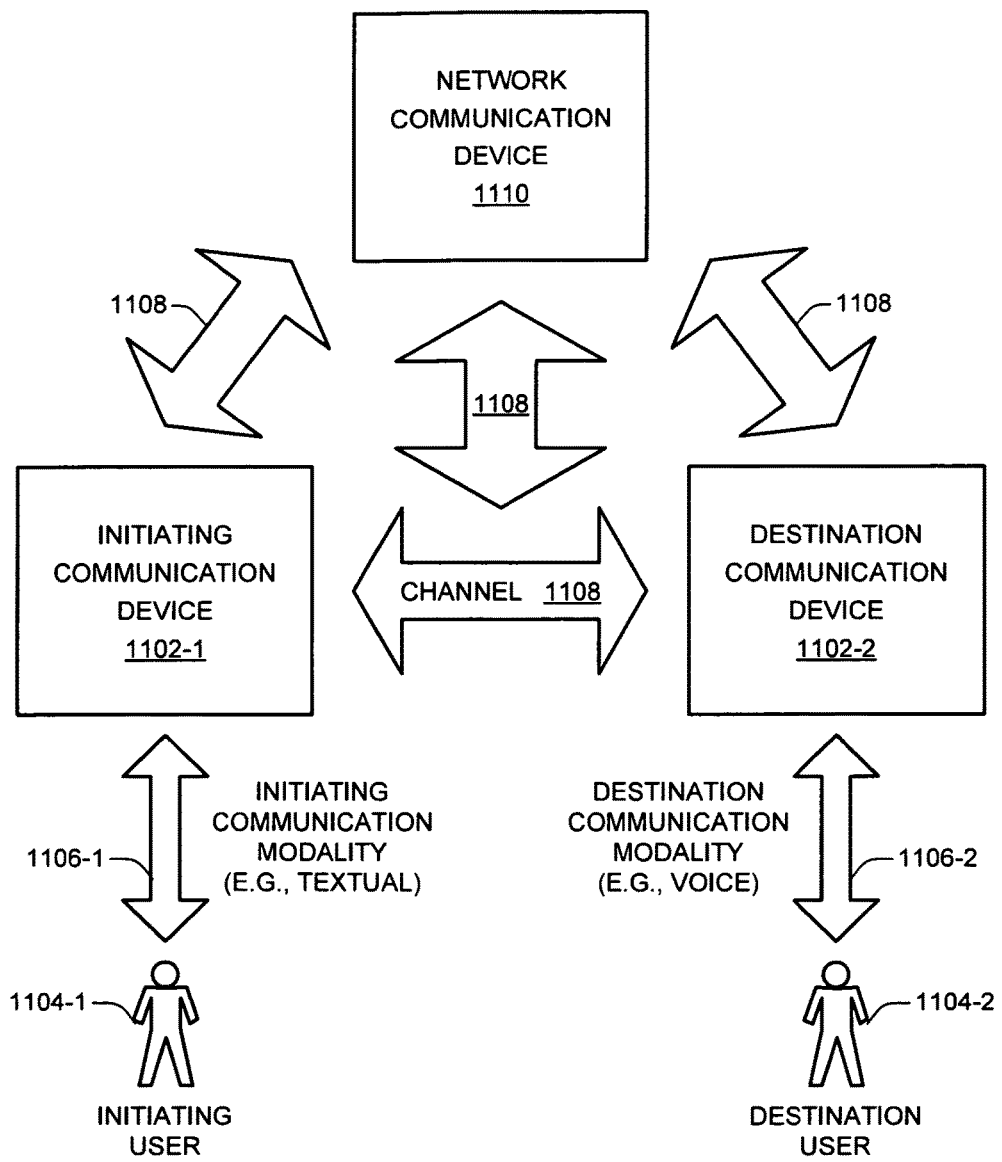
FIG. 11 is an example schematic diagram of an initiating communication device and a destination communication device, which may be participating in a multi-modality communication, plus a network communication device in accordance with certain example embodiments.

FIG. 11 is an example schematic diagram 1100 of an initiating communication device and a destination communication device, which may be participating in a multi-modality communication, plus a network communication device in accordance with certain example embodiments. As shown in FIG. 11, by way of example but not limitation, schematic diagram 1100 may include communication devices 1102, users 1104, communication modalities 1106, at least one channel 1108, or at least one network communication device 1110. More specifically, schematic diagram 1100 may include an initiating communication device 1102-1, an initiating user 1104-1, an initiating communication modality 1106-1, a destination communication device 1102-2, a destination user 1104-2, a destination communication modality 1106-2, one or more channels 1108, or at least one network communication device 1110.

For certain example embodiments, a user 1104 may be associated with a communication device 1102. A user 1104 may be interacting with a communication device 1102 via at least one communication modality 1106. More specifically, but by way of example only, initiating user 1104-1 may be associated with initiating communication device 1102-1. Initiating user 1104-1 may be interacting with initiating communication device 1102-1 via at least one initiating communication modality 1106-1. Additionally or alternatively, destination user 1104-2 may be associated with destination communication device 1102-2. Destination user 1104-2 may be interacting with destination communication device 1102-2 via at least one destination communication modality 1106-2. For certain example implementations, initiating communication device 1102-1 or initiating user 1104-1 may initiate or may be initiating at least one multi-modality communication (not explicitly shown in FIG. 11) with destination communication device 1102-2 or destination user 1104-2 via one or more channels 1108. By way of example but not limitation, initiating communication device 1102-1 or initiating user 1104-1 may comprise a calling party, or destination communication device 1102-2 or destination user 1104-2 may comprise a called party.

For certain example embodiments, a channel 1108 may comprise, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a public-switched telephone network (PSTN), at least part of a cable network, at least part of a cellular network connection, at least part of an Internet connection, at least part of a Wi-Fi connection, at least part of a WiMax connection, at least part of an internet backbone, at least part of a satellite network, at least part of a fibre network, multiple instances of any of the above, any combination of the above, and so forth. A channel 1108 may include one or more nodes (e.g., a telecommunication node, an access point, a base station, an internet server, a gateway, any combination thereof, etc.) through which signals, which may bear data, are propagated. For certain example implementations, a network communication device 1110 may communicate with initiating communication device 1102-1 or destination communication device 1102-2 using any one or more of multiple channels 1108, a few examples of which are shown in schematic diagram 1100. Additionally or alternatively, description that may be applicable to one or more channels 1108 is provided herein above with regard to channels 108. Additionally or alternatively, description that may be applicable to communication devices 1102, users 1104, communication modalities 1106, or network communication devices 1110 is provided herein above with regard to communication devices 102, users 104, communication modalities 106, or network communication devices 602 (or 602*), respectively.

For certain example embodiments, a multi-modality communication may be initiated by initiating communication device 1102-1, initiating user 1104-1, any combination thereof, and so forth. For certain example implementations, initiating communication modality 1106-1 may comprise at least a textual interaction modality, and destination communication modality 1106-2 may comprise at least a voice interaction modality. For certain example implementations, initiating communication modality 1106-1 or destination communication modality 1106-2 may change from one communication modality to another communication modality during a given multi-modality communication, across different communications, some combination thereof, and so forth. Additionally or alternatively, a different communication modality may be referred to herein as a "another communication modality", for example.

Moreover, it should be understood that the terms "initiating" or "destination" may, depending on context, be a matter of perspective. For instance, a communication device 1102 or a user 1104 or a communication modality 1106 may be considered a initiating one at a given moment, for a given communication, from a given perspective, etc. but may be considered a destination one at a different moment (e.g., for a "call back"), for a different communication (e.g., for a subsequent communication), from a different perspective (e.g., for starting a multi-party teleconference), etc. However, one of ordinary skill in the art will recognize that the term "initiating" or "destination" may serve, depending on context, to indicate that different interactions, acts, operations, functionality, a combination thereof, etc. may be occurring at, may be more closely associated with, a combination thereof etc. one side, aspect, location, combination thereof, etc. with a particular communication device of a given communication flow as compared to another side, aspect, location, combination thereof, etc. with a different communication device of the given communication flow. For example, a signal to request that a voice call be established for one multi-modality communication may be transmitted from an initiating communication device 1102-1 and received at a destination communication device 1102-2 or a network communication device 1110, or another signal to request that a voice call be established for another multi-modality communication (e.g., a subsequent multi-modality communication, a multi-modality communication including another device, a combination thereof, etc.) may be transmitted from a "destination" communication device 1102-2 and received at a network communication device 1110 or at another communication device 1102, such as at an "initiating" communication device 1102-1.

Figure 12:
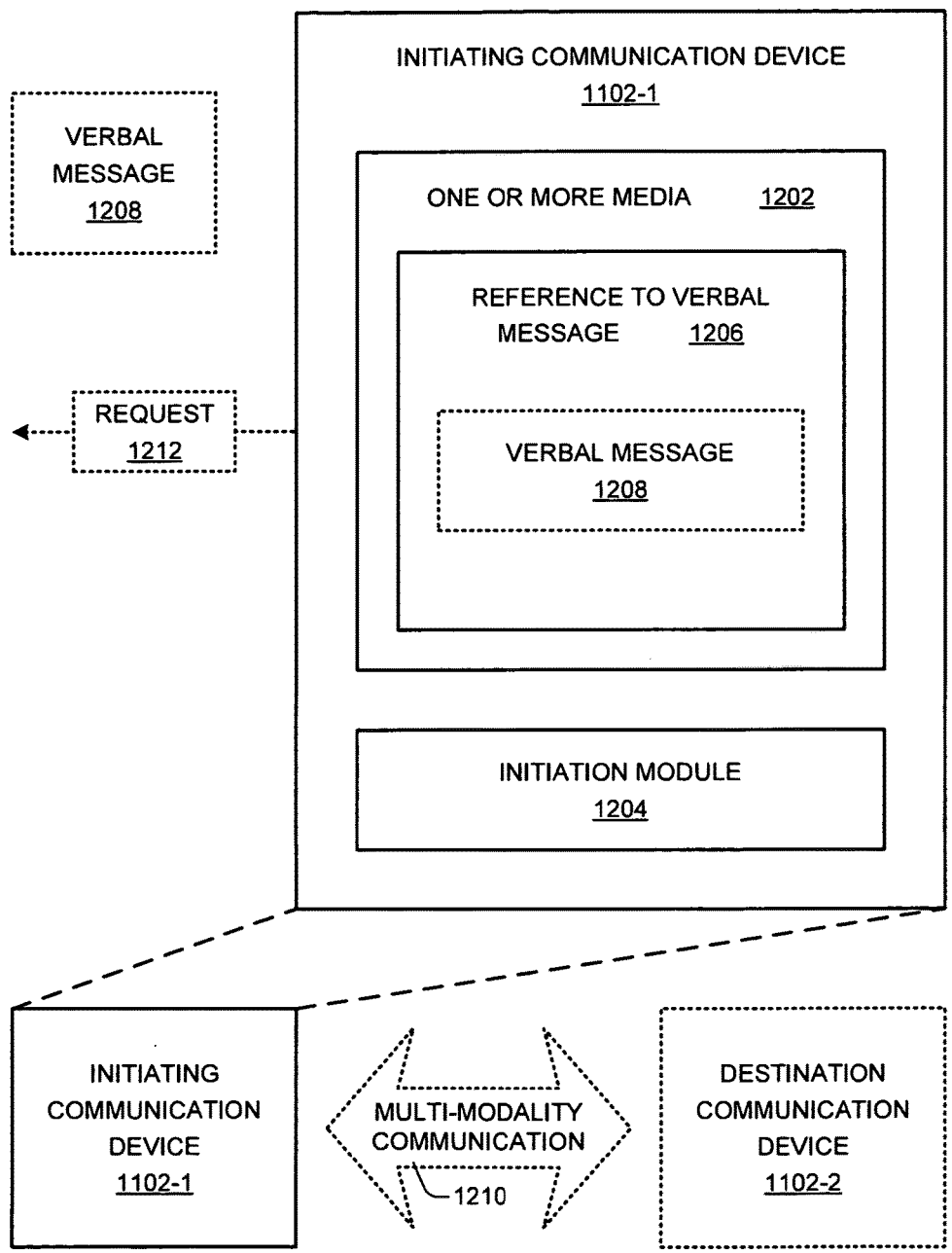
FIG. 12 is a schematic diagram of an example initiating communication device that may initiate a multi-modality communication using at least a reference to a verbal message in accordance with certain example embodiments.

FIG. 12 is a schematic diagram 1200 of an example initiating communication device that may initiate a multi-modality communication using at least a reference to a verbal message in accordance with certain example embodiments. As shown in FIG. 12, by way of example but not limitation, schematic diagram 1200 may include an initiating communication device 1102-1, a destination communication device 1102-2, a multi-modality communication 1210, a verbal message 1208, or a request 1212. More specifically, an initiating communication device 1102-1 may include one or more media 1202 or an initiation module 1204. Media 1202 may include a reference to a verbal message 1206, which may include a verbal message 1208. For certain example embodiments, an initiation module 1204 may be realized as hardware, firmware, software, fixed circuitry, any combination thereof, and so forth.

For certain example embodiments, a communication device for initiating a multi-modality communication may comprise one or more media to store at least a reference to a verbal message, the verbal message to notify a destination of a voice communication, the voice communication comprising a multi-modality communication in which an initiating user is to interact with the communication device using a textual interaction modality; and an initiation module to initiate the multi-modality communication using the at least a reference to the verbal message. For certain example implementations, an initiating communication device 1102-1 may include one or more media 1202 to store at least a reference to a verbal message 1206, with the verbal message to notify a destination (e.g., a destination communication device 1102-2, a destination user 1104-2, a combination thereof, etc.) of a voice communication. The voice communication may comprise a multi-modality communication 1210 in which an initiating user (e.g., an initiating user 1104-1 (e.g., of FIG. 11)) is to interact with initiating communication device 1102-1 using a textual interaction modality. An initiating communication device 1102-1 may further include an initiation module 1204 to initiate multi-modality communication 1210 using at least a reference to the verbal message 1206. However, claimed subject matter is not limited to any particular described embodiments, implementations, examples, etc.

For certain example embodiments, the one or more media to store at least a reference to a verbal message may comprise one or more media to store the at least a reference to the verbal message, the verbal message comprising a personalized recorded message. For certain example implementations, one or more media 1202 to store at least a reference to a verbal message 1206 may comprise one or more media 1202 to store at least a reference to the verbal message 1206 in which the verbal message comprises a personalized recorded message. By way of example but not limitation, an initiating communication device 1102-1 may enable an initiating user 1104-1 to record a personal message that may be sent to a destination user 1104-2 if a multi-modality communication 1210 is initiated. However, claimed subject matter is not limited to any particular described embodiments, implementations, examples, etc.

For certain example embodiments, the one or more media to store at least a reference to a verbal message may comprise one or more media to store the verbal message. For certain example implementations, one or more media 1202 to store at least a reference to a verbal message 1206 may include one or more media 1202 to store a verbal message 1208. By way of example but not limitation, a reference to a verbal message 1206 may comprise an address location or an address range of a verbal message, a name of a file comprising a verbal message, an alphanumeric identifier (e.g., selecting from a predetermined set of verbal messages), a uniform or universal resource identifier or indicator (URI) of a verbal message, a name of person, a file location, a memory location, a pointer reference, any combination thereof, and so forth. However, claimed subject matter is not limited to any particular described embodiments, implementations, examples, etc.

For certain example embodiments, the initiation module to initiate the multi-modality communication using the at least a reference to the verbal message may comprise an initiation module to cause transmission of a request to establish the voice communication and to cause transmission of the at least a reference to the verbal message. For certain example implementations, an initiation module 1204 to initiate a multi-modality communication 1210 using at least a reference to the verbal message 1206 may include an initiation module 1204 to cause transmission of a request 1212 to establish a voice communication and to cause transmission of at least a reference to the verbal message 1206. By way of example but not limitation, an initiation module 1204 may cause a transmission of a request 1212 to a destination communication device 1102-2, a network communication device 1110, a combination thereof, etc. or may cause transmission of at least a reference to the verbal message 1206. A request 1212 may include at least a reference to the verbal message 1206, or at least a reference to the verbal message 1206 may be transmitted separately. Examples of requests 1212 may include, by way of example only, a ringing signal, a call set-up request, a communication inquiry, a session initiation message, a communication notice, any combination thereof, and so forth. For certain example implementations, at least a reference to a verbal message 1206 (e.g., if reference is transmitted) may identify a particular verbal message that is stored external to initiating communication device 1102-1, such as at a destination communication device 1102-2, at a network communication device 1110, a combination thereof, etc. Responsive to identification of a particular verbal message, an identified verbal message may be played. A verbal message may be a personalized message, a standardized message, a recorded message, a synthesized or artificial message, a predetermined (e.g., pre-recorded or previously prepared) message, a roughly contemporaneously recorded message, any combination thereof, and so forth. However, claimed subject matter is not limited to any particular described embodiments, implementations, examples, etc.

For certain example embodiments, the initiation module to initiate the multi-modality communication using the at least a reference to the verbal message may comprise an initiation module to cause transmission of a request to establish the voice communication and to cause transmission of the verbal message from the communication device. For certain example implementations, an initiation module 1204 to initiate a multi-modality communication 1210 using at least a reference to the verbal message 1206 may include an initiation module 1204 to cause transmission of a request 1212 to establish a voice communication and to cause transmission of a verbal message 1208 from initiating communication device 1102-1. By way of example but not limitation, a verbal message 1208 may be transmitted from an initiating communication device 1102-1 to a destination communication device 1102-2, a network communication device 1110, a combination thereof, etc. as part of or separate from a request 1212. However, claimed subject matter is not limited to any particular described embodiments, implementations, examples, etc.

For certain example embodiments, an initiating communication device 1102-1 may further be implemented wherein the verbal message is further to notify the destination that the initiating user is to interact with the communication device using the textual interaction modality. For certain example implementations, a verbal message may further notify a destination (e.g., a destination communication device 1102-2, a destination user 1104-2, a combination thereof, etc.) that an initiating user 1104-1 is to interact with an initiating communication device 1102-1 using a textual interaction modality. However, claimed subject matter is not limited to any particular described embodiments, implementations, examples, etc.

Figure 13:
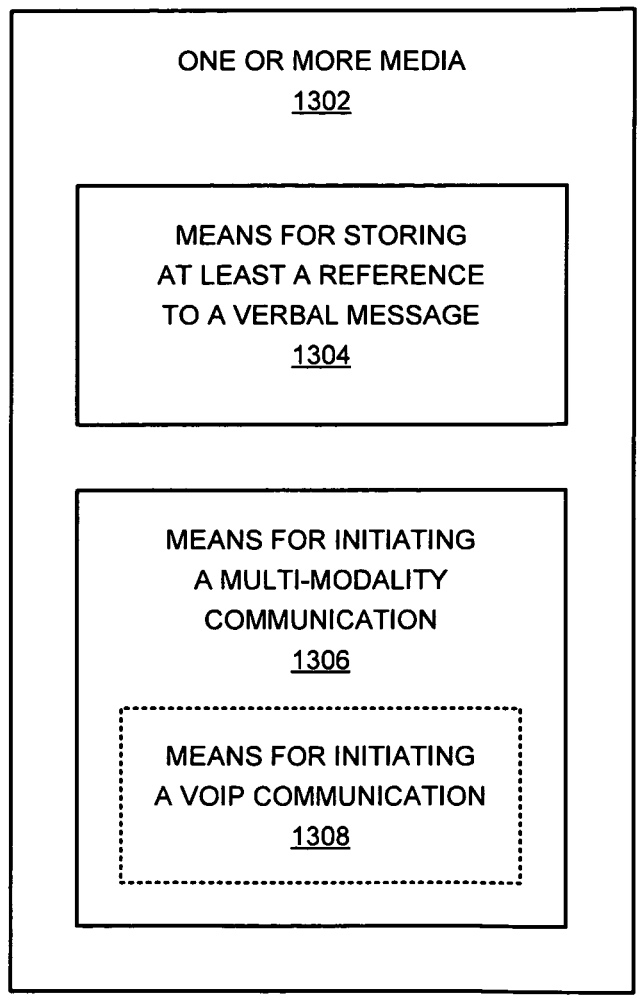
FIG. 13 is a block diagram of an example of one or more media that may be instrumental in initiating a multi-modality communication using at least a reference to a verbal message in accordance with certain example embodiments.

FIG. 13 is a block diagram 1300 of an example of one or more media that may be instrumental in initiating a multi-modality communication using at least a reference to a verbal message in accordance with certain example embodiments. As shown in FIG. 13, by way of example but not limitation, block diagram 1300 may include one or more media 1302 that may include means for storing at least a reference to a verbal message 1304 or means for initiating a multi-modality communication 1306. More specifically, means for initiating a multi-modality communication 1306 may include means for initiating a VoIP communication 1308.

For certain example embodiments, one or more processor-accessible non-transitory media bearing processor-executable instructions may comprise means for storing at least a reference to a verbal message, the verbal message to notify a destination of a voice communication, wherein the voice communication comprises a multi-modality communication in which an initiating user is to interact with an initiating communication device using a textual interaction modality; and means for initiating the multi-modality communication using the at least a reference to the verbal message. For certain example implementations, one or more media 1302 (e.g., media 504 (e.g., of FIG. 5)) may include means for storing at least a reference to a verbal message 1304, with the verbal message to notify a destination of a voice communication, wherein the voice communication comprises a multi-modality communication in which an initiating user is to interact with an initiating communication device using a textual interaction modality. One or more media 1302 may further include means for initiating the multi-modality communication 1306 using the at least a reference to the verbal message. However, claimed subject matter is not limited to any particular described embodiments, implementations, examples, etc.

For certain example embodiments, the means for initiating the multi-modality communication using the at least a reference to the verbal message may comprise means for initiating a voice over internet protocol (VoIP) communication. For certain example implementations, means for initiating the multi-modality communication 1306 using the at least a reference to the verbal message may include means for initiating a voice over internet protocol (VoIP) communication 1308. By way of example but not limitation, means for initiating a voice over internet protocol (VoIP) communication 1308 may formulate, ascertain, retrieve, cause to be transmitted, transmit, some combination thereof, etc. a request (e.g., a call set-up request, a communication inquiry, a session initiation message, a communication notice, a combination thereof, and so forth) to initiate a VoIP communication. However, claimed subject matter is not limited to any particular described embodiments, implementations, examples, etc.

Figure 14:
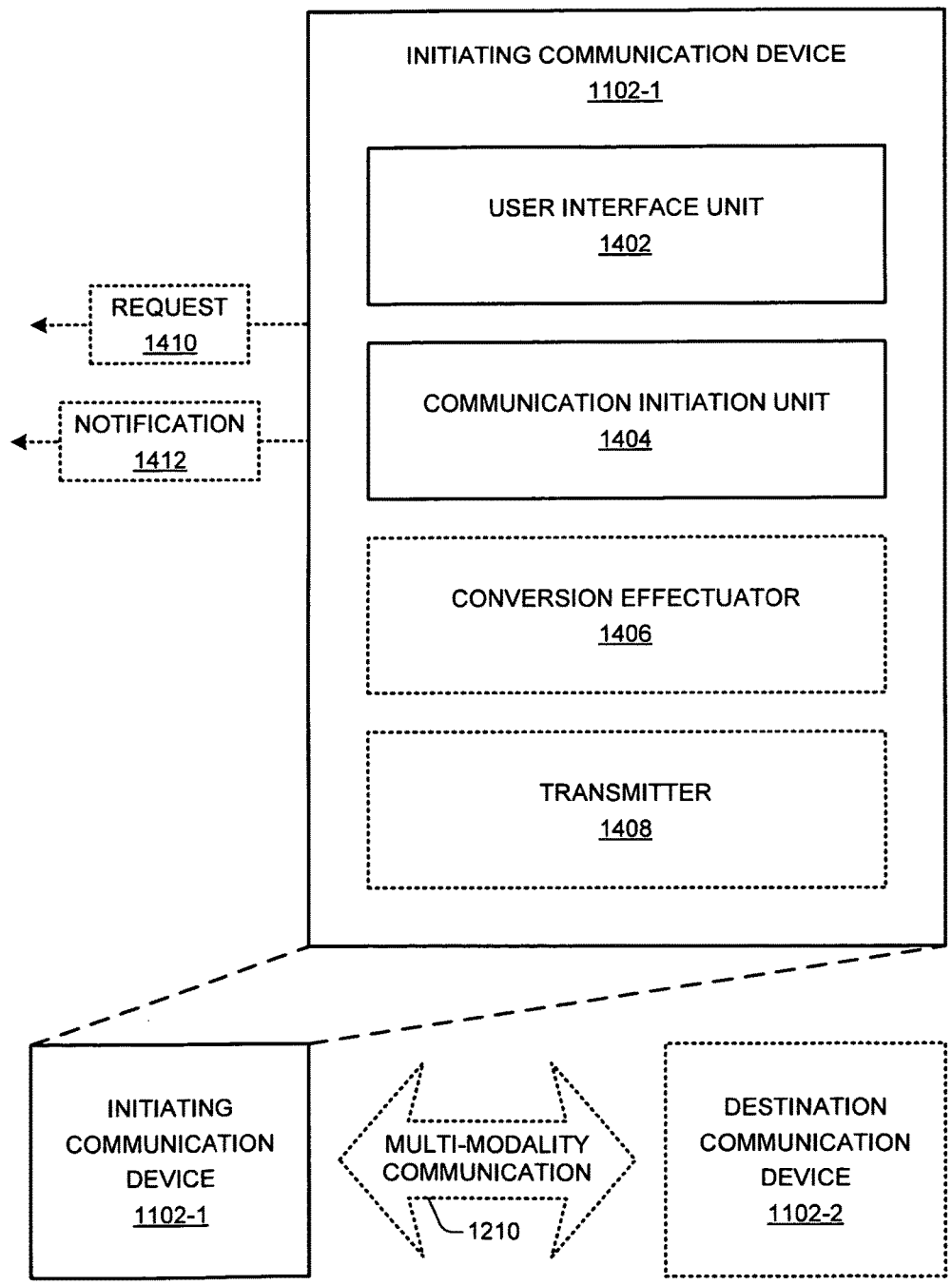
FIG. 14 is a schematic diagram of an example initiating communication device that may facilitate initiation of a multi-modality communication via a user interface in accordance with certain example embodiments.

FIG. 14 is a schematic diagram 1400 of an example initiating communication device that may facilitate initiation of a multi-modality communication via a user interface in accordance with certain example embodiments. As shown in FIG. 14, by way of example but not limitation, schematic diagram 1400 may include an initiating communication device 1102-1, a destination communication device 1102-2, a multi-modality communication 1210, at least one request 1410, or at least one notification 1412. More specifically, an initiating communication device 1102-1 may include a user interface unit 1402, a communication initiation unit 1404, a conversion effectuator 1406, or a transmitter 1408. For certain example embodiments, a user interface unit 1402, a communication initiation unit 1404, a conversion effectuator 1406, or a transmitter 1408 may be realized as hardware, firmware, software, fixed circuitry, any combination thereof, and so forth.

For certain example embodiments, a device may comprise an initiating communication device for initiating a multi-modality communication. An initiating communication device may comprise a user interface unit to provide access to a capability to initiate a multi-modality communication in which an initiating user is to interact with the initiating communication device using a textual interaction modality and a destination user is to interact with a destination communication device using a voice interaction modality; and a communication initiation unit to initiate the multi-modality communication with the destination communication device. For certain example implementations, an initiating communication device 1102-1 may include a user interface unit 1402 to provide access to a capability to initiate a multi-modality communication 1210 in which an initiating user (e.g., an initiating user 1104-1 (e.g., of FIG. 11)) is to interact with initiating communication device 1102-1 using a textual interaction modality (e.g., for an initiating communication modality 1106-1 (e.g., of FIG. 11)) and a destination user (e.g., a destination user 1104-2 (e.g., of FIG. 11)) is to interact with a destination communication device 1102-2 using a voice interaction modality (e.g., for a destination communication modality 1106-2 (e.g., of FIG. 11)). An initiating communication device 1102-1 may further include a communication initiation unit 1404 to initiate multi-modality communication 1210 with destination communication device 1102-2. By way of example but not limitation, a user interface unit 1402 may provide a user interface in accordance with one or more aspects as described herein above at least with particular reference to FIGS. 3B-3F. However, claimed subject matter is not limited to any particular described embodiments, implementations, examples, etc.

For certain example embodiments, a device may comprise an initiating communication device wherein the user interface unit to provide access to a capability to initiate a multi-modality communication may comprise a user interface unit to accept voice input from the initiating user and to provide text output to the initiating user for the multi-modality communication. For certain example implementations, a user interface unit 1402 to provide access to a capability to initiate a multi-modality communication 1210 may include a user interface unit 1402 to accept voice input from an initiating user 1104-1 (e.g., via a user input interface 516a (e.g., of FIG. 5)) and to provide text output to initiating user 1104-1 (e.g., via a user output interface 516b (e.g., of FIG. 5)) for multi-modality communication 1210. However, claimed subject matter is not limited to any particular described embodiments, implementations, examples, etc.

For certain example embodiments, a device may comprise an initiating communication device wherein the user interface unit to provide access to a capability to initiate a multi-modality communication may comprise a user interface unit to accept text input from the initiating user and to provide voice output to the initiating user for the multi-modality communication. For certain example implementations, a user interface unit 1402 to provide access to a capability to initiate a multi-modality communication 1210 may include a user interface unit 1402 to accept text input from an initiating user 1104-1 (e.g., via a user input interface 516a (e.g., of FIG. 5)) and to provide voice output to initiating user 1104-1 (e.g., via a user output interface 516b (e.g., of FIG. 5)) for multi-modality communication 1210. However, claimed subject matter is not limited to any particular described embodiments, implementations, examples, etc.

For certain example embodiments, a device may comprise an initiating communication device wherein the user interface unit to provide access to a capability to initiate a multi-modality communication may comprise a user interface unit to provide at least one option to initiate the multi-modality communication from a texting application that is executable on the initiating communication device. For certain example implementations, a user interface unit 1402 to provide access to a capability to initiate a multi-modality communication 1210 may include a user interface unit 1402 to provide at least one option to initiate multi-modality communication 1210 from a texting application that is executable on initiating communication device 1102-1. By way of example but not limitation, a user interface unit 1402 may provide a virtual component 318 of a user interface feature 310 (e.g., of FIGS. 3B-3F) to enable an initiating user 1104-1 to initiate a multi-modality communication 1210 from a texting application (e.g., a separate texting application, a texting application that is integrated with an operating system, a combination thereof, etc.). However, claimed subject matter is not limited to any particular described embodiments, implementations, examples, etc.

For certain example embodiments, a device may comprise an initiating communication device wherein the user interface unit to provide access to a capability to initiate a multi-modality communication may comprise at least one physical component to initiate the multi-modality communication. For certain example implementations, a user interface unit 1402 to provide access to a capability to initiate a multi-modality communication 1210 may include at least one physical component to initiate multi-modality communication 1210. By way of example but not limitation, a user interface unit 1402 may provide a physical component 316 of a user interface feature 310 (e.g., of FIGS. 3B-3F) to enable, at least in part, an initiating user 1104-1 to initiate a multi-modality communication 1210. For example, a user may move a slider, a switch, a knob, a button, a combination thereof, etc. to a position indicating that an initiating user 1104-1 wishes to interact at a textual intimacy level but wishes a destination user 1104-2 to interact with a voice intimacy level. Additionally or alternatively, an initiating user 1104-1 may place a voice call and move a physical component 316 to a textual intimacy level while an initiating communication device 1102-1 is dialing. However, claimed subject matter is not limited to any particular described embodiments, implementations, examples, etc.

For certain example embodiments, a device may comprise an initiating communication device wherein the user interface unit to provide access to a capability to initiate a multi-modality communication may comprise a user interface unit to provide access to a capability to migrate the multi-modality communication from (i) a communication in which the initiating user is to interact with the initiating communication device using the textual interaction modality and the destination user is to interact with the destination communication device using the voice interaction modality to (ii) a communication in which the initiating user is to interact with the initiating communication device using the voice interaction modality and the destination user is to interact with the destination communication device using the voice interaction modality. For certain example implementations, a user interface unit 1402 to provide access to a capability to initiate a multi-modality communication 1210 may comprise a user interface unit 1402 to provide access to a capability to migrate multi-modality communication 1210 from (i) a communication in which an initiating user 1104-1 is to interact with initiating communication device 1102-1 using a textual interaction modality and a destination user 1104-2 is to interact with a destination communication device 1102-2 using a voice interaction modality to (ii) a communication in which initiating user 1104-1 is to interact with initiating communication device 1102-1 using the voice interaction modality and destination user 1104-2 is to interact with destination communication device 1102-2 using the voice interaction modality. By way of example but not limitation, an intimacy setting (e.g., as described herein above at least with particular reference to FIGS. 3A-3F) may be switchable during a communication from indicating a textual level of intimacy to indicating a voice level of intimacy. However, claimed subject matter is not limited to any particular described embodiments, implementations, examples, etc.

For certain example embodiments, a device may comprise an initiating communication device that may further comprise a conversion effectuator to convert text that is input by the initiating user into converted voice and a transmitter to transmit the converted voice to the destination communication device. For certain example implementations, an initiating communication device 1102-1 may further include a conversion effectuator 1406 to convert text that is input by an initiating user 1104-1 into converted voice or a transmitter 1408 to transmit the converted voice to a destination communication device 1102-2. By way of example but not limitation, a conversion effectuator 1406 may include a converter (e.g., a converter 404 (e.g., of FIG. 4B)) to perform conversions at an initiating communication device 1102-1, which may transmit results of a conversion to a destination communication device 1102-2. However, claimed subject matter is not limited to any particular described embodiments, implementations, examples, etc.

For certain example embodiments, a device may comprise an initiating communication device that may further comprise a conversion effectuator to offload conversion onto at least one network communication node and to cause text that is input by the initiating user to be converted by the at least one network communication node into converted voice and a transmitter to transmit the text that is input by the initiating user to the at least one network communication node. For certain example implementations, an initiating communication device 1102-1 may further include a conversion effectuator 1406 to offload conversion onto at least one network communication node 1110 (e.g., a network communication node 602 (e.g., of FIG. 7A or any of 10A-10D)) and to cause text that is input by an initiating user 1104-1 to be converted by the at least one network communication node 1110 into converted voice and a transmitter 1408 to transmit the text that is input by the initiating user to the at least one network communication node 1110. However, claimed subject matter is not limited to any particular described embodiments, implementations, examples, etc.

For certain example embodiments, a device may comprise an initiating communication device that may further comprise a transmitter to transmit text that is input by the initiating user to at least one network communication flow device and a conversion effectuator to cause the at least one network communication flow device to intercept the text that is input by the initiating user and to convert the text that is input by the initiating user into converted voice. For certain example implementations, an initiating communication device 1102-1 may further include a transmitter 1408 to transmit text that is input by an initiating user 1104-1 to at least one network communication device 1110 (e.g., a network communication flow device 602* (e.g., of FIG. 7B or any of 10E-10F)) and a conversion effectuator 1406 to cause the at least one network communication device 1110 to intercept the text that is input by initiating user 1104-1 and to convert the text that is input by initiating user 1104-1 into converted voice. However, claimed subject matter is not limited to any particular described embodiments, implementations, examples, etc.

For certain example embodiments, a device may comprise an initiating communication device wherein the communication initiation unit to initiate the multi-modality communication may comprise a communication initiation unit to ask the destination communication device to perform a conversion on text, which is input by the initiating user at the initiating communication device, to produce converted voice. For certain example implementations, a communication initiation unit 1404 to initiate a multi-modality communication 1210 may include a communication initiation unit 1404 to ask a destination communication device 1102-2 (e.g., by sending a request 1410) to perform a conversion on text, which is input by an initiating user 1104-1 at an initiating communication device 1102-1, to produce converted voice. Additionally or alternatively, a communication initiation unit 1404 may ask a destination communication device 1102-2 (e.g., by sending a request 1410) to perform a conversion on voice, which is input by a destination user 1104-2 at destination communication device 1102-2, to produce converted text. However, claimed subject matter is not limited to any particular described embodiments, implementations, examples, etc.

For certain example embodiments, a device may comprise an initiating communication device wherein the communication initiation unit to initiate the multi-modality communication may comprise a communication initiation unit to notify the destination communication device that the multi-modality communication relates to the textual interaction modality for the initiating user at the initiating communication device and to the voice interaction modality for the destination user at the destination communication device. For certain example implementations, a communication initiation unit 1404 to initiate a multi-modality communication 1210 may include a communication initiation unit 1404 to notify a destination communication device 1102-2 (e.g., by sending a notification 1412) that multi-modality communication 1210 relates to a textual interaction modality for a initiating user 1104-1 at an initiating communication device 1102-1 and to a voice interaction modality for a destination user 1104-2 at destination communication device 1102-2. However, claimed subject matter is not limited to any particular described embodiments, implementations, examples, etc.

For certain example embodiments, a device may comprise an initiating communication device wherein the communication initiation unit to initiate the multi-modality communication may comprise a communication initiation unit to notify the destination communication device of at least one text delivery level with respect to the initiating communication device for the multi-modality communication. For certain example implementations, a communication initiation unit 1404 to initiate a multi-modality communication 1210 may include a communication initiation unit 1402 to notify a destination communication device 1102-2 (e.g., by sending a notification 1412) of at least one text delivery level (e.g., in accordance with a text delivery level indicator 822, which may be stored at an initiating communication device 1102-1, at a network communication device 1110, a combination thereof, et.) with respect to initiating communication device 1102-1 or initiating user 1104-1 for multi-modality communication 1210. For certain example embodiments, a device may comprise an initiating communication device wherein the at least one text delivery level comprises at least one of an amount of text that may be transmitted as a block or a speed of transmission or reception of text. However, claimed subject matter is not limited to any particular described embodiments, implementations, examples, etc.

For certain example embodiments, a device may comprise an initiating communication device wherein the communication initiation unit to initiate the multi-modality communication may comprise a communication initiation unit to identify at least a reference to a verbal message that aurally indicates that the initiating user is making a voice call to the destination user and intends to interact with the initiating communication device via the textual interaction modality. For certain example implementations, a communication initiation unit 1404 to initiate a multi-modality communication 1210 may include a communication initiation unit 1404 to identify at least a reference to a verbal message that aurally indicates that an initiating user 1104-1 is making a voice call to a destination user 1104-2 and intends to interact with an initiating communication device 1102-1 via a textual interaction modality. By way of example but not limitation, at least a reference to a verbal message may relate to at least a reference of a verbal message 1206 (e.g., of FIG. 12). If played by a destination communication device 1102-2, a destination user 1104-2 may hear, for instance, a message such as "Hi, this is John. I am calling you and hope that you can speak right now. However, I am in a quiet environment, so I will be entering text and you will be hearing artificial speech from my texting. Is that OK?" However, claimed subject matter is not limited to any particular described embodiments, implementations, examples, etc.

Figure 15:
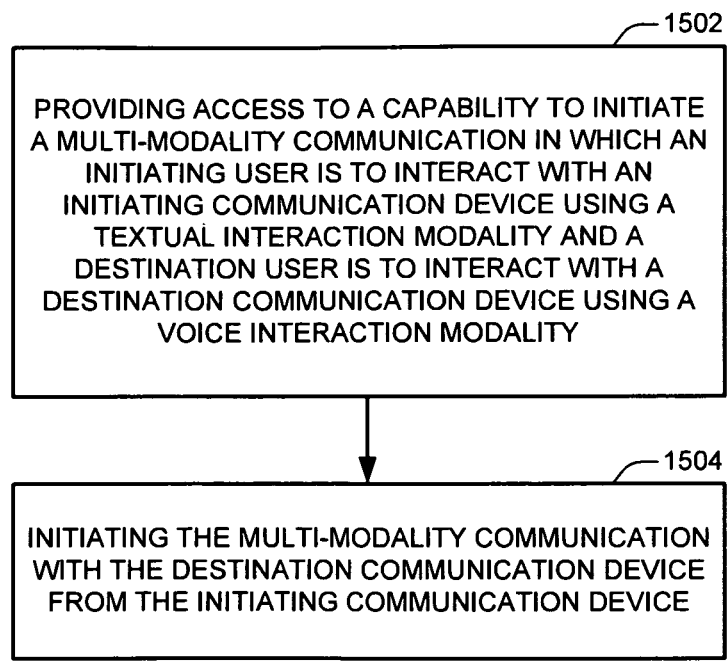
FIG. 15 is a flow diagram illustrating an example method for an initiating communication device to facilitate initiation of a multi-modality communication via a user interface in accordance with certain example embodiments.

FIG. 15 is a flow diagram 1500 illustrating an example method for an initiating communication device to facilitate initiation of a multi-modality communication via a user interface in accordance with certain example embodiments. As illustrated, flow diagram 1500 may include any of operations 1502-1504. Although operations 1502-1504 are shown or described in a particular order, it should be understood that methods may be performed in alternative manners without departing from claimed subject matter, including, but not limited to, with a different order or number of operations or with a different relationship between or among operations. Also, at least some operations of flow diagram 1500 may be performed so as to be fully or partially overlapping with other operation(s).

For certain example embodiments, a method for initiating a multi-modality communication, which method may be at least partially implemented in hardware, may comprise an operation 1502 or an operation 1504. An operation 1502 may comprise providing access to a capability to initiate a multi-modality communication in which an initiating user is to interact with an initiating communication device using a textual interaction modality and a destination user is to interact with a destination communication device using a voice interaction modality. An operation 1504 may comprise initiating the multi-modality communication with the destination communication device from the initiating communication device. For certain example implementations, an initiating communication device 1102-1 may provide access to a capability to initiate a multi-modality communication 1210 in which an initiating user 1104-1 is to interact with initiating communication device 1102-1 using a textual interaction modality and a destination user 1104-2 is to interact with a destination communication device 1102-2 using a voice interaction modality. An initiating communication device 1102-1 may also initiate multi-modality communication 1210 with destination communication device 1102-2. However, claimed subject matter is not limited to any particular described embodiments, implementations, examples, etc.

Figure 16:
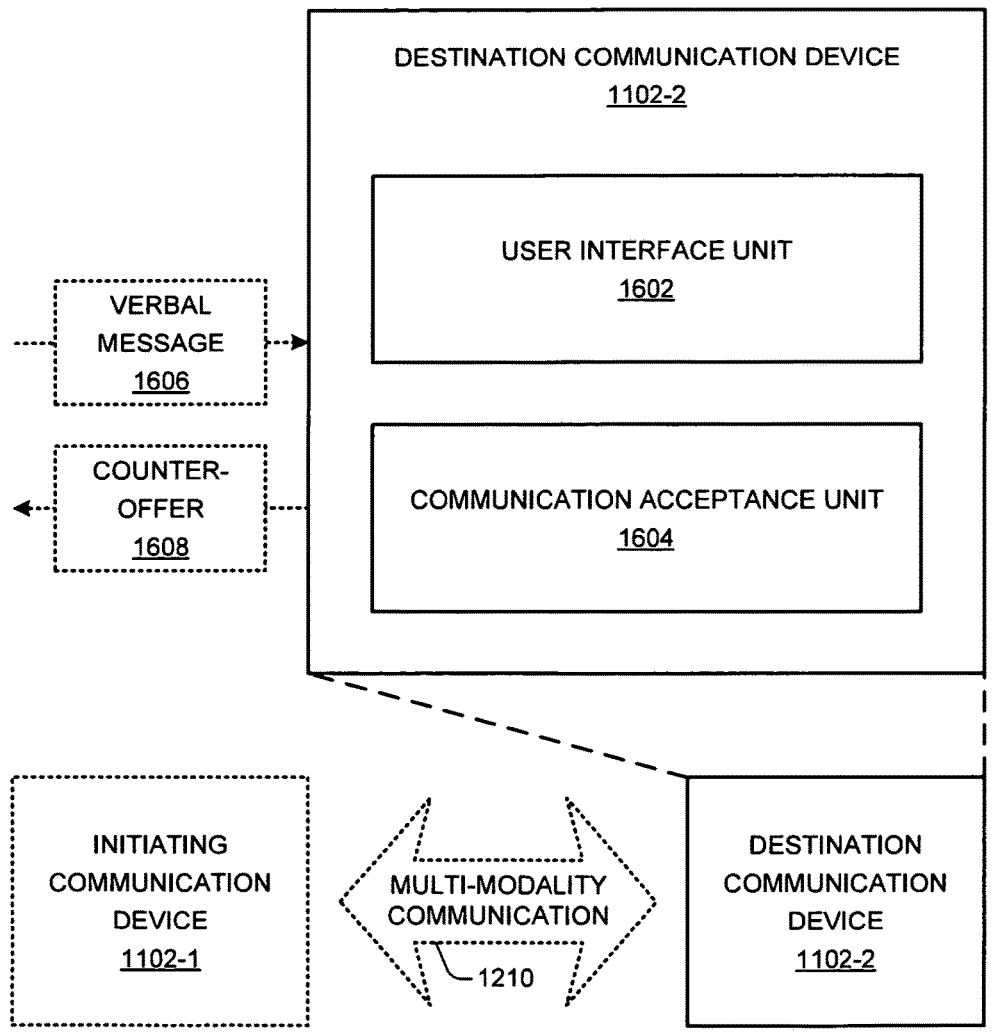
FIG. 16 is a schematic diagram of an example destination communication device that may facilitate acceptance of a multi-modality communication via a user interface in accordance with certain example embodiments.

FIG. 16 is a schematic diagram 1600 of an example destination communication device that may facilitate acceptance of a multi-modality communication via a user interface in accordance with certain example embodiments. As shown in FIG. 16, by way of example but not limitation, schematic diagram 1600 may include an initiating communication device 1102-1, a destination communication device 1102-2, a multi-modality communication 1210, at least one verbal message 1606, or at least one counter-offer 1608. More specifically, a destination communication device 1102-2 may include a user interface unit 1602 or a communication acceptance unit 1604. For certain example embodiments, a user interface unit 1602 or a communication acceptance unit 1604 may be realized as hardware, firmware, software, fixed circuitry, any combination thereof, and so forth.

For certain example embodiments, a device may comprise a destination communication device for accepting a multi-modality communication. A destination communication device may comprise a user interface unit to provide access to a capability to accept a multi-modality communication in which an initiating user is to interact with an initiating communication device using a textual interaction modality and a destination user is to interact with the destination communication device using a voice interaction modality; and a communication acceptance unit to accept the multi-modality communication with the initiating communication device. For certain example implementations, a destination communication device 1102-2 may include a user interface unit 1602 to provide access to a capability to accept a multi-modality communication 1210 in which an initiating user (e.g., an initiating user 1104-1 (e.g., of FIG. 11)) is to interact with an initiating communication device 1102-1 using a textual interaction modality (e.g., for an initiating communication modality 1106-1 (e.g., of FIG. 11)) and a destination user (e.g., a destination user 1104-2 (e.g., of FIG. 11)) is to interact with destination communication device 1102-2 using a voice interaction modality (e.g., for a destination communication modality 1106-2 (e.g., of FIG. 11)). A destination communication device 1102-2 may further include a communication acceptance unit 1604 to accept multi-modality communication 1210 with initiating communication device 1102-1. By way of example but not limitation, a user interface unit 1602 may provide a user interface in accordance with one or more aspects as described herein above at least with particular reference to FIGS. 3B-3F. However, claimed subject matter is not limited to any particular described embodiments, implementations, examples, etc.

For certain example embodiments, a device may comprise a destination communication device wherein the communication acceptance unit to accept the multi-modality communication may comprise a communication acceptance unit to cause a verbal message, which is recorded by the initiating user, to be played to indicate that the initiating user would like to participate in a communication in which the initiating user utilizes text and the destination user utilizes voice. For certain example implementations, a communication acceptance unit 1604 to accept multi-modality communication 1210 may include a communication acceptance unit 1604 to cause a verbal message 1606, which may be recorded by an initiating user 1104-1, to be played (e.g., in conjunction with user interface unit 1602 or a speaker associated with a user interface provided by user interface unit 1602) to indicate that initiating user 1104-1 would like to participate in a communication in which initiating user 1104-1 utilizes text and a destination user 1104-2 utilizes voice.

For certain example embodiments, a device may comprise a destination communication device wherein the communication acceptance unit to accept the multi-modality communication may comprise a communication acceptance unit to formulate a counter-offer for the multi-modality communication, the counter-offer requesting a change to at least one aspect of the multi-modality communication. For certain example implementations, a communication acceptance unit 1604 to accept multi-modality communication 1210 may include a communication acceptance unit 1604 to formulate a counter-offer 1608 for multi-modality communication 1210. Counter-offer 1608 may be sent to an initiating communication device 1102-1 or may request a change to at least one aspect (e.g., one or more proposed interaction modalities, one or more proposed conversion locations or mechanisms, one or more proposed parameters (or settings) (e.g., of FIG. 8), a combination thereof, etc.) of multi-modality communication 1210.

Figure 17:
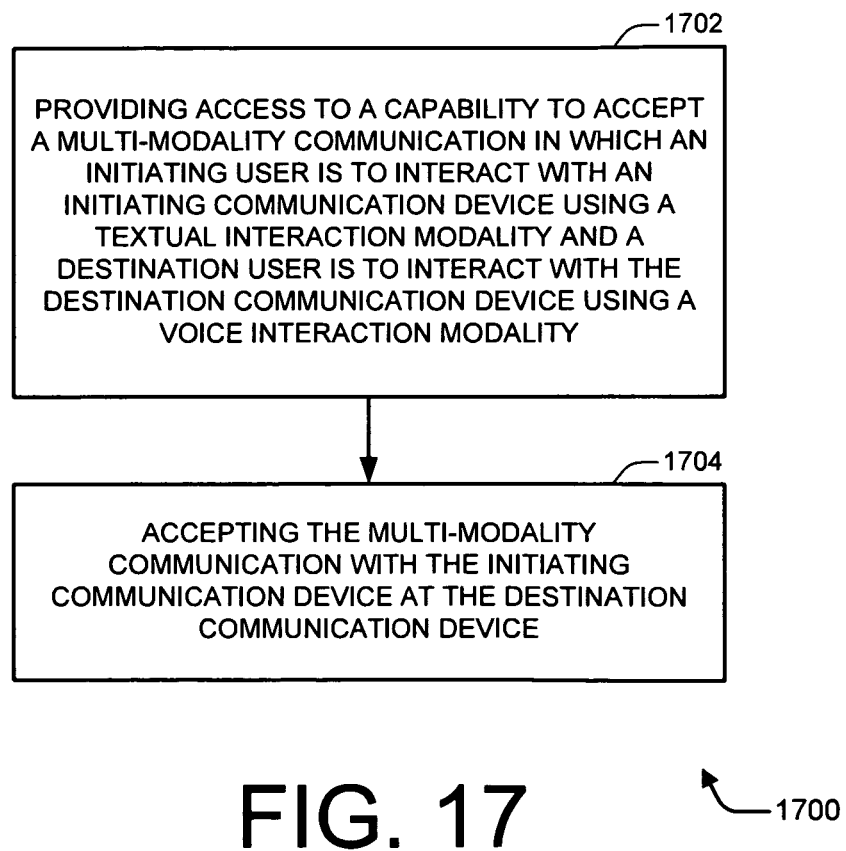
FIG. 17 is a flow diagram illustrating an example method for a destination communication device to facilitate acceptance of a multi-modality communication via a user interface in accordance with certain example embodiments.

FIG. 17 is a flow diagram 1700 illustrating an example method for a destination communication device to facilitate acceptance of a multi-modality communication via a user interface in accordance with certain example embodiments. As illustrated, flow diagram 1700 may include any of operations 1702-1704. Although operations 1702-1704 are shown or described in a particular order, it should be understood that methods may be performed in alternative manners without departing from claimed subject matter, including, but not limited to, with a different order or number of operations or with a different relationship between or among operations. Also, at least some operations of flow diagram 1700 may be performed so as to be fully or partially overlapping with other operation(s).

For certain example embodiments, a method for accepting a multi-modality communication, which method may be at least partially implemented in hardware, may comprise an operation 1702 or an operation 1704. An operation 1702 may comprise providing access to a capability to accept a multi-modality communication in which an initiating user is to interact with an initiating communication device using a textual interaction modality and a destination user is to interact with the destination communication device using a voice interaction modality. An operation 1704 may comprise accepting the multi-modality communication with the initiating communication device at the destination communication device. For certain example implementations, a destination communication device 1102-2 may provide access to a capability to accept a multi-modality communication 1210 in which an initiating user 1104-1 is to interact with an initiating communication device 1102-1 using a textual interaction modality and a destination user 1104-2 is to interact with destination communication device 1102-2 using a voice interaction modality. A destination communication device 1102-2 may also accept multi-modality communication 1210 with initiating communication device 1102-1. However, claimed subject matter is not limited to any particular described embodiments, implementations, examples, etc.

It should be appreciated that the particular embodiments (e.g., processes, apparatuses, systems, media, arrangements, etc.) described herein are merely possible implementations of the present disclosure, and that the present disclosure is not limited to the particular implementations described herein or shown in the accompanying figures.

In addition, in alternative implementations, certain acts, operations, etc. need not be performed in the order described, and they may be modified and/or may be omitted entirely, depending on the circumstances. Moreover, in various implementations, the acts or operations described may be implemented by a computer, controller, processor, programmable device, or any other suitable device, and may be based on instructions stored on one or more computer-readable or processor-accessible media or otherwise stored or programmed into such devices. If computer-readable media are used, the computer-readable media may be, by way of example but not limitation, any available media that can be accessed by a device to implement the instructions stored thereon.

Various methods, systems, techniques, etc. have been described herein in the general context of processor-executable instructions, such as program modules, executed by one or more processors or other devices. Generally, program modules may include routines, programs, objects, components, data structures, combinations thereof, etc. that perform particular tasks or implement particular abstract data types. Typically, functionality of program modules may be combined or distributed as desired in various alternative embodiments. In addition, embodiments of methods, systems, techniques, etc. may be stored on or transmitted across some form of device-accessible media.

It may also be appreciated that there may be little distinction between hardware implementations and software implementations for aspects of systems, methods, etc. that are disclosed herein. Use of hardware or software may generally be a design choice representing cost vs. efficiency tradeoffs, for example. However, in certain contexts, a choice between hardware and software (e.g., for an entirety or a given portion of an implementation) may become significant. Those having skill in the art will appreciate that there are various vehicles by which processes, systems, technologies, etc. described herein may be effected (e.g., hardware, software, firmware, combinations thereof, etc.), and that a preferred vehicle may vary depending upon a context in which the processes, systems, technologies, etc. are deployed. For example, if an implementer determines that speed and accuracy are paramount, an implementer may opt for a mainly hardware and/or firmware vehicle. Alternatively, if flexibility is deemed paramount, an implementer may opt for a mainly software implementation. In still other implementations, an implementer may opt for some combination of hardware, software, and/or firmware. Hence, there are multiple possible vehicles by which processes and/or devices and/or other technologies described herein may be effected. Which vehicle may be desired over another may be a choice dependent upon a context in which a vehicle is to be deployed or specific concerns (e.g., speed, flexibility, predictability, etc.) of an implementer, any of which may vary. Those skilled in the art will recognize that optical aspects of example implementations may employ optically-oriented hardware, software, and/or firmware.

Those skilled in the art will recognize that it is common within the art to describe devices and/or processes in fashion(s) as set forth herein, and thereafter use standard engineering practices to realize such described devices and/or processes into workable systems having described functionality. That is, at least a portion of the devices and/or processes described herein may be realized via a reasonable amount of experimentation.

Aspects and drawings described herein illustrate different components contained within, or connected with, other different components. It is to be understood that such depicted architectures are presented merely by way of example, and that many other architectures may be implemented to achieve identical or similar functionality. In a conceptual sense, any arrangement of components to achieve described functionality may be considered effectively "associated" such that desired functionality is achieved. Hence, any two or more components herein combined to achieve a particular functionality may be seen as "associated with" each other such that desired functionality is achieved, irrespective of architectures or intermedial components. Likewise, any two or more components so associated can also be viewed as being "operably connected" or "operably coupled" (or "operatively connected," or "operatively coupled") to each other to achieve desired functionality, and any two components capable of being so associated can also be viewed as being "operably couplable" (or "operatively couplable") to each other to achieve desired functionality. Specific examples of operably couplable include, but are not limited to, physically mateable and/or physically interacting components and/or wirelessly interactable and/or wirelessly interacting components and/or logically interacting and/or logically interactable components.

Those skilled in the art will recognize that at least some aspects of embodiments disclosed herein may be implemented at least partially via integrated circuits (ICs), as one or more computer programs running on one or more computing devices, as one or more software programs running on one or more processors, as firmware, as any combination thereof, and so forth. It will be further understood that designing circuitry and/or writing code for software and/or firmware may be accomplished by a person skilled in the art in light of the teachings and explanations of this disclosure.

The foregoing detailed description has set forth various example embodiments of devices and/or processes via the use of block diagrams, flowcharts, examples, combinations thereof, etc. Insofar as such block diagrams, flowcharts, examples, combinations thereof, etc. may contain or represent one or more functions and/or operations, it will be understood by those within the art that each function and/or operation within such block diagrams, flowcharts, examples, combination thereof, etc. may be implemented, individually and/or collectively, by a wide range of hardware, software, firmware, any combination thereof, and so forth. For example, in some embodiments, one or more portions of subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of example embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, as virtually any combination thereof, etc. and that designing circuitry and/or writing code for software and/or firmware is within the skill of one of skill in the art in light of the teachings of this disclosure.

In addition, those skilled in the art will appreciate that the mechanisms of subject matter described herein are capable of being distributed as a program product in a variety of forms, and that an illustrative embodiment of subject matter described herein applies regardless of a particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Although particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that inventive subject matter is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two item," without other modifiers, typically means at least two recitations, or two or more recitations).

As a further example of "open" terms in the present specification including the claims, it will be understood that usage of a language construction of "A or B" is generally interpreted, unless context dictates otherwise, as a non-exclusive "open term" meaning: A alone, B alone, and/or A and B together. Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Although various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
   circuitry configured for mediating a multi-modality communication between at least a first communication device and a second communication device, the multi-modality communication including at least a first user interacting with the first communication device using at least a textual interaction modality and a second user interacting with the second communication device using at least a voice interaction modality;
   circuitry configured for notifying the second communication device of at least one text delivery level, the at least one text delivery level including at least one amount of text that may be transmitted in one transmission, with respect to the first communication device for the multi-modality communication;
   circuitry configured for formulating a counter-offer for the multi-modality communication in accordance with a determination related to an auto-accept feature, the counter-offer requesting a change to at least one aspect, including at least the at least one text delivery level, of the multi-modality communication; and
   circuitry configured for migrating the multi-modality communication from a communication including at least the first user interacting with the first communication device using at least the textual interaction modality and the second user interacting with the second communication device using at least the voice interaction modality to a communication including at least the first user interacting with the first communication device using at least the voice interaction modality and the second user interacting with the second communication device using at least the voice interaction modality, including at least converting text input by the first user into voice for transmission to the second communication device.

2. The system of claim 1, wherein circuitry configured for notifying the second communication device of at least one text delivery level, the at least one text delivery level including at least one amount of text that may be transmitted in one transmission, with respect to the first communication device for the multi-modality communication comprises:
   circuitry configured for storing at least a reference to at least one verbal message, the at least one verbal message including at least one personalized recorded message of the first user for aural playback by the second communication device notifying the second user of the textual interaction modality in use by the first user via the first communication device and of the at least one text delivery level; and
   circuitry configured for notifying, at least partially via the at least one verbal message, the second communication device and the second user of the textual interaction modality in use by the first user via the first communication device and of the at least one text delivery level.

3. The system of claim 2, wherein circuitry configured for storing at least a reference to at least one verbal message, the at least one verbal message including at least one personalized recorded message of the first user for aural playback by the second communication device notifying the second user of the textual interaction modality in use by the first user via the first communication device and of the at least one text delivery level comprises:
   circuitry configured for storing the at least one verbal message.

4. The system of claim 3, further comprising:
   circuitry configured for causing transmission of the at least one verbal message from the first communication device to the second communication device; and
   circuitry configured for causing the second communication device to play the at least one verbal message.

5. The system of claim 1, further comprising:
   circuitry configured for causing transmission of at least one call set-up request message to the second communication device previous to mediating the multi-modality communication, the at least one call set-up request message notifying the second communication device that the first user interacting with the first communication device will be using at least the textual interaction modality.

6. The system of claim 1, wherein circuitry configured for mediating a multi-modality communication between at least a first communication device and a second communication device, the multi-modality communication including at least a first user interacting with the first communication device using at least a textual interaction modality and a second user interacting with the second communication device using at least a voice interaction modality comprises:
   circuitry configured for mediating the multi-modality communication, including at least bearing a voice portion of the multi-modality communication originating from the second communication device via a voice over internet protocol (VoiP) communication channel and bearing a text portion of the multi-modality communication originating from the first communication device via at least one communication channel other than a VoiP communication channel.

7. The system of claim 1, further comprising:
   circuitry configured for accepting voice input from the first user; and
   circuitry configured for providing text output to the first user at the first communication device for the multi-modality communication responsive at least partly to a single multi-modality communication setting.

8. The system of claim 7, wherein circuitry configured for providing text output to the first user at the first communication device for the multi-modality communication responsive at least partly to a single multi-modality communication setting comprises:
   circuitry configured for providing text output to the first user at the first communication device for the multi-modality communication without changing a multi-modality communication setting of the first communication device at least partly based on converting voice to text by at least one other network device previous to reception by the first communication device.

9. The system of claim 1, further comprising:
   circuitry configured for providing at least one option to initiate a multi-modality communication via a texting application that is executable on the first communication device.

10. The system of claim 1, further comprising:
  circuitry configured for offloading the conversion of text input by the first user into voice for transmission to the second communication device.

11. The system of claim 10, wherein circuitry configured for offloading the conversion of text input by the first user into voice for transmission to the second communication device comprises:
  circuitry configured for offloading the conversion of text input by the first user into voice onto at least one network communication device other than a system mediating the multi-modality communication for transmission by the at least one network communication device to the second communication device.

12. The system of claim 11, wherein circuitry configured for offloading the conversion of text input by the first user into voice onto at least one network communication device other than a system mediating the multi-modality communication for transmission by the at least one network communication device to the second communication device comprises:
  circuitry configured for offloading the conversion of text input by the first user into voice onto at least one network communication flow device for transmission by the at least one network communication flow device to the second communication device.

13. The system of claim 1, further comprising:
  circuitry configured for transmitting a request to the second communication device to perform a conversion on text input by the first user at the first communication device to produce converted voice in conjunction with the migrating the multi-modality communication.

14. The system of claim 1, further comprising:
  circuitry configured for causing the second communication device to play at least one verbal message to aurally indicate that the first user is making a voice call to the second user but intends to interact with the first communication device using text via at least one conversion between text and voice.

15. The system of claim 1, wherein circuitry configured for notifying the second communication device of at least one text delivery level, the at least one text delivery level including at least one amount of text that may be transmitted in one transmission, with respect to the first communication device for the multi-modality communication comprises:
  circuitry configured for providing at least one notice to the second user of one or more conversational delays associated with the at least one text delivery level, including at least the at least one amount of text that may be transmitted in one transmission, as a result of the textual interaction modality in use by the first user via the first communication device.

16. The system of claim 1, wherein circuitry configured for formulating a counter-offer for the multi-modality communication in accordance with a determination related to an auto-accept feature, the counter-offer requesting a change to at least one aspect, including at least the at least one text delivery level, of the multi-modality communication comprises:
  circuitry configured for determining whether an auto-accept feature is active, the auto-accept feature indicative of whether a conversion is to be implemented if auto-accept is implemented for an incoming communication notification; and
  circuitry configured for formulating the counter-offer for the multi-modality communication in response to determining that the auto-accept feature is not active.

17. The system of claim 1, wherein circuitry configured for formulating a counter-offer for the multi-modality communication in accordance with a determination related to an auto-accept feature, the counter-offer requesting a change to at least one aspect, including at least the at least one text delivery level, of the multi-modality communication comprises:
  circuitry configured for identifying one or more languages that the second user is capable of understanding in at least one of text or voice;
  circuitry configured for determining at least one of the one or more languages that the second user is more capable of understanding in a voice modality than in a text modality; and
  circuitry configured for formulating a counter-offer requesting a change in the first interaction with the first communication device to at least a voice interaction modality and in the at least one of the one or more languages that the second user is more capable of understanding in the voice interaction modality than in the text interaction modality.

18. The system of claim 1, wherein circuitry configured for notifying the second communication device of at least one text delivery level, the at least one text delivery level including at least one amount of text that may be transmitted in one transmission, with respect to the first communication device for the multi-modality communication comprises:
  circuitry configured for causing at least one text delivery level indicator of the second communication device to indicate the at least one amount of text that may be transmitted in one transmission with respect to the first communication device and the multi-modality communication.

19. The system of claim 18, wherein circuitry configured for causing at least one text delivery level indicator of the second communication device to indicate the at least one amount of text that may be transmitted in one transmission with respect to the first communication device and the multi-modality communication comprises:
  circuitry configured for causing at least one visual indicator of the second communication device to indicate the at least one amount of text that may be transmitted in one transmission with respect to the first communication device and the multi-modality communication.

20. The system of claim 1, wherein circuitry configured for formulating a counter-offer for the multi-modality communication in accordance with a determination related to an auto-accept feature, the counter-offer requesting a change to at least one aspect, including at least the at least one text delivery level, of the multi-modality communication comprises:
  circuitry configured for formulating a counter-offer for the multi-modality communication in accordance with at least one indication of whether a user associated with the multi-modality communication wishes to be notified if another participant in the multi-modality communication requests a change.

21. The system of claim 20, wherein circuitry configured for formulating a counter-offer for the multi-modality communication in accordance with at least one indication of whether a user associated with the multi-modality communication wishes to be notified if another participant in the multi-modality communication requests a change comprises:
  circuitry configured for prompting the user associated with the multi-modality communication to provide assent to a change requested by the another participant in the multi-modality communication in response to determining that the auto-accept feature is not enabled.

22. The system of claim 1, wherein circuitry configured for notifying the second communication device of at least one text delivery level, the at least one text delivery level including at least one amount of text that may be transmitted in one transmission, with respect to the first communication device for the multi-modality communication comprises:

circuitry configured for notifying the second communication device of at least one text delivery level, the at least one text delivery level including at least one amount of text that may be transmitted at one time, with respect to the first communication device for the multi-modality communication.

23. A system, comprising:

means for mediating a multi-modality communication between at least a first communication device and a second communication device, the multi-modality communication including at least a first user interacting with the first communication device using at least a textual interaction modality and a second user interacting with the second communication device using at least a voice interaction modality;

means for notifying the second communication device of at least one text delivery level, the at least one text delivery level including at least one amount of text that may be transmitted in one transmission, with respect to the first communication device for the multi-modality communication;

means for formulating a counter-offer for the multi-modality communication, in accordance with a determination related to an auto-accept feature, the counter-offer requesting a change to at least one aspect, including at least the at least one text delivery level, of the multi-modality communication; and means for migrating the multi-modality communication from a communication including at least the first user interacting with the first communication device using at least the textual interaction modality and the second user interacting with the second communication device using at least the voice interaction modality to a communication including at least the first user interacting with the first communication device using at least the voice interaction modality and the second user interacting with the second communication device using at least the voice interaction modality, including at least converting text input by the first user into voice for transmission to the second communication device.

24. An apparatus, comprising:

at least one processing device; and one or more instructions which, when executed by the at least one processing device, configure the at least one processing device to perform one or more operations including at least:

mediating a multi-modality communication between at least a first communication device and a second communication device, the multi-modality communication including at least a first user interacting with the first communication device using at least a textual interaction modality and a second user interacting with the second communication device using at least a voice interaction modality;

notifying the second communication device of at least one text delivery level, the at least one text delivery level including at least one amount of text that may be transmitted in one transmission, with respect to the first communication device for the multi-modality communication;

formulating a counter-offer for the multi-modality communication in accordance with a determination related to an auto-accept feature, the counter-offer requesting a change to at least one aspect, including at least the at least one text delivery level, of the multi-modality communication; and migrating the multi-modality communication from a communication including at least the first user interacting with the first communication device using at least the textual interaction modality and the second user interacting with the second communication device using at least the voice interaction modality to a communication including at least the first user interacting with the first communication device using at least the voice interaction modality and the second user interacting with the second communication device using at least the voice interaction modality, including at least converting text input by the first user into voice for transmission to the second communication device.

25. A method, comprising:

mediating a multi-modality communication between at least a first communication device and a second communication device, the multi-modality communication including at least a first user interacting with the first communication device using at least a textual interaction modality and a second user interacting with the second communication device using at least a voice interaction modality;

notifying the second communication device of at least one text delivery level, the at least one text delivery level including at least one amount of text that may be transmitted in one transmission, with respect to the first communication device for the multi-modality communication;

formulating a counter-offer for the multi-modality communication in accordance with a determination related to an auto-accept feature, the counter-offer requesting a change to at least one aspect, including at least the at least one text delivery level, of the multi-modality communication; and migrating the multi-modality communication from a communication including at least the first user interacting with the first communication device using at least the textual interaction modality and the second user interacting with the second communication device using at least the voice interaction modality to a communication including at least the first user interacting with the first communication device using at least the voice interaction modality and the second user interacting with the second communication device using at least the voice interaction modality, including at least converting text input by the first user into voice for transmission to the second communication device, wherein at least one of the mediating, notifying, formulating, or migrating is at least partially implemented using at least one processing device.

26. An article of manufacture, comprising:

at least one non-transitory computer-readable medium including at least:

one or more instructions for mediating a multi-modality communication between at least a first communication device and a second communication device, the multi-modality communication including at least a first user interacting with the first communication device using at least a textual interaction modality and a second user interacting with the second communication device using at least a voice interaction modality;

one or more instructions for notifying the second communication device of at least one text delivery level, the at least one text delivery level including at least one amount of text that may be transmitted in one transmission, with respect to the first communication device for the multi-modality communication;

one or more instructions for formulating a counter-offer for the multi-modality communication in accordance with a determination related to an auto-accept feature, the counter-offer requesting a change to at least one aspect, including at least the at least one text delivery level, of the multi-modality communication; and one or more instructions for migrating the multi-modality communication from a communication including at least the first user interacting with the first communication device using at least the textual interaction modality and the second user interacting with the second communication device using at least the voice interaction modality to a communication including at least the first user interacting with the first communication device using at least the voice interaction modality and the second user interacting with the second communication device using at least the voice interaction modality, including at least converting text input by the first user into voice for transmission to the second communication device.

27. A system, comprising:

at least one computing device; and at least one non-transitory computer-readable medium including at least one or more instructions which, when executed on the at least one computing device, configure the at least one computing device to perform one or more operations including at least:

mediating a multi-modality communication between at least a first communication device and a second communication device, the multi-modality communication including at least a first user interacting with the first communication device using at least a textual interaction modality and a second user interacting with the second communication device using at least a voice interaction modality;

notifying the second communication device of at least one text delivery level, the at least one text delivery level including at least one amount of text that may be transmitted in one transmission, with respect to the first communication device for the multi-modality communication;

formulating a counter-offer for the multi-modality communication in accordance with a determination related to an auto-accept feature, the counter-offer requesting a change to at least one aspect, including at least the at least one text delivery level, of the multi-modality communication; and migrating the multi-modality communication from a communication including at least the first user interacting with the first communication device using at least the textual interaction modality and the second user interacting with the second communication device using at least the voice interaction modality to a communication including at least the first user interacting with the first communication device using at least the voice interaction modality and the second user interacting with the second communication device using at least the voice interaction modality, including at least converting text input by the first user into voice for transmission to the second communication device.

* * * * *